US010480411B2

(12) United States Patent
Uechi et al.

(10) Patent No.: US 10,480,411 B2
(45) Date of Patent: Nov. 19, 2019

(54) WASTE HEAT RECOVERY DEVICE, GAS TURBINE PLANT PROVIDED WITH SAME, AND WASTE HEAT RECOVERY METHOD

(71) Applicant: MITSUBISHI HITACHI POWER SYSTEMS, LTD., Kanagawa (JP)

(72) Inventors: Hideyuki Uechi, Tokyo (JP); Hideaki Sugishita, Tokyo (JP); Yukimasa Nakamoto, Yokohama (JP); Yuichi Oka, Yokohama (JP)

(73) Assignee: MITSUBISHI HITACHI POWER SYSTEMS, LTD., Kanagawa (JP)

( * ) Notice: Subject to any disclaimer, the term of this patent is extended or adjusted under 35 U.S.C. 154(b) by 554 days.

(21) Appl. No.: 15/123,032

(22) PCT Filed: Mar. 16, 2015

(86) PCT No.: PCT/JP2015/057670
§ 371 (c)(1),
(2) Date: Sep. 1, 2016

(87) PCT Pub. No.: WO2015/146669
PCT Pub. Date: Oct. 1, 2015

(65) Prior Publication Data
US 2017/0074164 A1     Mar. 16, 2017

(30) Foreign Application Priority Data

Mar. 24, 2014   (JP) .................................. 2014-060839

(51) Int. Cl.
*F02C 6/18*      (2006.01)
*F01K 23/10*    (2006.01)
(Continued)

(52) U.S. Cl.
CPC ................ *F02C 6/18* (2013.01); *F01D 5/081* (2013.01); *F01D 25/125* (2013.01); *F01K 7/22* (2013.01);
(Continued)

(58) Field of Classification Search
CPC .. F02C 6/18; F01K 23/10; F01K 25/10; F25B 1/00
See application file for complete search history.

(56) References Cited

U.S. PATENT DOCUMENTS 3,150,487 A * 9/1964 Mangan ................ F01K 23/106
60/39.182
5,067,317 A * 11/1991 Kasper .................. F01K 21/047
60/39.464
(Continued)

FOREIGN PATENT DOCUMENTS

EP       1 016 775       7/2000
JP       60-138214       7/1985
(Continued)

OTHER PUBLICATIONS

English Translation of JP 2014009624 A (Year: 2014).*
(Continued)

*Primary Examiner* — Mark A Laurenzi
*Assistant Examiner* — Shafiq Mian
(74) *Attorney, Agent, or Firm* — Wenderoth, Lind & Ponack, L.L.P.

(57) ABSTRACT

A waste heat recovery device includes: a low-boiling-point medium Rankine cycle in which a low-boiling-point medium circulates while the low-boiling-point medium is repeatedly condensed and evaporated; a heated water line that guides liquid water, which is heated here, to the low-boiling-point medium Rankine cycle from a waste heat recovery boiler; and a water recovery line that returns the
(Continued)

water, which has passed through the low-boiling-point medium Rankine cycle, to the waste heat recovery boiler. The low-boiling-point medium Rankine cycle includes a heater that heats the low-boiling-point medium by exchanging heat between the low-boiling-point medium, which is a liquid, and liquid water, which has passed through the heated water line.

16 Claims, 18 Drawing Sheets

(51) Int. Cl.
   *F01K 25/10* (2006.01)
   *F01D 5/08* (2006.01)
   *F01D 25/12* (2006.01)
   *F01K 7/22* (2006.01)
(52) U.S. Cl.
   CPC ............. *F01K 23/10* (2013.01); *F01K 25/10* (2013.01); *F05D 2220/72* (2013.01); *F05D 2220/76* (2013.01); *Y02E 20/16* (2013.01)

(56) References Cited

U.S. PATENT DOCUMENTS

| | | | | |
|---|---|---|---|---|
| 5,640,842 A * | 6/1997 | Bronicki | ............... | F01K 17/025 122/7 B |
| 5,884,470 A * | 3/1999 | Frutschi | ................ | F01K 21/047 60/39.182 |
| 7,269,956 B2 * | 9/2007 | Gericke | .................... | F01K 7/40 60/782 |
| 2003/0037534 A1 * | 2/2003 | Sugishita | .............. | F01K 23/106 60/39.182 |
| 2004/0003583 A1 * | 1/2004 | Uematsu | ............... | F01K 23/106 60/39.182 |
| 2007/0017207 A1 * | 1/2007 | Smith | .................... | F01K 21/047 60/39.182 |
| 2010/0229594 A1 * | 9/2010 | Erickson | ................. | F25B 15/02 62/476 |
| 2011/0113786 A1 * | 5/2011 | Rancruel | .............. | F01K 23/10 60/772 |
| 2012/0017597 A1 | 1/2012 | Freund et al. | | |
| 2012/0312019 A1 * | 12/2012 | Rechtman | ............. | F22B 1/1815 60/645 |
| 2015/0000279 A1 * | 1/2015 | Mohr | ...................... | F01K 9/003 60/646 |

FOREIGN PATENT DOCUMENTS

| | | |
|---|---|---|
| JP | 5-203103 | 8/1993 |
| JP | 7-166815 | 6/1995 |
| JP | 11-13489 | 1/1999 |
| JP | 2002-213208 | 7/2002 |
| JP | 2006-194242 | 7/2006 |
| JP | 2009-97735 | 5/2009 |
| JP | 2012-26441 | 2/2012 |
| JP | 2013-177838 | 9/2013 |
| JP | 2014-9624 | 1/2014 |

OTHER PUBLICATIONS

Written Opinion dated Jun. 16, 2015 in corresponding International Application No. PCT/JP2015/057670 with Translation.
International Search Report dated Jun. 16, 2015 in corresponding International Application No. PCT/JP2015/057670 with Translation.
Office Action dated Mar. 22, 2017 in corresponding Korean Application No. 10-2016-7024818, with English Translation.

* cited by examiner

WASTE HEAT RECOVERY DEVICE, GAS TURBINE PLANT PROVIDED WITH SAME, AND WASTE HEAT RECOVERY METHOD

TECHNICAL FIELD

The present invention relates to a waste heat recovery device that recovers waste heat from a gas turbine, a gas turbine plant including the waste heat recovery device, and a waste heat recovery method.

Priority is claimed on Japanese Patent Application No. 2014-060839, filed Mar. 24, 2014, the content of which is incorporated herein by reference.

BACKGROUND ART

A waste heat recovery boiler may be connected to a gas turbine to effectively use the heat of exhaust gas that is discharged from the gas turbine.

The following PTL 1 discloses a gas turbine plant that includes a gas turbine and a waste heat recovery boiler. The gas turbine plant further includes a steam turbine that is driven by steam generated by the waste heat recovery boiler, a steam condenser that changes the steam, having driven a steam turbine into water, and a low-boiling-point medium Rankine cycle. The low-boiling-point medium Rankine cycle includes: an evaporator that evaporates a low-boiling-point medium, which is a liquid; a turbine that is driven by a low-boiling-point medium, which is evaporated gas; and a condenser that condenses the low-boiling-point medium having driven the turbine. The evaporator of the low-boiling-point medium Rankine cycle evaporates the low-boiling-point medium and changes the steam into water by exchanging heat between a boiling point medium, which is a liquid, and steam that has driven the steam turbine. That is, the evaporator also functions as a steam condenser of the steam turbine.

CITATION LIST

Patent Literature

[PTL 1] Japanese Unexamined Patent Application, First Publication No. H7-166815

SUMMARY OF INVENTION

Technical Problem

The low-boiling-point medium Rankine cycle is introduced to a gas turbine plant in a technique disclosed in PTL 1 so that the waste heat emitted from the gas turbine is effectively used. In a case in which the low-boiling-point medium Rankine cycle is introduced in this way, a small low-boiling-point medium Rankine cycle is desired in terms of an installation space or equipment cost. Particularly, since an installation space is limited in a case in which a low-boiling-point medium Rankine cycle is introduced to an existing gas turbine plant, a small low-boiling-point medium Rankine cycle is particularly desired.

Accordingly, an object of the invention is to provide a waste heat recovery device of which a low-boiling-point medium Rankine cycle can be reduced in size while waste heat emitted from a gas turbine is effectively used by the low-boiling-point medium Rankine cycle, a gas turbine plant including the waste heat recovery device, and a waste heat recovery method.

Solution to Problem

In order to achieve the object, according to an aspect of the invention, a waste heat recovery device includes: a low-boiling-point medium Rankine cycle in which a low-boiling-point medium circulates while the low-boiling-point medium is repeatedly condensed and evaporated; a heated water line that guides heated liquid water to the low-boiling-point medium Rankine cycle from a waste heat recovery boiler heating water by exhaust gas generated from a gas turbine; a water recovery line that returns the water, which has been led from the heated water line to the low-boiling-point medium Rankine cycle, and passed through the low-boiling-point medium Rankine cycle, to the waste heat recovery boiler. The low-boiling-point medium Rankine cycle includes a heater that heats the low-boiling-point medium by exchanging heat between the low-boiling-point medium, which is a liquid, and water, which is the liquid having passed through the heated water line.

In the waste heat recovery device, heat is exchanged between the low-boiling-point medium, which is a liquid, and liquid water by the heater of the low-boiling-point medium Rankine cycle. Accordingly, the heat transfer area of a heater can be reduced in comparison with a case in which heat is exchanged between a low-boiling-point medium and a gas. For this reason, it is possible to reduce the size of a heater and to reduce the size of the low-boiling-point medium Rankine cycle in the waste heat recovery device.

Accordingly, a low-boiling-point medium Rankine cycle can be relatively easily introduced to an existing waste heat recovery device restricted by an installation space or the like.

Here, in the waste heat recovery device, the waste heat recovery boiler may include at least one or more evaporators that generate steam by heating water by the exhaust gas, and economizers that are provided, for the respective one or more evaporators and heat water, which is sent to the evaporators, by the exhaust gas; and the heated water line may guide liquid water, which is heated by either of the economizers provided for the respective one or more evaporators, to the low-boiling-point medium Rankine cycle.

Further, in the waste heat recovery device that guides liquid water, which is heated by the economizer of the waste heat recovery boiler, to the low-boiling-point medium Rankine cycle, the heated water line may guide liquid water, which is heated by the economizer corresponding to the low-pressure evaporator having the lowest internal pressure among the one or more evaporators, to the low-boiling-point medium Rankine cycle.

Since a part of the water, which is heated by the economizer corresponding to the low-pressure evaporator (hereinafter, referred to as a low-pressure economizer), is sent to the low-boiling-point medium Rankine cycle in the waste heat recovery device, the flow rate of water flowing through the low-pressure economizer is increased and the amount of heat to be exchanged between the exhaust gas and the water in the low-pressure economizer, that is, the amount of heat of the exhaust gas to be recovered can be increased. For this reason, in the waste heat recovery device, the heat of the low-temperature exhaust gas can be effectively used as the temperature of the exhaust gas present in the waste heat recovery boiler and the temperature of the exhaust gas flowing into the chimney can also be lowered.

In any one of the above-mentioned waste heat recovery devices, the water recovery line may return water, which has passed through the low-boiling-point medium Rankine cycle, to the waste heat recovery boiler through a water supply line that supplies water to the waste heat recovery boiler.

In the waste heat recovery device, water circulates between the waste heat recovery boiler and the low-boiling-point medium Rankine cycle. For this reason, water, of which the temperature is higher than that in a case in which water exchanging heat with the low-boiling-point medium does not circulate, can be supplied to the low-boiling-point medium Rankine cycle in the waste heat recovery device. Accordingly, the output of the low-boiling-point medium Rankine cycle can be increased in the waste heat recovery device. Moreover, since the temperature of water, which is sent to the low-pressure economizer through the water supply line, becomes high, the condensation of moisture contained in the exhaust gas on the heat transfer pipe of the low-pressure economizer can be suppressed. For this reason, the corrosion of the heat transfer pipe of the economizer can be suppressed in the waste heat recovery device.

In the waste heat recovery device according to the aspect, the waste heat recovery boiler may include at least one or more evaporators that generate steam by heating water by the exhaust gas, and economizers that are provided for the respective one or more evaporators and heat water, which is sent to the evaporators, by the exhaust gas; the water recovery line may return water, which has passed through the low-boiling-point medium Rankine cycle, to the economizer, which corresponds to the low-pressure evaporator having the lowest internal pressure among the one or more evaporators, through a water supply line that supplies water to the waste heat recovery boiler; and a temperature of water, which is sent to the economizer corresponding to the low-pressure evaporator, may be a temperature that is higher than a dew-point temperature of the exhaust gas at an exhaust gas outlet of the economizer.

Since a part of the water, which is heated by the low-pressure economizer corresponding to the low-pressure evaporator, is sent to the low-boiling-point medium Rankine cycle in the waste heat recovery device, the flow rate of water flowing through the low-pressure economizer is increased. For this reason, the amount of heat to be exchanged between the exhaust gas and the water in the low-pressure economizer, that is, the amount of heat of the exhaust gas to be recovered can be increased in the waste heat recovery device. Accordingly, in the waste heat recovery device, the heat of the low-temperature exhaust gas can be effectively used as the temperature of the exhaust gas present in the waste heat recovery boiler and the temperature of the exhaust gas flowing into the chimney can also be lowered.

Moreover, in the waste heat recovery device, water circulates between the low-pressure economizer of the waste heat recovery boiler and the low-boiling-point medium Rankine cycle. For this reason, water, of which the temperature is higher than that in a case in which the water exchanging heat with the low-boiling-point medium does not circulate, can be supplied to the low-boiling-point medium Rankine cycle in the waste heat recovery device. Accordingly, the output of the low-boiling-point medium Rankine cycle can be increased in the waste heat recovery device. In addition, since the temperature of water, which is sent to the low-pressure economizer through the water supply line, becomes high and is higher than the dew-point temperature of the exhaust gas at the exhaust gas outlet of the low-pressure economizer, the condensation of moisture contained in the exhaust gas on the heat transfer pipe of the low-pressure economizer can be suppressed. For this reason, the corrosion of the heat transfer pipe of the economizer can be suppressed in the waste heat recovery device.

Any one of the above-mentioned waste heat recovery devices may further include a water recovery system-heat exchanger that exchanges heat between water, which flows in the water recovery line, and a medium.

The heat of water flowing in the water recovery line or the heat of a medium can be effectively used in the waste heat recovery device.

In the waste heat recovery device including the water recovery system-heat exchanger, the water recovery system-heat exchanger may include a cooler heating water, which flows in the water recovery line, and cooling an object to be cooled in the gas turbine by exchanging heat between the water and the object to be cooled.

In the waste heat recovery device, the heat emitted from the object to be cooled can be effectively used while the object to be cooled in the gas turbine is cooled.

In the waste heat recovery device of which the water recovery system-heat exchanger includes the cooler, the cooler may include an air cooler that cools compressed air, which is taken from a compressor of the gas turbine, by exchanging heat between a part of the compressed air as the object to be cooled and water and sends the cooled compressed air to a high-temperature component that is in contact with combustion gas in the gas turbine.

Any one of the above-mentioned waste heat recovery devices may further include a heated water system-heat exchanger that exchanges heat between water, which flows in the heated water line, and a medium.

The heat of the medium or the heat of the water flowing in the heated water line can be effectively used in the waste heat recovery device.

In the waste heat recovery device including the heated water system-heat exchanger, the heated water system-heat exchanger may include a cooler heating water, which flows in the heated water line, and cooling an object to be cooled in the gas turbine by exchanging heat between the water and the object to be cooled.

In the waste heat recovery device of which the heated water system-heat exchanger includes the cooler, the cooler may include an air cooler that cools compressed air, which is taken from a compressor of the gas turbine, by exchanging heat between a part of the compressed air as the object to be cooled and water and sends the cooled compressed air to a high-temperature component that is in contact with combustion gas in the gas turbine.

In the waste heat recovery device, the heat emitted from the object to be cooled can be effectively used while the object to be cooled in the gas turbine is cooled.

Any one of the above-mentioned waste heat recovery devices may further include a water supply system-heat exchanger that cools an object to be cooled in the gas turbine and heats water, which is present in a water supply line supplying water to the waste heat recovery boiler, by exchanging heat between the water and the object to be cooled.

In the waste heat recovery device, the heat recovered from the object to be cooled can be effectively used in the low-boiling-point medium Rankine cycle while the object to be cooled in the gas turbine is cooled. Moreover, since the temperature of water, which is supplied to the waste heat recovery boiler through the water supply line, becomes high in the waste heat recovery device, the condensation of moisture contained in the exhaust gas on the heat transfer pipe of the low-pressure economizer can be suppressed. For this reason, the corrosion of the heat transfer pipe of the economizer can be suppressed in the waste heat recovery device.

In the waste heat recovery device including the water supply system-heat exchanger, the water supply system-heat exchanger may include at least one cooler of: an intercooler that cools compressed air, which is taken from an intermediate stage of a compressor of the gas turbine, by exchanging heat between the compressed air as the object to be cooled and water, and returns the cooled compressed air to the intermediate stage of the compressor or a rear portion of the intermediate stage; a lubricating oil cooler that cools a lubricating oil, which flows out of a bearing rotatably supporting a rotor of the gas turbine, by exchanging heat between the lubricating oil as the object to be cooled and water, and returns the cooled lubricating oil to the bearing; and an air cooler that cools compressed air, which is taken from a compressor of the gas turbine, by exchanging heat between a part of the compressed air as the object to be cooled and water and sends the cooled compressed air to a high-temperature component that is in contact with combustion gas in the gas turbine.

In the waste heat recovery device of which the water supply system-heat exchanger includes the cooler, a generator, which generates electricity by the driving of the gas turbine, may be connected to the gas turbine, and the water supply system-heat exchanger may include a generator cooler that cools a cooling medium, which cools a component of the generator, by exchanging heat between the cooling medium as the object to be cooled and water.

In the waste heat recovery device of which the water supply system-heat exchanger includes the cooler, the water supply system-heat exchanger may include a plurality of coolers including the intercooler, and the intercooler may heat water that is heated by the cooler other than the intercooler.

In the waste heat recovery device, water, which is sent to the economizer, is heated in stages by at least two kinds of cooler for which objects to be cooled are different from each other. For this reason, a difference between the temperature of an object to be cooled and the temperature of water is small in each cooler of the waste heat recovery device, and a difference between the temperature of water at an inlet and the temperature of water at an outlet is reduced. As a result, the efficiency of heat exchange between an object to be cooled and water can be improved.

In the waste heat recovery device including the water supply system-heat exchanger, the waste heat recovery boiler may include at least one or more evaporators that generate steam by heating water by the exhaust gas, and economizers that are provided for the respective one or more evaporators and heat water, which is sent to the evaporators, by the exhaust gas; the water supply system-heat exchanger may include one or more coolers that cool an object to be cooled in the gas turbine and heat water, which is present in the water supply line supplying water to the waste heat recovery boiler, by exchanging heat between the water and the object to be cooled, and may include an intercooler that cools compressed air, which is taken from an intermediate stage of a compressor of the gas turbine, by exchanging heat between the compressed air as the object to be cooled and water and returns the cooled compressed air to the intermediate stage of the compressor or a rear portion of the intermediate stage, as the cooler; and among the one or more coolers, the intercooler may form the cooler provided on the most downstream side on the water supply line and may exchange heat between the object to be cooled, of which the temperature is lower than the saturation temperature of water present in a low-pressure evaporator having the lowest internal pressure among the one or more evaporators, and the water.

In the waste heat recovery device, the temperature of water, which is sent to the low-pressure economizer, can be set to be lower than the saturation temperature of water present in the low-pressure evaporator. For this reason, since water does not need to be heated in the low-pressure economizer and the low-pressure evaporator, the heat of the exhaust gas passing through the economizer and the low-pressure evaporator can be effectively used. Moreover, since compressed air is cooled in the waste heat recovery device, the temperature at the inlet of the turbine is lowered. For this reason, the efficiency of the gas turbine is decreased, but power required to drive the compressor is reduced. Accordingly, a decrease in the efficiency of the gas turbine can be further suppressed.

In any one of the above-mentioned waste heat recovery devices including the water supply system-heat exchanger, the waste heat recovery boiler may include at least one or more evaporators that generate steam by heating water by the exhaust gas, and economizers that are provided for the respective one or more evaporators and heat water, which is sent to the evaporators, by the exhaust gas; and the water supply system-heat exchanger may heat the water, which is sent to the economizer corresponding to the low-pressure evaporator having the lowest internal pressure among the one or more evaporators, up to a temperature that is higher than a dew-point temperature of the exhaust gas at an exhaust gas outlet of the economizer.

The condensation of moisture contained in the exhaust gas on the heat transfer pipe of the low-pressure economizer can be suppressed in the waste heat recovery device. For this reason, the corrosion of the heat transfer pipe of the economizer can be suppressed in the waste heat recovery device.

Further, any one of the above-mentioned waste heat recovery devices may further include a connected object cooler that cools a medium, which is present in a connected object connected to the gas turbine, by a connected object-cooling medium. The low-boiling-point medium Rankine cycle may include: an A-heater as the heater that heats the low-boiling-point medium by exchanging heat between the low-boiling-point medium, which is a liquid, and water, which is the liquid having passed through the heated water line; and a B-heater that heats the low-boiling-point medium and cools the connected object-cooling medium by exchanging heat between the low-boiling-point medium, which is a liquid, and the connected object-cooling medium, which is sent from the connected object cooler, and returns the connected object-cooling medium to the connected object cooler.

In the waste heat recovery device including the B-heater, the connected object cooler may include a lubricating oil cooler that cools a lubricating oil of a bearing, which rotatably supports a rotor of the gas turbine, by exchanging heat between the lubricating oil as the medium, which is present in the connected object, and the connected object-cooling medium and returns the cooled lubricating oil to the bearing.

Furthermore, in the waste heat recovery device including the B-heater, a generator, which generates electricity by the driving of the gas turbine, may be connected to the gas turbine; and the connected object cooler may include a generator cooler that cools a cooling medium, which cools a component of the generator, by exchanging heat between the cooling medium as the medium present in the connected object and the connected object-cooling medium, and returns the cooled cooling medium to the component of the generator.

In any one of the above-mentioned waste heat recovery devices, the low-boiling-point medium Rankine cycle may include the plurality of heaters.

The output of the low-boiling-point medium Rankine cycle can be increased in the waste heat recovery device.

In the waste heat recovery device of which the heated water system-heat exchanger includes the cooler, the low-boiling-point medium Rankine cycle may include the plurality of heaters, the heated water line may be provided for each of the plurality of heaters, and the coolers may be provided on one heated water line among the heated water lines provided for the respective plurality of heaters.

Any one of the above-mentioned waste heat recovery devices may further include the waste heat recovery boiler.

The waste heat recovery device including the waste heat recovery boiler may further include a steam turbine that is driven by steam generated by the waste heat recovery boiler.

In order to achieve the object, according to another aspect of the invention, a gas turbine plant includes the waste heat recovery device including the waste heat recovery boiler and the gas turbine.

In order to achieve the object, according to still another aspect of the invention, a waste heat recovery method includes: a Rankine cycle-performing step of circulating a low-boiling-point medium in a low-boiling-point medium Rankine cycle; a heated water-introducing step of guiding heated liquid water to the low-boiling-point medium Rankine cycle from a waste heat recovery boiler that heats water by exhaust gas generated from a gas turbine; and a water recovery step of returning water, which has been guided to the low-boiling-point medium Rankine cycle and has passed through the low-boiling-point medium Rankine cycle, to the waste heat recovery boiler. The Rankine cycle-performing step may include a heating step of heating the low-boiling-point medium by exchanging heat between water, which is the liquid introduced to the low-boiling-point medium Rankine cycle, and the low-boiling-point medium that is a liquid.

In the waste heat recovery method, heat is exchanged between the low-boiling-point medium, which is a liquid, and liquid water by the heating step of the Rankine cycle-performing step. Accordingly, the heat transfer area of a heater, which performs the heating step, can be reduced in comparison with a case in which heat is exchanged between a low-boiling-point medium and a gas. For this reason, it is possible to reduce the size of the heater and to reduce the size of the low-boiling-point medium Rankine cycle in the waste heat recovery device.

Here, in the waste heat recovery method, the waste heat recovery boiler may include at least one or more evaporators that generate steam by heating water by the exhaust gas, and economizers that are provided for the respective one or more evaporators and heat water, which is sent to the evaporators, by the exhaust gas; and liquid water, which is heated by either of the economizers provided for the respective one or more evaporators, may be guided to the low-boiling-point medium Rankine cycle in the heated water-introducing step.

In the waste heat recovery method that guides liquid water, which is heated by the economizer of the waste heat recovery boiler, to the low-boiling-point medium Rankine cycle, liquid water, which is heated by the economizer corresponding to the low-pressure evaporator having the lowest internal pressure among the one or more evaporators, may be guided to the low-boiling-point medium Rankine cycle in the heated water-introducing step.

Since a part of the water, which is heated by the low-pressure economizer corresponding to the low-pressure evaporator, is sent to the low-boiling-point medium Rankine cycle in the waste heat recovery method, the flow rate of water flowing through the low-pressure economizer is increased and the amount of heat to be exchanged between the exhaust gas and the water in the low-pressure economizer, that is, the amount of heat of the exhaust gas to be recovered can be increased. For this reason, in the waste heat recovery method, the heat of the low-temperature exhaust gas can be effectively used as the temperature of the exhaust gas present in the waste heat recovery boiler and the temperature of the exhaust gas flowing into the chimney can also be lowered.

In any one of the above-mentioned waste heat recovery methods, water, which has passed through the low-boiling-point medium Rankine cycle, may return to the waste heat recovery boiler through a water supply line, which supplies water to the waste heat recovery boiler, in the water recovery step.

In the waste heat recovery method, water circulates between the waste heat recovery boiler and the low-boiling-point medium Rankine cycle. For this reason, water, of which the temperature is higher than that in a case in which the water exchanging heat with the low-boiling-point medium does not circulate, can be supplied to the low-boiling-point medium Rankine cycle in the waste beat recovery method. Accordingly, the output of the low-boiling-point medium Rankine cycle can be increased in the waste heat recovery method. In addition, since the temperature of water, which is sent to the low-pressure economizer through the water supply line, becomes high, the condensation of moisture contained in the exhaust gas on the heat transfer pipe of the low-pressure economizer can be suppressed. For this reason, the corrosion of the heat transfer pipe of the economizer can be suppressed in the waste heat recovery method.

In the waste heat recovery method that returns the water, which has passed through the low-boiling-point medium Rankine cycle, to the waste heat recovery boiler through the water supply line, the waste heat recovery boiler may include at least one or more evaporators that generate steam by heating water by the exhaust gas, and economizers that are provided for the respective one or more evaporators and heat water, which is sent to the evaporators, by the exhaust gas; water, which has passed through the low-boiling-point medium Rankine cycle, may return to the economizer, which corresponds to the low-pressure evaporator having the lowest internal pressure among the one or more evaporators, through a water supply line, which supplies water to the waste heat recovery boiler, in the water recovery step; and a temperature of water, which is sent to the economizer corresponding to the low-pressure evaporator, may be a temperature that is higher than a dew-point temperature of the exhaust gas at an exhaust gas outlet of the economizer.

In the waste heat recovery method, water circulates between the low-pressure economizer of the waste heat recovery boiler and the low-boiling-point medium Rankine cycle. For this reason, water, of which the temperature is higher than that in a case in which the water exchanging heat with the low-boiling-point medium does not circulate, can be supplied to the low-boiling-point medium Rankine cycle in the waste heat recovery method. Accordingly, the output of the low-boiling-point medium Rankine cycle can be increased in the waste heat recovery method. In addition, since the temperature of water, which is sent to the low-pressure economizer through the water supply line, becomes high and is higher than the dew-point temperature of the exhaust gas at the exhaust gas outlet of the low-pressure economizer, the condensation of moisture contained in the exhaust gas on the heat transfer pipe of the low-pressure economizer can be suppressed. For this reason, the corrosion of the heat transfer pipe of the economizer can be suppressed in the waste heat recovery method.

Any one of the above-mentioned waste heat recovery methods may further include a water recovery system-heat exchange step of exchanging heat between the water, which returns to the waste heat recovery boiler in the water recovery step, and a medium.

In the waste heat recovery method including the water recovery system-heat exchange step, the water recovery system-heat exchange step may include a cooling step of heating the water, which returns to the waste heat recovery boiler in the water recovery step, and cooling an object to be cooled in the gas turbine by exchanging heat between the water and the object to be cooled.

Any one of the above-mentioned waste heat recovery methods may further include a heated water system-heat exchange step of cooling an object to be cooled in the gas turbine and heating water, which is guided to the low-boiling-point medium Rankine cycle in the heated water-introducing step, by exchanging heat between the water and the object to be cooled.

In the waste heat recovery method including the heated water system-heat exchange step, in the heated water system-heat exchange step, compressed air, which is taken from a compressor of the gas turbine, may be cooled by exchanging heat between a part of the compressed air as the object to be cooled and water, and the cooled compressed air may be sent to a high-temperature component that is in contact with combustion gas in the gas turbine.

Any one of the above-mentioned waste heat recovery methods may further include a water supply system-heat exchange step of cooling an object to be cooled in the gas turbine and heating water, which is present in a water supply line supplying water to the waste heat recovery boiler, by exchanging heat between the water and the object to be cooled.

In the waste heat recovery method including the water supply system-heat exchange step, the water supply system-heat exchange step may include at least one cooling step of an intermediate cooling step of cooling compressed air, which is taken from an intermediate stage of a compressor of the gas turbine, by exchanging heat between the compressed air as the object to be cooled and water and returning the cooled compressed air to the intermediate stage of the compressor or a rear portion of the intermediate stage; a lubricating oil-cooling step of cooling a lubricating oil, which flows out of a bearing rotatably supporting a rotor of the gas turbine, by exchanging heat between the lubricating oil as the object to be cooled and water and returning the cooled lubricating oil to the bearing; and an air-cooling step of cooling compressed air, which is taken from a compressor of the gas turbine, by exchanging heat between a part of the compressed air as the object to be cooled and water and sending the cooled compressed air to a high-temperature component, which is in contact with combustion gas in the gas turbine.

In the waste heat recovery method of which the water supply system-heat exchange step includes the cooling step, a generator, which generates electricity by the driving of the gas turbine, may be connected to the gas turbine, and the water supply system-heat exchange step may include a generator-cooling step of cooling a cooling medium, which cools a component of the generator, by exchanging heat between the cooling medium as the object to be cooled and water.

In the waste heat recovery method of which the water supply system-heat exchange step includes the cooling step, the water supply system-heat exchange step may include a plurality of cooling steps including the intermediate cooling step, and water, which is heated in the cooling step other than the intermediate cooling step, may be heated in the intermediate cooling step.

In the waste heat recovery method including the water supply system-heat exchange step, the waste heat recovery boiler may include at least one or more evaporators that generate steam by heating water by the exhaust gas, and economizers that are provided for the respective one or more evaporators and heat water, which is sent to the evaporators, by the exhaust gas; the water supply system-heat exchange step may include one or more cooling steps of cooling an object to be cooled in the gas turbine and heating water, which is present in the water supply line supplying water to the waste heat recovery boiler, by exchanging heat between the water and the object to be cooled, and may include an intermediate cooling step of cooling compressed air, which is taken from an intermediate stage of a compressor of the gas turbine, by exchanging heat between the compressed air as the object to be cooled and water and returning the cooled compressed air to the intermediate stage of the compressor or a rear portion of the intermediate stage, as the cooling step; and among the one or more cooling steps, the intermediate cooling step may form the cooling step provided on the most downstream side on the water supply line, and heat may be exchanged between the object to be cooled, of which the temperature is lower than the saturation temperature of water present in a low-pressure evaporator having the lowest internal pressure among the one or more evaporators, and the water in the intermediate cooling step.

In any one of the above-mentioned waste heat recovery methods including the water supply system-heat exchange step, the waste heat recovery boiler may include at least one or more evaporators that generate steam by heating water by the exhaust gas, and economizers that are provided for the respective one or more evaporators and heat water, which is sent to the evaporators, by the exhaust gas; and the water, which is sent to the economizer corresponding to the low-pressure evaporator having the lowest internal pressure among the one or more evaporators, may be heated up to a temperature, which is higher than a dew-point temperature of the exhaust gas at an exhaust gas outlet of the economizer, in the water supply system-heat exchange step.

Further, any one of the above-mentioned waste heat recovery methods may further include a connected object-cooling step of cooling a medium, which is present in a connected object connected to the gas turbine, by a connected object-cooling medium; and the Rankine cycle-performing step may include an A-heating step as the heating step of heating the low-boiling-point medium by exchanging heat between the low-boiling-point medium, which is a liquid, and water, which is the liquid, and a B-heating step of heating the low-boiling-point medium and cooling the connected object-cooling medium by exchanging heat between the low-boiling-point medium, which is a liquid, and the connected object-cooling medium, which is heated by the connected object-cooling step, and returning the connected object-cooling medium to the connected object cooler.

In any one of the above-mentioned waste heat recovery methods, the Rankine cycle-performing step may include the plurality of heating steps of heating the low-boiling-point media of which temperatures are different from each other.

Advantageous Effects of Invention

In an aspect of the invention, waste heat emitted from a gas turbine can be effectively used by the low-boiling-point medium Rankine cycle. In another aspect of the invention, heat is exchanged between a low-boiling-point medium, which is a liquid, and liquid water by the heater of the low-boiling-point medium Rankine cycle. Accordingly, the heat transfer area of a heater can be reduced in comparison with a case in which heat is exchanged between a low-boiling-point medium and a gas. For this reason, according to an aspect of the invention, it is possible to reduce the size of a heater and to reduce the size of a Rankine cycle.

DESCRIPTION OF EMBODIMENTS

Gas turbine plants according to various embodiments of the invention will be described below with reference to the drawings.

First Embodiment

A gas turbine plant according to a first embodiment of the invention will be described with reference to FIGS. 1 to 3.

Figure 1:
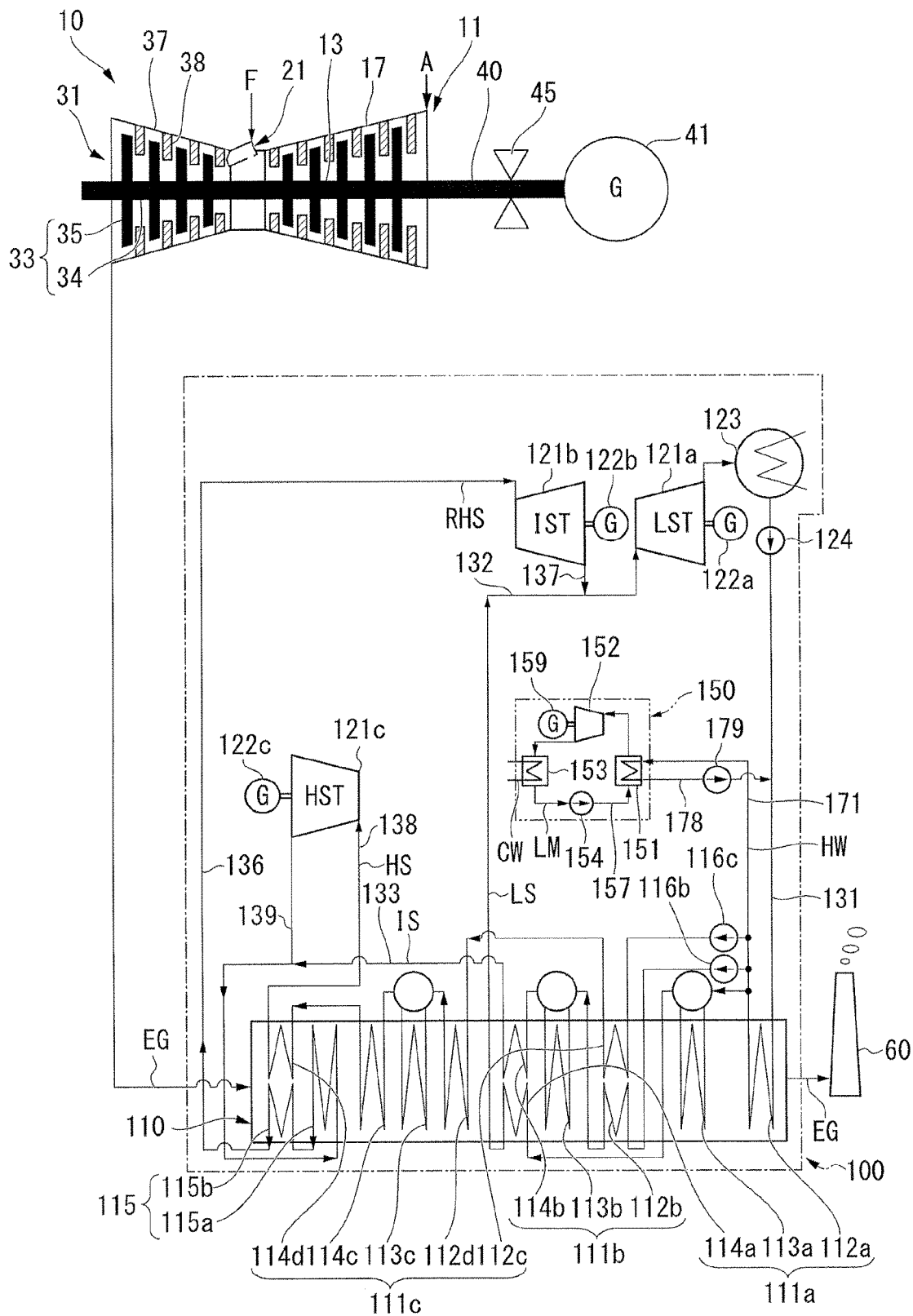
FIG. 1 is a system diagram of a gas turbine plant according to a first embodiment of the invention.

As shown in FIG. 1, the gas turbine plant of this embodiment includes a gas turbine 10, a generator 41 that generates electricity by the driving of the gas turbine 10, a waste heat recovery device 100 that recovers the heat of exhaust gas EG discharged from the gas turbine 10, and a chimney 60 that discharges the exhaust gas EG having passed through the waste heat recovery device 100 to the atmosphere.

The gas turbine 10 includes a compressor 11 that compresses air A, a combustor 21 that generates combustion gas by combusting fuel F in the air compressed by the compressor 11, and a turbine 31 that is driven by the combustion gas having a high temperature and a high pressure.

The compressor 11 includes a compressor rotor 13 that is rotated about an axis and a compressor casing 17 that rotatably covers the compressor rotor 13.

The turbine 31 includes a turbine rotor 33 that is rotated about an axis by the combustion gas generated from the combustor 21 and a turbine casing 37 that rotatably covers the turbine rotor 33. The turbine rotor 33 includes a rotor shaft 34 that extends in an axial direction parallel to the axis and a plurality of turbine blades 35 that are fixed to the outer periphery of the rotor shaft 34. A plurality of turbine vanes 38 are fixed to the inner peripheral surface of the turbine casing 37. A combustion gas passage through which combustion gas generated from the combustor 21 passes is formed between the inner peripheral surface of the turbine casing 37 and the outer peripheral surface of the rotor shaft 34.

The combustor 21 is fixed to the turbine casing 37. The turbine rotor 33 and the compressor rotor 13 are rotated about the same axis, are coupled to each other, and form a gas turbine rotor 40. A rotor of the above-mentioned generator 41 is connected to the gas turbine rotor 40. The gas turbine rotor 40 is rotatably supported by a bearing 45.

The waste heat recovery device 100 includes: a waste heat recovery boiler 110 that generates steam by the heat of the combustion gas having driven the turbine 31, that is, the exhaust gas EG discharged from the gas turbine 10; steam turbines 121a, 121b, and 121c that are driven by the steam generated by the waste heat recovery boiler 110; generators 122a, 122b, and 122c that generate electricity by the driving of the steam turbines 121a, 121b, and 121c; a steam condenser 123 that changes the steam having driven the steam turbine 121a into water; a water supply pump 124 that returns the water present in the steam condenser 123 to the waste heat recovery boiler 110; and a low-boiling-point medium Rankine cycle 150 in which a low-boiling-point medium circulates.

The waste heat recovery device 100 includes a low-pressure steam turbine 121a, an intermediate-pressure steam turbine 121b, and a high-pressure steam turbine 121c as the steam turbines 121a, 121b, and 121c. The generators 122a, 122b, and 122c are connected to the low-pressure steam turbine 121a, the intermediate-pressure steam turbine 121b, and the high-pressure steam turbine 121e, respectively. Here, the generators 122a, 122b, and 122c have been connected to the steam turbines 121a, 121 b, and 121c, respectively, but the rotor of the low-pressure steam turbine 121a, the rotor of the intermediate-pressure steam turbine 121b, and the rotor of the high-pressure steam turbine 121c may be connected to each other and one generator may be connected to a total of the three steam turbines.

The waste heat recovery boiler 110 includes a low-pressure steam generating unit 111a that generates low-pressure steam LS, an intermediate-pressure steam generating unit 111b that generates intermediate-pressure steam IS, a high-pressure steam generating unit 111e that generates high-pressure steam HS, and a reheating unit 115 that superheats the steam having driven the high-pressure steam turbine 121c again.

The low-pressure steam generating unit 111a includes a low-pressure economizer 112a that heats water, a low-pressure evaporator 113a that changes the water heated by the low-pressure economizer 112a into steam, and a low-pressure superheater 114a that generates the low-pressure steam LS by superheating the steam generated by the low-pressure evaporator 113a.

The intermediate-pressure steam generating unit 111b includes an intermediate-pressure pump 116b that increases the pressure of the water heated by the low-pressure economizer 112a, an intermediate-pressure economizer 112b that heats the water of which the pressure has been increased by the intermediate-pressure pump 116b, an intermediate-pressure evaporator 113b that changes the water heated by the intermediate-pressure economizer 1121, into steam, and an intermediate-pressure superheater 114b that generates the intermediate-pressure steam IS by superheating the steam generated by the intermediate-pressure evaporator 113b.

The high-pressure steam generating unit 111c includes a high-pressure pump 116c that increases the pressure of the water heated by the low-pressure economizer 112a, a first high-pressure economizer 112c that heats the water of which the pressure has been increased by the high-pressure pump 116e, a second high-pressure economizer 112d that further heats the water heated by the first high-pressure economizer 112e, a high-pressure evaporator 113e that changes the water heated by the second high-pressure economizer 112d into steam, a first high-pressure superheater 114c that superheats the steam generated by the high-pressure evaporator 113e, and a second high-pressure superheater 114d that generates the high-pressure steam HS by further superheating the steam superheated by the first high-pressure superheater 114c.

The reheating unit 115 includes a first reheater 115a that heats the steam having driven the high-pressure steam turbine 121c, and a second reheater 115b that generates reheated steam RHS by further superheating the steam superheated by the first reheater 115a.

Elements of the reheating unit 115, the high-pressure steam generating unit 111c, the intermediate-pressure steam generating unit 111b, and the low-pressure steam generating unit 111a, that is, the second reheater 115b, the second high-pressure superheater 114d, the first reheater 115a, the first high-pressure superheater 114c, the high-pressure evaporator 113c, the second high-pressure economizer 112d, the intermediate-pressure superheater 114b, the low-pressure superheater 114a, the intermediate-pressure evaporator 113b, the first high-pressure economizer 112c, the intermediate-pressure economizer 112b, the low-pressure evaporator 113a, and the low-pressure economizer 112a are arranged in this order toward the downstream side of the exhaust gas EG directed to the chimney 60 from the turbine 31.

The steam condenser 123 and the low-pressure economizer 112a are connected to each other by a water supply line 131. The above-mentioned water supply pump 124 is provided on the water supply line 131. The low-pressure superheater 114a and a steam inlet of the low-pressure steam turbine 121a are connected to each other by a low-pressure steam line 132 that sends the low-pressure steam LS generated from the low-pressure superheater 114a to the low-pressure steam turbine 121a. A steam outlet of the low-pressure steam turbine 121a and the steam condenser 123 are connected to each other so that the low-pressure steam LS having driven the low-pressure steam turbine 121a is supplied to the steam condenser 123. The second high-pressure superheater 114d and a steam inlet of the high-pressure steam turbine 121c are connected to each other by a high-pressure steam line 138 that sends the high-pressure steam HS generated from the second high-pressure superheater 114d to the high-pressure steam turbine 121c. A steam outlet of the high-pressure steam turbine 121c and a steam inlet of the first reheater 115a are connected to each other by a high-pressure steam recovery line 139 that sends the high-pressure steam HS generated from the high-pressure steam turbine 121c to the first reheater 115a. A steam outlet of the second reheater 115b and a steam inlet of the intermediate-pressure steam turbine 121b are connected to each other by a reheated steam line 136 that sends the steam superheated by the second reheater 115b to the intermediate-pressure steam turbine 121b as the reheated steam RHS. An intermediate-pressure steam recovery line 137 is connected to a steam outlet of the intermediate-pressure steam turbine 121b. The intermediate-pressure steam recovery line 137 joins the low-pressure steam line 132. An intermediate-pressure steam line 133 is connected to a steam outlet of the intermediate-pressure superheater 114b. The intermediate-pressure steam line 133 joins the high-pressure steam recovery line 139.

A Rankine cycle is a cycle that drives a turbine with steam. The low-boiling-point medium Rankine cycle 150 is a cycle that drives a turbine 152 by using a medium LM of which the boiling point is lower than the boiling point of water (hereinafter, referred to as a low-boiling-point medium).

For example, the following materials may be used as the low-boiling-point medium LM.

Organic halogen compounds, such as trichloroethylene, tetrachloroethylene, monochlorobenzene, dichlorobenzene, and perfluorodecaline Alkanes, such as butane, propane, pentane, hexane, heptane, octane, and decane Cyclic alkanes, such as cyclopentane and cyclohexane Thiophene, ketone, and an aromatic compound Refrigerants, such as R134a and R245fa Combinations of the above-mentioned materials The low-boiling-point medium Rankine cycle (hereinafter, simply referred to as a Rankine cycle) 150 includes: an evaporator (heater) 151 that heats and evaporates the low-boiling-point medium LM, which is a liquid; a turbine 152 that is driven by the evaporated low-boiling-point medium LM; a condenser 153 that cools and condenses the low-boiling-point medium LM having driven the turbine 152; a low-boiling-point medium pump 154 that returns the condensed low-boiling-point medium LM to the evaporator 151; and a low-boiling-point medium line 157 that allows the low-boiling-point medium LM to flow between the above-mentioned elements. For example, a generator 159, which generates electricity by the driving of the turbine 152, is connected to the turbine 152. The condenser 153 is a form of a heat exchanger, and exchanges heat between the low-boiling-point medium LM and a cooling medium CW, such as water. Further, the evaporator (heater) 151 is also a form of a heat exchanger, and exchanges heat between the low-boiling-point medium LM, which is a liquid, and liquid water HW that is heated by the waste heat recovery boiler 110.

A heated water inlet of the evaporator 151 of the Rankine cycle 150 and a heated water outlet of the low-pressure economizer 112a are connected to each other by a heated water line 171. A heated water outlet of the evaporator 151 and the water supply line 131 are connected to each other by a water recovery line 178. The water recovery line 178 is connected to a portion of the water supply line 131 that corresponds to a position between the water supply pump 124 and the low-pressure economizer 112a. A circulation pump 179, which returns water passing through the water recovery line 178 to the low-pressure economizer 112a through the water supply line 131, is provided on the water recovery line 178.

Next, the operation of the gas turbine plant of this embodiment will be described.

The compressor 11 of the gas turbine 10 compresses air A and supplies the compressed air A to the combustor 21. Further, fuel F is also supplied to the combustor 21. The fuel F is combusted in the compressed air A in the combustor 21, so that combustion gas having a high temperature and a high pressure is generated. This combustion gas is sent to the combustion gas passage, which is provided in the turbine from the combustor 21 and rotates the turbine rotor 33. The generator 41, which is connected to the gas turbine 10, generates electricity by the rotation of the turbine rotor 33.

The combustion gas, which has rotated the turbine rotor 33, is discharged from the gas turbine 10 as the exhaust gas EG and is discharged to the atmosphere from the chimney 60 through the waste heat recovery boiler 110. The waste heat recovery device 100 recovers the heat of the exhaust gas EG while the exhaust gas EG discharged from the gas turbine 10 passes through the waste heat recovery boiler 110.

Water is supplied to the low-pressure economizer 112a, which is positioned on the most downstream side (the side close to the chimney 60), from the water supply line 131 in the waste heat recovery boiler 110. The low-pressure economizer 112a heats the water by exchanging heat between the water and the exhaust gas EG. A part of the water, which is heated by the low-pressure economizer 112a, is further heated by the low-pressure evaporator 113a and becomes steam. This steam is further superheated by the low-pressure superheater 114a and is supplied to the low-pressure steam turbine 121a through the low-pressure steam line 132 as the low-pressure steam LS. The steam, which has driven the low-pressure steam turbine 121a, is changed into water by the steam condenser 123. The pressure of water, which is present in the steam condenser 123, is increased by the water supply pump 124, and the water is sent to the low-pressure economizer 112a of the waste heat recovery boiler 110 through the water supply line 131.

The pressure of the other part of the water, which is heated by the low-pressure economizer 112a, is increased by the intermediate-pressure pump 116b and the other part of the water is sent to the intermediate-pressure economizer 112b; and the pressure of another part of the water, which is heated by the low-pressure economizer 112a, is increased by the high-pressure pump 116c and another part of the water is sent to the first high-pressure economizer 112e. The rest of the water, which is heated by the low-pressure economizer 112a, is sent to the Rankine cycle 150 through the heated water line 171 (heated water-introducing step).

The first high-pressure economizer 112c heats the water, which is sent from the high-pressure pump 116c, by exchanging heat between the water and the exhaust gas EG. The water, which is heated by the first high-pressure economizer 112c, is further heated by the second high-pressure economizer 112d. The water is further heated by the high-pressure evaporator 113c and becomes steam. This steam is further superheated by the first high-pressure superheater 114c and the second high-pressure superheater 114d and becomes the high-pressure steam HS. The high-pressure steam HS is supplied to the high-pressure steam turbine 121c through the high-pressure steam line 138, and drives the high-pressure steam turbine 121c. The steam, which has driven the high-pressure steam turbine 121c, is sent to the first reheater 115a through the high-pressure steam recovery line 139.

The intermediate-pressure economizer 112b heats the water, which is sent from the intermediate-pressure pump 116b, by exchanging heat between the water and the exhaust gas EG. The water, which is heated by the intermediate-pressure economizer 112b, is further heated by the intermediate-pressure evaporator 113b and becomes steam. This steam is further superheated by the intermediate-pressure superheater 114b and becomes the intermediate-pressure steam IS. The intermediate-pressure steam IS joins steam, which flows in the high-pressure steam recovery line 139, through the intermediate-pressure steam line 133, and is superheated again by the first reheater 115a and the second reheater 115b and becomes the reheated steam RHS. The reheated steam RHS is supplied to the intermediate-pressure steam turbine 121b through the reheated steam line 136.

The reheated steam RHS, which has driven the intermediate-pressure steam turbine 121b, is supplied to the low-pressure steam turbine 121a through the intermediate-pressure steam recovery line 137 and the low-pressure steam line 132.

Liquid water HW, which is heated by the low-pressure economizer 112a, flows into the evaporator 151 from the heated water inlet of the evaporator 151 of the Rankine cycle 150 through the heated water line 171. The evaporator 151 heats the low-boiling-point medium LM by exchanging heat between the low-boiling-point medium LM, which is a liquid, and the liquid water HW, which is heated by the low-pressure economizer 112a, and evaporates the low-boiling-point medium LM (heating step). In this process, the water HW is cooled and flows out of the heated water outlet of the evaporator 151. The pressure of the water which flows out of the heated water outlet of the evaporator 151 is increased by the circulation pump 179. The water flows into the water supply line 131 through the water recovery line 178. This water is mixed with water sent from the steam condenser 123, flows in the water supply line 131, and returns to the low-pressure economizer 112a (water recovery step).

The low-boiling-point medium LM, which is evaporated by the evaporator 151, drives the turbine 152 that is a component of the Rankine cycle 150. The low-boiling-point medium LM, which has driven the turbine 152, is sent to the condenser 153. In the condenser 153, heat is exchanged between the low-boiling-point medium LM and the cooling medium CW and the low-boiling-point medium LM is cooled and condensed. The condensed low-boiling-point medium LM is sent to the evaporator 151 by the low-boiling-point medium pump 154 and exchanges heat with the water HW in the evaporator 151 as described above. As described above, the low-boiling-point medium LM circulates in the Rankine cycle 150 (Rankine cycle-performing step).

Since the evaporator 151 of this embodiment exchanges heat between the low-boiling-point medium LM, which is a liquid, and the liquid water HW as described above, the heat transfer area of the evaporator 151 can be made smaller than that in a case in which heat is exchanged between the low-boiling-point medium LM, which is a liquid, and a gas. As a result, the size of the evaporator 151, eventually, the size of the Rankine cycle 150 can be reduced in this embodiment. Accordingly, in this embodiment, a low-boiling-point medium Rankine cycle can be relatively easily introduced to an existing waste heat recovery device restricted by an installation space or the like.

Further, in this embodiment, the water HT, which is heated by the low-pressure economizer 112a, circulates through the heated water line 171, the evaporator 151, the water recovery line 178, the water supply line 131, and the low-pressure economizer 112a. For this reason, water, of which the temperature is higher than that in a case in which the water exchanging heat with the low-boiling-point medium LM does not circulate, can be supplied to the Rankine cycle 150 in this embodiment. Accordingly, the output of the Rankine cycle 150 can be increased in this embodiment.

Furthermore, since a part of the water, which is heated by the low-pressure economizer 112a, is sent to the Rankine cycle 150 in this embodiment, the flow rate of water flowing through the low-pressure economizer 112a is increased and the amount of heat to be exchanged between the exhaust gas EG and the water in the low-pressure economizer 112a, that is, the amount of heat of the exhaust gas EG to be recovered can be increased. For this reason, in this embodiment, the heat of the low-temperature exhaust gas EG in the waste heat recovery boiler 110 can be effectively used and the temperature of the exhaust gas EG flowing into the chimney 60 can also be lowered.

Here, the effective use of the heat of the exhaust gas EG having been described above will be described in more detail with reference to FIGS. 2 and 3. In the following description, for the simplification of description, the waste heat recovery boiler 110 includes only one steam generating unit (for example, the low-pressure steam generating unit) as the steam generating unit and the steam turbine includes only one steam turbine (for example, the low-pressure steam turbine) that is driven by the steam generated from the one steam generating unit.

Figure 2:
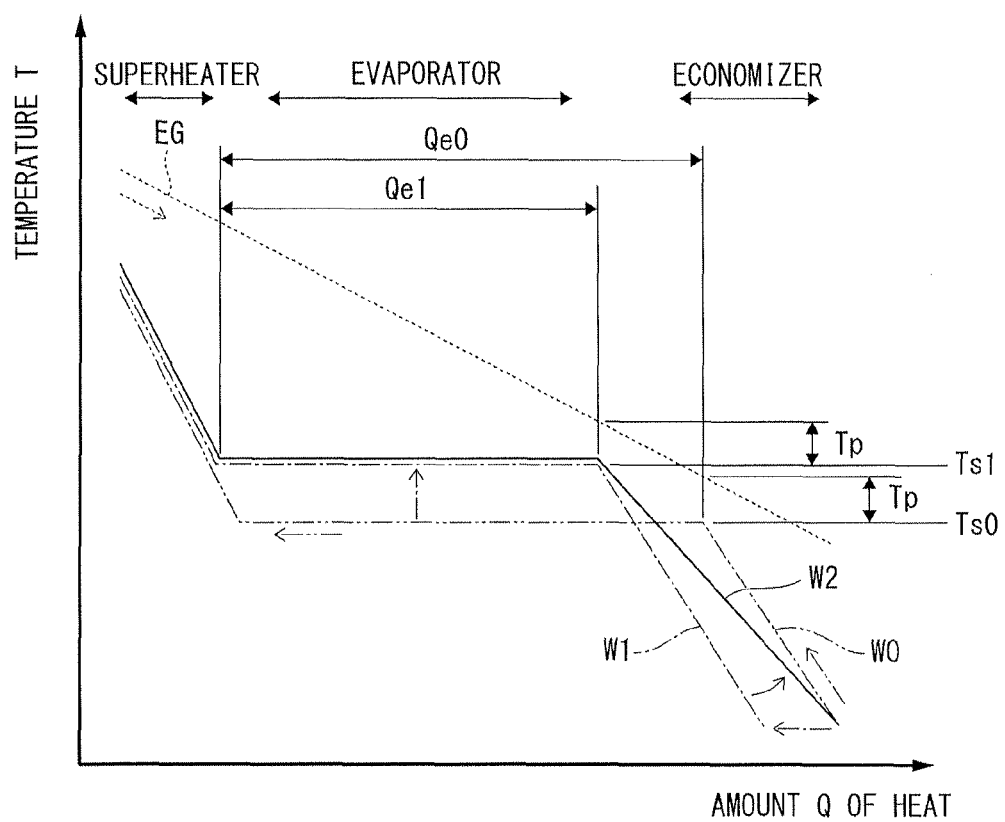
FIG. 2 is a T-Q diagram (a first T-Q diagram) illustrating the effects of the first embodiment of the invention and showing a relationship between the amount of heat and the temperature of each of exhaust gas and water (including steam) in a waste heat recovery boiler that are associated with the flow of the exhaust gas and the flow of the water.
Figure 3:
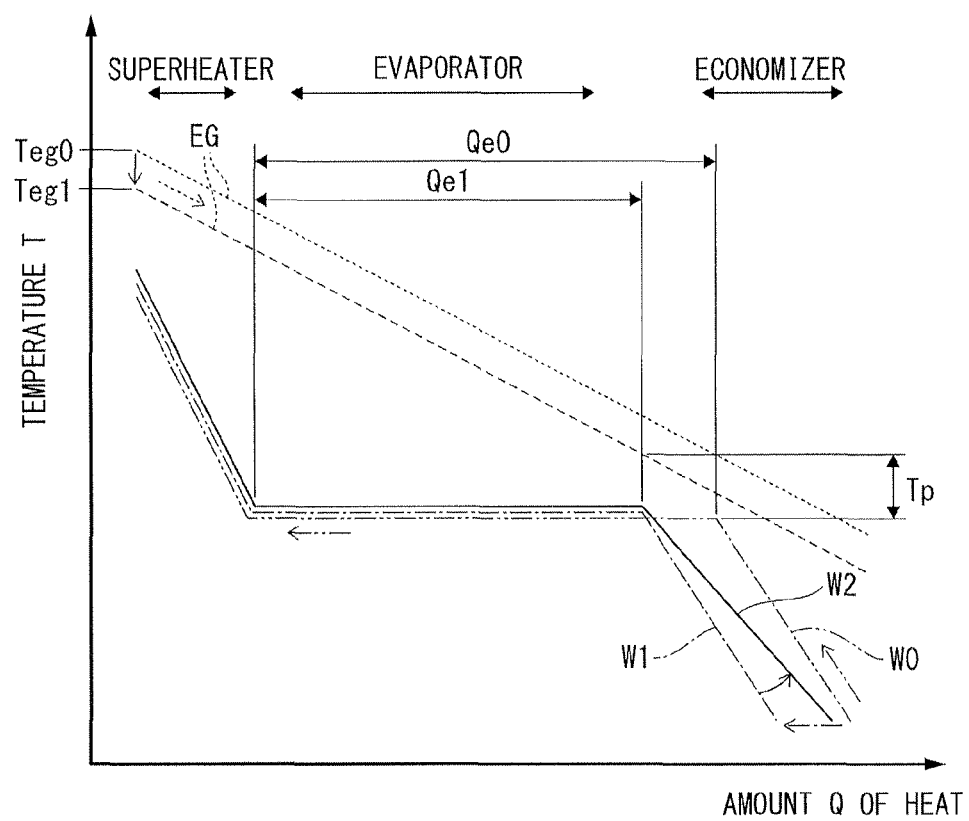
FIG. 3 is a T-Q diagram (a second T-Q diagram) illustrating the effects of the first embodiment of the invention and showing a relationship between the amount of heat and the temperature of each of exhaust gas and water (including steam) in the waste heat recovery boiler that are associated with the flow of the exhaust gas and the flow of the water.
Figure 4:
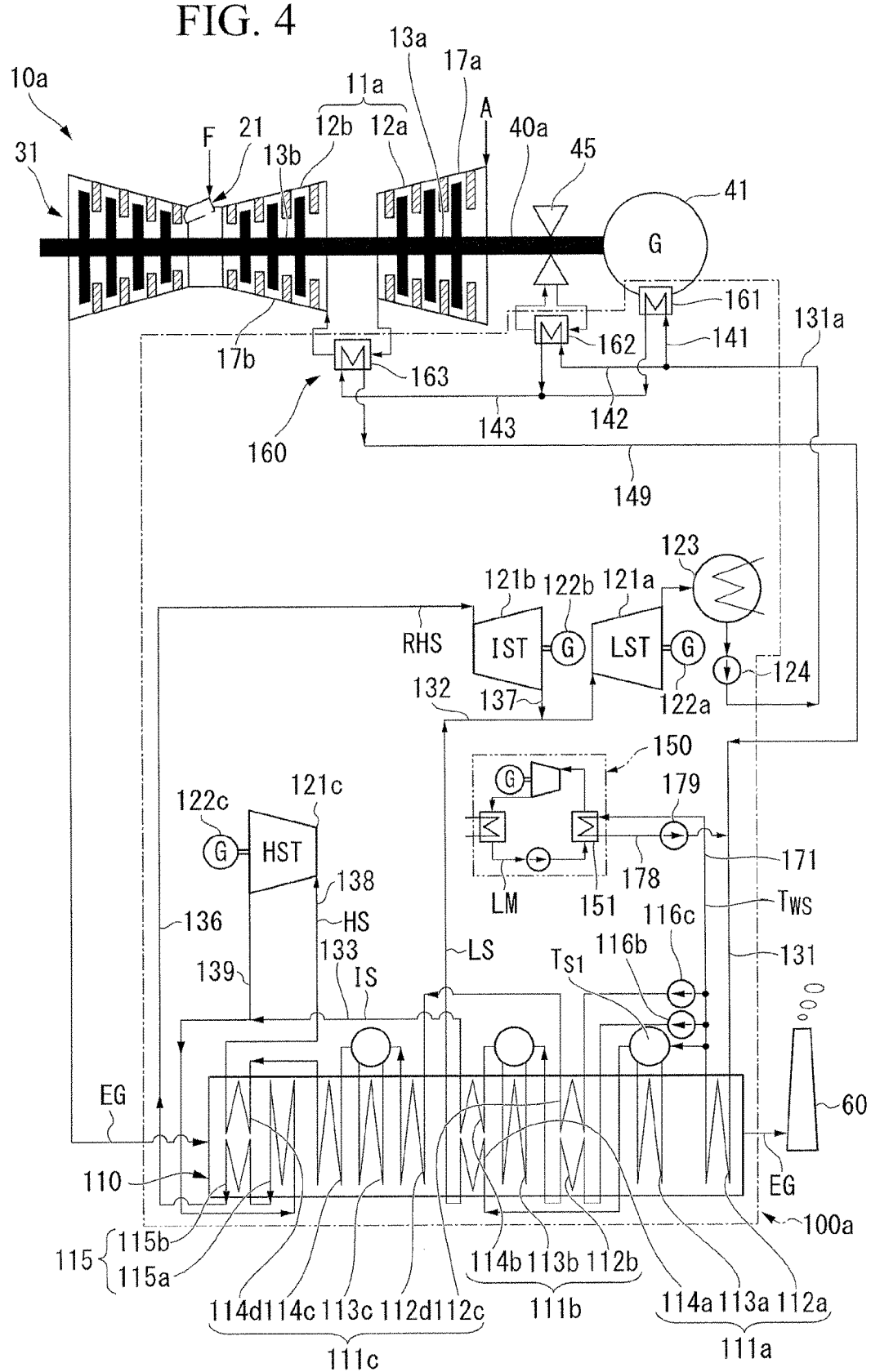
FIG. 4 is a system diagram of a gas turbine plant according to a second embodiment of the invention.

FIGS. 2 and 3 are T-Q diagrams showing a relationship between the amount of heat and the temperature of each of exhaust gas EG and water (including steam) flowing in the waste heat recovery boiler 110 that are associated with the flow of the exhaust gas EG and the flow of the water. These T-Q diagrams show the relationship between the amount of heat and the temperature of each of the exhaust gas EG and water (including steam), which are associated with the flow of the exhaust gas EG and the flow of the water, in a qualitative manner and do not show the relationship in a quantitative manner. In these T-Q diagrams, the value of the amount Q of heat of a horizontal axis is increased toward the left side.

The temperature of the exhaust gas EG is gradually lowered and the amount of heat of the exhaust gas EG is gradually decreased as the exhaust gas EG flows to the downstream side. Since water (including steam) W0 flowing in the waste heat recovery boiler 110 exchanges heat with the exhaust gas EU, the temperature of the water W0 is gradually raised and the amount of heat of the water W0 is gradually increased as the water W0 flows to the upstream side the upstream side in the flow of the exhaust gas EG). Specifically, while the water W0, which flows into the economizer, passes through the economizer, the temperature of the water W0 is gradually raised and the amount of heat of the water W0 is gradually increased. The water W0, which is heated by the economizer, flows into the evaporator. In the evaporator, the temperature of the water W0 is maintained at a saturation temperature Ts0 of water in the evaporator but the amount of heat of the water W0 is increased. Accordingly, the water W0 becomes steam. The steam flows into the superheater. In the superheater, the temperature of the steam is raised and the amount of heat of the steam is increased.

It is supposed that the pressure of steam is increased to increase the output of the steam turbine. In this case, the temperature, that is, the saturation temperature of water W1 present in the evaporator is raised to Ts1 from Ts0 as shown in FIG. 2. At this time, when a pinch temperature difference Tp, which is a difference between the temperature of water W1 and the temperature of the exhaust gas EG at the outlet of the evaporator, is made to be equal to a pinch temperature difference, which is obtained before an increase in the pressure of steam, the amount of heat to be exchanged between the water W1 and the exhaust gas EG in the evaporator is decreased to Qe1 from Qe0. As a result, the amount of steam to be generated in the evaporator is decreased. As the amount of steam to be generated is further decreased, the amount of water W1 to flow into the economizer and the evaporator is also decreased. When the flow rate of the water W1 flowing into the economizer is reduced, the amount of heat to be exchanged between the water W1 and the exhaust gas EG in the economizer is decreased. Accordingly, the heat of the low-temperature exhaust gas EG, which has been used before an increase in the pressure of steam, cannot be used. For this reason, the rate of utilization of the heat of the exhaust gas EG is reduced and the temperature of the exhaust gas EG flowing into the chimney is also raised. Accordingly, an effect of increasing the output and efficiency of the plant, which is caused by an increase in the pressure of steam, is offset by a decrease in the output and efficiency or the plant that is caused by the reduction of the rate of utilization of the heat of the exhaust gas EG. As a result, an effect of increasing the output and efficiency of the plant is reduced.

Accordingly, when the above-mentioned Rankine cycle 150 is introduced, the flow rate of water W2 flowing into the economizer is increased as much as water that is used in the Rankine cycle 150 as described above. When the flow rate of the water W2 flowing in the economizer is increased, the rate of temperature rise, which is obtained while the water W2 passes through the economizer, (the amount of temperature rise obtained when a unit amount of heat is applied) is lowered. In this case, in the economizer, heat is exchanged between the water W2 and the low-temperature exhaust gas EG of which the temperature is lower than the temperature of the exhaust gas EG obtained before the introduction of the Rankine cycle 150. For this reason, when the Rankine cycle 150 is introduced, the heat of the low-temperature exhaust gas EG can be effectively used as the temperature of the exhaust gas EG present in the waste heat recovery boiler 110 and the temperature of the exhaust gas EG flowing into the chimney 60 can also be lowered. Since the heat of the low-temperature exhaust gas EG is effectively used, an increase in the amount of heat of the exhaust gas EG to be recovered is used to heat the low-boiling-point medium LM. Accordingly, the heat of the exhaust gas EG can be effectively used in this embodiment. As a result, the output and efficiency of the plant can be increased.

Further, it is supposed that the pressure ratio of the gas turbine is increased to increase the output of the gas turbine. In this case, the temperature of the exhaust gas EG to be discharged from the gas turbine is lowered to Teg1 from Teg0 as shown in FIG. 3. Even at this time, when a pinch temperature difference Tp, which is a difference between the temperature of the water W1 and the temperature of the exhaust gas EG at the outlet of the evaporator, is made to be equal to a pinch temperature difference, which is obtained before an increase in the pressure ratio of the gas turbine, the amount of heat to be exchanged between the water W1 and the exhaust gas EG in the evaporator is decreased to Qe1 from Qe0. As a result, the amount of steam generated by the evaporator and the flow rate of the water W1 flowing into the economizer and the evaporator are decreased as in the above-mentioned case. When the flow rate of the water W1 flowing into the economizer is reduced, the amount of heat to be exchanged between the water W1 and the exhaust gas EG in the economizer is decreased. Accordingly, the rate of utilization of the heat of the exhaust gas EG is reduced and the temperature of the exhaust gas EG flowing into the chimney 60 is also raised. Accordingly, an effect of increasing the output and efficiency of the plant, which is caused by an increase in the pressure ratio of the gas turbine, is offset by a decrease in the output and efficiency of the plant that is caused by the reduction of the rate of utilization of the heat of the exhaust gas EG. As a result, an effect of increasing the output and efficiency of the plant is reduced.

Accordingly, when the above-mentioned Rankine cycle 150 is introduced even in this case, the flow rate of water W2 flowing into the economizer is increased as much as water that is used in the Rankine cycle 150. When the flow rate of the water W2 flowing in the economizer is increased, the rate of temperature rise, which is obtained while the water W2 passes through the economizer, (the amount of temperature rise obtained when a unit amount of heat is applied) is lowered. For this reason, in the economizer, heat is exchanged between the water and the low-temperature exhaust gas EG of which the temperature is lower than the temperature of the exhaust gas EG obtained before the introduction of the Rankine cycle 150. Accordingly, when the Rankine cycle 150 is introduced, the heat of the low-temperature exhaust gas EG can be effectively used as the temperature of the exhaust gas EG present in the waste heat recovery boiler 110 and the temperature of the exhaust gas EG flowing into the chimney 60 can also be lowered. Since the heat of the low-temperature exhaust gas EG is effectively used, an increase in the amount of heat of the exhaust gas EG to be recovered is used to heat the low-boiling-point medium LM. Accordingly, the heat of the exhaust gas EG can be effectively used in this embodiment. As a result, the output and efficiency of the plant can be increased.

Second Embodiment

A gas turbine plant according to a second embodiment of the invention ill be described with reference to FIGS. 4 to 9.

As in the first embodiment, the gas turbine plant of this embodiment also includes a gas turbine 10a, a generator 41 that generates electricity by the driving of the gas turbine 10a, a waste heat recovery device 100a that recovers the heat of exhaust gas EG discharged from the gas turbine 10a, and a chimney 60 that discharges the exhaust gas EG having passed through the waste heat recovery device 100a to the atmosphere.

As in the first embodiment, the gas turbine 10a of this embodiment also includes a compressor 11a, a combustor 21, and a turbine 31. The compressor 11a of this embodiment includes a low-pressure compressor 12a that compresses air, and a high-pressure compressor 12b that further compresses the air compressed by the low-pressure compressor 12a and sends the air to the combustor 21. The gas turbine 10a of this embodiment further includes an intercooler 163 that cools the air compressed by the low-pressure compressor 12a by exchanging heat between the air and water and sends the cooled air to the high-pressure compressor 12b. That is, in the compressor 11a of this embodiment, the compressed air is bled from the intermediate stage of the compressor 11a and is cooled by the intercooler 163 and the cooled compressed air then returns to the intermediate stage of the compressor 11a or the rear side of the intermediate stage.

The low-pressure compressor 12a and the high-pressure compressor 12b include compressor rotors 13a and 13b that are rotated about an axis, and compressor casings 17a and 17b that rotatably cover the compressor rotors 13a and 13b, respectively. The compressor rotor 13a of the low-pressure compressor 12a and the compressor rotor 13b of the high-pressure compressor 12b are rotated about the same axis, and form a part of gas turbine rotors 40a coupled to each other. A rotor of the generator 41 is connected to the gas turbine rotor 40a. The rotor and a stator of the generator 41 are cooled by a cooling medium, such as hydrogen. For this purpose, the generator 41 is provided with a generator cooler 161 that cools the cooling medium by exchanging heat between the cooling medium and water. The gas turbine rotor 40a is rotatably supported by a bearing 45. The bearing 45 is provided with a lubricating oil cooler 162 that cools a lubricating oil by exchanging heat between the lubricating oil sent from the bearing 45 and water and returns the lubricating oil to the bearing 45.

As in the case of the waste heat recovery device 100 of the first embodiment, the waste heat recovery device 100a of this embodiment includes a waste heat recovery boiler 110, steam turbines 121a, 121b, and 121c, generator 122a, 122b, and 122c, a steam condenser 123, a water supply pump 124, and a Rankine cycle 150. The waste heat recovery device 100a of this embodiment further includes a water supply system-heat exchanger 160. The water supply system-heat exchanger 160 includes the generator cooler 161, the lubricating oil cooler 162, and the intercooler 163 that have been described above. For this reason, the intercooler 163 forms a component of the gas turbine 10a and forms a component of the waste heat recovery device 100a.

A water supply line 131a of this embodiment is branched into two lines on the downstream side of the water supply pump 124. One line forms a first cooling water line 141 and the other line forms a second cooling water line 142. The first cooling water line 141 is connected to a water inlet of the generator cooler 161. The second cooling water line 142 is connected to a water inlet of the lubricating oil cooler 162. Third cooling water lines 143 are connected to a water outlet of the generator cooler 161 and a water outlet of the lubricating oil cooler 162, respectively. The third cooling water lines 143, which are connected to the respective water outlets, join and are connected to a water inlet of the intercooler 163. A preheated water supply line 149 is connected to a water outlet of the intercooler 163. The preheated water supply line 149 is connected to a low-pressure economizer 112a. A water recovery line 178, which is connected to a heated water outlet of an evaporator 151, is connected to the preheated water supply line 149. The water supply line 131a includes the first cooling water line 141, the second cooling water line 142, the third cooling water lines 143, and the preheated water supply line 149 that have been described above.

Next, the operation of the gas turbine plant of this embodiment will be described.

The pressure of water, which is present in the steam condenser 123, is increased by the water supply pump 124, and the water is sent to the generator cooler 161 through the first cooling water line 141 of the water supply line 131a and is sent to the lubricating oil cooler 162 through the second cooling water line 142 of the water supply line 131a. In the generator cooler 161, heat is exchanged between a cooling medium, which cools a rotor and a stator of the generator 41, and water, which is sent from the steam condenser 123, the cooling medium is cooled, and the water is heated. Further, in the lubricating oil cooler 162, heat is exchanged between the lubricating oil of the bearing 45 and water, which is sent from the steam condenser 123, the lubricating oil is cooled, and the water is heated.

The water, which is heated primarily by the generator cooler 161 and the lubricating oil cooler 162, is sent to the intercooler 163 through the third cooling water lines 143. In the intercooler 163, heat is exchanged between the water, which is heated primarily, and the air, which is compressed by the low-pressure compressor 12a, the air is cooled, and the water is further heated. The cooled air is sent to the high-pressure compressor 12b, and is sent to the combustor 21 after being further compressed.

Accordingly, the temperature of air at the outlet of the high-pressure compressor 12b is lower than that in a case in which the intercooler 163 is not provided. For this reason, since the thermal environment of a member, which forms the outlet of the high-pressure compressor 12b of this embodiment, can be alleviated, the durability of the high-pressure compressor 12b can be improved.

The water, which is further heated by the intercooler 163, flows in the preheated water supply line 149 of the water supply line 131a, joins water that has exchanged heat with the low-boiling-point medium LM in the evaporator 151 of the Rankine cycle 150, and is sent to the low-pressure economizer 112a together with the water. After the water sent to the low-pressure economizer 112a is heated by exchanging heat with the exhaust gas EG as described above, the water sent to the low-pressure economizer 112a is sent to the low-pressure evaporator 113a, the Rankine cycle 150, and the like.

As described above, even in this embodiment, as in the first embodiment, liquid water, which is heated by the low-pressure economizer 112a, is sent to the Rankine cycle 150 and heat is exchanged between the water and the low-boiling-point medium LM. Accordingly, it is possible to reduce the size of the Rankine cycle 150, to improve the thermal efficiency of the Rankine cycle 150, and to effectively use the heat of the low-temperature exhaust gas EG.

Here, the effective use of the heat of the exhaust gas EG having been described above will be described in more detail with reference to FIG. 5. Even in the following description, for the simplification of description, the waste heat recovery boiler 110 includes only one steam generating unit (for example, the low-pressure steam generating unit) as the steam generating unit and the steam turbine includes only one steam turbine (for example, the low-pressure steam turbine) that is driven by the steam generated from the one steam generating unit.

Figure 5:
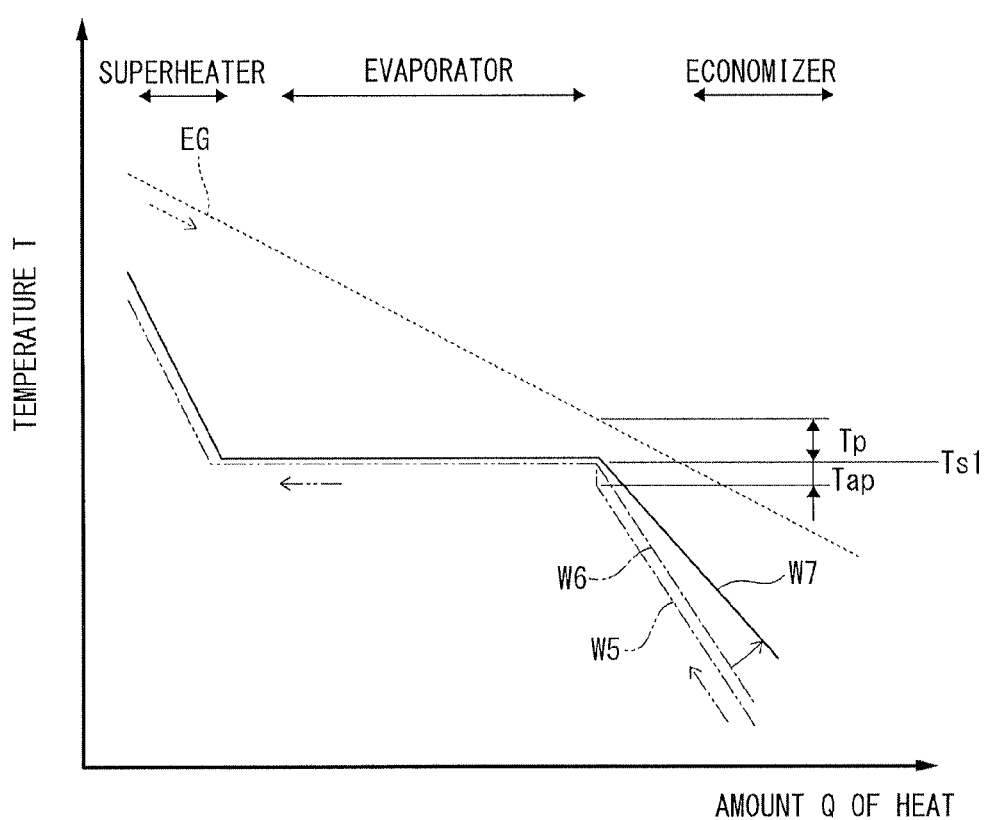
FIG. 5 is a T-Q diagram illustrating the effects of the second embodiment of the invention and showing a relationship between the amount of heat and the temperature of each of exhaust gas and water (including steam) in a waste heat recovery boiler that are associated with the flow of the exhaust gas and the flow of the water.

FIG. 5 is a T-Q diagram showing a relationship between the amount of heat and the temperature of each of water (including steam) and the exhaust gas EG flowing in the waste heat recovery boiler 110 that are associated with the flow of the exhaust gas and the flow of the water, as in FIGS. 2 and 3. This T-Q diagram also shows the relationship between the amount of heat and the temperature of each of the exhaust gas EG and water (including steam), which are associated with the flow of the exhaust gas EG and the flow of the water, in a qualitative manner and does not show the relationship in a quantitative manner. Even in this T-Q diagram, the value of the amount Q of heat of a horizontal axis is increased toward the left side.

As described above with reference to FIGS. 2 and 3, the temperature of the exhaust gas EG is gradually lowered and the amount of heat of the exhaust gas EG is gradually decreased as the exhaust gas EG flows to the downstream side. Since water (including steam) W5 flowing in the waste heat recovery boiler 110 exchanges heat with the exhaust gas EG, the temperature of the water W5 is gradually raised and the amount of heat of the water W5 is gradually increased as the water W5 flows to the upstream side. Specifically, while the water W5, which flows into the economizer, passes through the economizer, the temperature of the water W5 is gradually raised and the amount of heat of the water W5 is gradually increased. The water W5 is heated at the outlet of the economizer up to a temperature that is slightly lower than a saturation temperature Ts1 of water present in the evaporator. The reason for this is to prevent water from boiling at the outlet of the economizer. A difference between the temperature of water at the outlet of the economizer and the saturation temperature Ts1 of the water present in the evaporator is generally called an approach temperature difference Tap. Even when the approach temperature difference Tap is minimum, the approach temperature difference Tap is 0° C. The temperature of water at the outlet of the economizer is not higher than the saturation temperature Ts1 of the water present in the evaporator. In the evaporator, the temperature of the water W5 sent from the economizer is maintained at the saturation temperature Ts1 after the temperature of the water W5 sent from the economizer is raised up to the saturation temperature Ts1 at the pressure of the evaporator. However, the amount of heat of the water W5 is increased and the water W5 becomes steam. The steam flows into the superheater. In the superheater, the temperature of the steam is raised and the amount of heat of the steam is increased.

When there is the above-mentioned approach temperature difference Tap, the amount of heat which is required to change the water having the same flow rate into steam in the evaporator is increased. For this reason, when water W6 flowing into the economizer is heated and the temperature of the water W6 is raised, it is possible to suppress an increase in the amount of heat that is required to change the water W6 into steam in the evaporator. However, when the water W6 flowing into the economizer is merely heated, the amount of the heat of the low-temperature exhaust gas EG to be used is not increased.

Accordingly, when the Rankine cycle 150 is introduced, the flow rate of water W7 flowing into the economizer is increased while the flow rate of the water flowing into the evaporator is constant. When the flow rate of the water W7 flowing in the economizer is increased, the rate of temperature rise, which is obtained while the water W7 passes through the economizer, (the amount of temperature rise obtained when a unit amount of heat is applied) is lowered. In this case, in the economizer, the amount of heat to be exchanged between the low-temperature exhaust gas EG and the water W7 becomes larger than that before the introduction of the Rankine cycle 150. For this reason, when the Rankine cycle 150 is introduced, the heat of the low-temperature exhaust gas EG can be effectively used as the temperature of the exhaust gas EG present in the waste heat recovery boiler 110 and the temperature of the exhaust gas EG flowing into the chimney can also be lowered. Accordingly, the heat of the exhaust gas EG can be effectively used in this embodiment. As a result, the output and efficiency of the plant can be increased.

Further, in this embodiment, the waste heat of the gas turbine 10a can be effectively used since the heat of an object to be cooled in the gas turbine 10a is used to heat water, which is to be sent to the low-pressure economizer 112a, by the water supply system-heat exchanger 160. Since the waste heat of the gas turbine 10a is effectively used, an increase in the amount of heat to be recovered is used to heat the low-boiling-point medium LM.

Water of which the temperature is relatively low in the gas turbine plant may be sent to the low-pressure economizer 112a that heats water to be sent to the low-pressure evaporator 113a, of which the internal pressure is lowest, among a plurality of evaporators 113a, 113b, and 113c of the waste heat recovery boiler 110. Accordingly, since low-temperature water does not need to be heated up to a high temperature in the water supply system-heat exchanger 160 of this embodiment, the waste heat of a relatively low-temperature object to be cooled can be effectively used. Moreover, in this embodiment, after water is heated primarily by the generator cooler 161 and the lubricating oil cooler 162, the primarily heated water is further heated secondarily by the intercooler 163. For this reason, since a difference between the temperature of the object to be cooled and the temperature of water is reduced in each of the coolers 161, 162, and 163 of the heat exchanger and a difference between the temperature of water at the inlet and the temperature of water at the outlet is reduced, the efficiency of heat exchange between the object to be cooled and water can be further increased.

In terms of the durability and the like of the high-pressure compressor 12b, it is preferable that the cooling of air performed by the intercooler 163 is enhanced to lower the temperature of air at the outlet of the high-pressure compressor 12b as described above. However, when the temperature of air at the outlet of the high-pressure compressor 12b is lowered, that is, when the temperature of air flowing into the combustor 21 is lowered, the efficiency of the gas turbine is decreased. The reason for this is as follows: when the temperature of air flowing into the combustor 21 is lowered, the amount of fuel F to be input is increased to keep the temperature at the inlet of the turbine constant and the output of the gas turbine is increased but a ratio of the output of the gas turbine to an increase in the amount of fuel F to be input is low.

Accordingly, it is preferable that the temperature of air at the outlet of the high-pressure compressor 12b is as high as possible as long as the strength, durability, and the like of a member forming the outlet of the high-pressure compressor 12b are allowed. For this reason, in this embodiment, air is cooled by the intercooler 163 and the temperature of air at the outlet of the high-pressure compressor 12b is lowered, but the temperature of air at the outlet of the high-pressure compressor 12b is set to a high temperature in a range where the strength, durability, and the like of a member forming the outlet of the high-pressure compressor 12h can be allowed.

Figure 6:
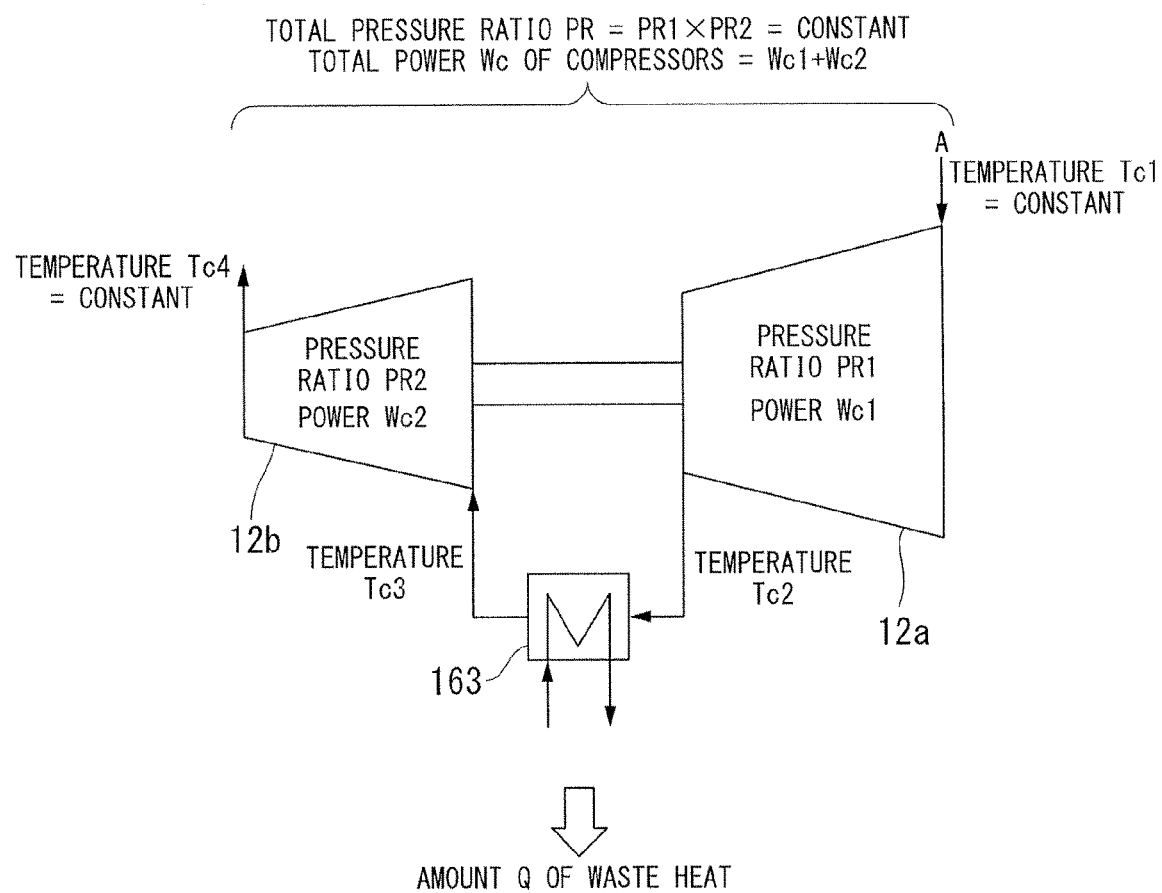
FIG. 6 is a diagram showing various conditions of a low-pressure compressor and a high-pressure compressor of the second embodiment of the invention.

Here, as shown in FIG. 6, the temperature of air at the inlet of the low-pressure compressor 12a is denoted by Tc1, the temperature of air at the outlet of the low-pressure compressor 12a is denoted by Tc2, the temperature of air at the inlet of the high-pressure compressor 12b is denoted by Tc3, and the temperature of air at the outlet of the high-pressure compressor 12b is denoted by Tc4. Further, the pressure ratio of the low-pressure compressor 12a is denoted by PR1; the pressure ratio of the high-pressure compressor 12b is denoted by PR2; power, which is required to drive the low-pressure compressor 12a, is denoted by Wc1; and power, which is required to drive the high-pressure compressor 12b, is denoted by Wc2.

It is supposed that the pressure ratio PR1 of the low-pressure compressor 12a is changed under the following conditions.

Conditions (1) The temperature Tc1 of air at the inlet of the low-pressure compressor 12a is constant (2) The temperature Tc4 of air at the outlet of the high-pressure compressor 12b is constant at the above-mentioned temperature.

(3) The total pressure ratio PR (=PR1×PR2) of the low-pressure compressor 12a and the high-pressure compressor 12b is constant.

Figure 7:
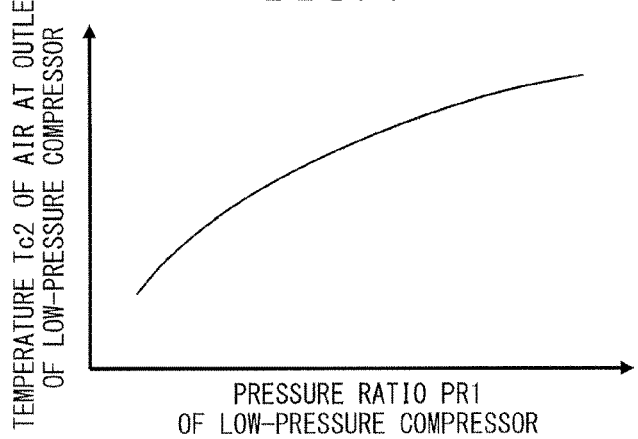
FIG. 7 is a graph showing a relationship between the pressure ratio of the low-pressure compressor of the second embodiment of the invention and the temperature of air at an outlet of the low-pressure compressor.
Figure 8:
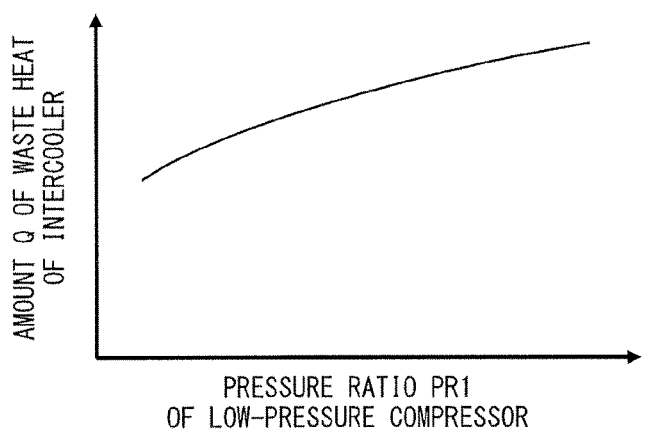
FIG. 8 is a graph showing a relationship between the pressure ratio of the low-pressure compressor of the second embodiment of the invention and the amount of waste heat of an intercooler.
Figure 9:
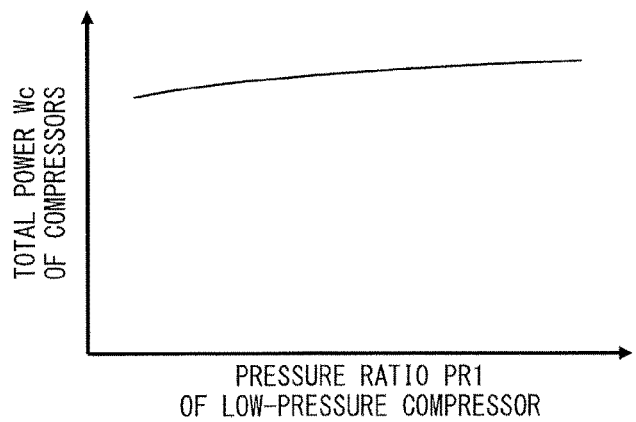
FIG. 9 is a graph showing a relationship between the pressure ratio of the low-pressure compressor of the second embodiment of the invention and total power of the compressors.

In this case, as shown in FIG. 7, the temperature Tc2 of air at the outlet of the low-pressure compressor 12a is gradually lowered as the pressure ratio PR1 of the low-pressure compressor 12a is reduced. As a result, the amount Q of waste heat of the intercooler 163 is decreased as shown in FIG. 8 and total power Wc (=Wc1+Wc2), which is required to drive the low-pressure compressor 12a and the high-pressure compressor 12b, is also reduced as shown in FIG. 9.

Accordingly, in this embodiment, the pressure ratio PR1 of the low-pressure compressor 12a is set to be low and the pressure ratio PR2 of the high-pressure compressor 12b is set to be relatively high to reduce the total power Wc that is required to drive the low-pressure compressor 12a and the high-pressure compressor 12b. As a result, in this embodiment, the temperature TO of air at the outlet of the low-pressure compressor 12a is lowered and the amount Q of waste heat of the intercooler 163, that is, the amount Q of heat for heating water is decreased. In this embodiment, since water is heated primarily by the generator cooler 161 and the lubricating oil cooler 162, a decrease in the amount Q of heat which is applied to water to heat the water by the intercooler 163 is compensated as described above. Further, in this embodiment, the temperature Tc2 of air at the outlet of the low-pressure compressor 12a, that is, the temperature of air at the inlet of the intercooler 163 is set to be lower than the saturation temperature Ts1 (see FIG. 4) in the low-pressure evaporator 113a. Furthermore, the temperature of the cooling medium at the inlet of the generator cooler 161 and the temperature of a lubricating oil at the inlet of the lubricating oil cooler 162 are also lower than the saturation temperature Ts1 in the low-pressure evaporator 113a. For this reason, in this embodiment, the temperature Tws (see FIG. 4) of water supplied to the low-pressure economizer 112a is certainly lower than the saturation temperature Ts1 in the low-pressure evaporator 113a.

However, the temperature Tws of water supplied to the low-pressure economizer 112a is higher than the dew-point temperature of the exhaust gas EG at an exhaust gas outlet of the low-pressure economizer 112a. The dew-point temperature of the exhaust gas EG depends on a fuel component and the like, and is about 50° C. In this embodiment, the pressure ratio PR1 of the low-pressure compressor 12a and the pressure ratio PR2 of the high-pressure compressor 12b are appropriately set and the heat transfer area of each of the coolers 161, 162, and 163, the velocity of flow of the water in each of the coolers 161, 162, and 163, and the like are set so that the temperature Tws of water supplied to the low-pressure economizer 112a is higher than the dew-point temperature of the exhaust gas EG at the exhaust gas outlet of the low-pressure economizer 112a.

Since the pressure ratio PR1 of the low-pressure compressor 12a is set to be low and the pressure ratio PR2 of the high-pressure compressor 12b is set to be relatively high as described above in this embodiment, a decrease in the efficiency of the gas turbine, which is associated with the heat dissipation of air of the intercooler 163, is suppressed while the durability and the like of the member forming the outlet of the high-pressure compressor 12b are kept in an intended range. Moreover, since the pressure ratio PR1 of the low-pressure compressor 12a and the like are set as described above in this embodiment, total power Wc, which is required to drive the low-pressure compressor 12a and the high-pressure compressor 12b, can be reduced and a decrease in the efficiency of the gas turbine can be further suppressed.

Since the temperature Tc2 of air at the outlet of the low-pressure compressor 12a is set to be lower than the saturation temperature Ts1 in the low-pressure evaporator 113a in this embodiment, the pressure ratio PR1 of the low-pressure compressor 12a can be set to be low as described above. Accordingly, a decrease in the efficiency of the gas turbine can be suppressed. Further, since the temperature Tc2 of air at the outlet of the low-pressure compressor 12a, the temperature of a lubricating oil at the inlet of the lubricating oil cooler 162, and the temperature of a cooling medium, which cools components of the generator, at the inlet of the generator cooler 161 are set to be lower than the saturation temperature Ts1 in the low-pressure evaporator 113a, the temperature Tws of water supplied to the low-pressure economizer 112a is certainly lower than the saturation temperature Tb1 in the low-pressure evaporator 113a. For this reason, since water does not need to be heated in the low-pressure economizer 112a and the low-pressure evaporator 113a in this embodiment, the heat of the exhaust gas EG passing through the low-pressure economizer 112a and the low-pressure evaporator 113a can be effectively used. Furthermore, in this embodiment, after the temperature of water supplied to the low-pressure economizer 112a is raised by using the heat of an object to be cooled of which the temperature is lower than the saturation temperature Ts1, the temperature of the water is further raised by the low-pressure economizer 112a and the water is used as the heat source of the Rankine cycle 150. For this reason, since the heat of a low-temperature object to be cooled can be effectively used and the heat of the heat source of the Rankine cycle 150 can be raised in this embodiment, the output and efficiency of the Rankine cycle 150 are increased. As a result, the output and efficiency of the plant can be increased.

Further, in this embodiment, the temperature Tws of water supplied to the low-pressure economizer 112a is set to be higher than the dew-point temperature of the exhaust gas EG at the exhaust gas outlet of the low-pressure economizer 112a so that the condensation of water contained in the exhaust gas EG on the surface of a heat transfer pipe of the low-pressure economizer 112a is suppressed.

Gaseous water is contained in the exhaust gas EG discharged from the gas turbine 10a. Moreover, sulfur contents may be contained in the exhaust gas EG in the cases of certain characteristics of fuel. In this case, sulfuric acid is generated by the reaction of water and sulfur contents. Even in a case in which the temperature of the exhaust gas EG passing through the low-pressure economizer 112a is higher than the dew-point temperature of the exhaust gas EG, moisture, which is contained in the exhaust gas EG being in contact with the heat transfer pipe, is condensed if the temperature of water flowing in the heat transfer pipe of the low-pressure economizer 112a is low. If water is condensed on the surface of the heat transfer pipe, the possibility of the corrosion of the heat transfer pipe is increased. In addition, if a corrosive component, such as sulfuric acid, is contained in the water, a possibility of the corrosion of the heat transfer pipe is further increased.

In this embodiment, the temperature Tws of water sent to the low-pressure economizer 112a which is positioned on the most downstream side in the waste heat recovery boiler 110 and through which the exhaust gas EG having the lowest temperature in the waste heat recovery boiler 110 passes is set to be higher than the dew-point temperature of the exhaust gas EG at the exhaust gas outlet of the low-pressure economizer 112a as described above. For this reason, since the condensation of water contained in the exhaust gas EG on the surface of the heat transfer pipe of the low-pressure economizer 112a can be suppressed in this embodiment, the corrosion of the heat transfer pipe of the low-pressure economizer 112a can be suppressed.

In this embodiment, the temperature Tc2 of air at the outlet of the low-pressure compressor 12a is set to be lower than the saturation temperature Ts1 in the low-pressure evaporator 113a and the temperature Tws of water supplied to the low-pressure economizer 112a is set to be higher than the dew-point temperature of the exhaust gas EG at the exhaust gas outlet of the low-pressure economizer 112a. However, both of the above-mentioned two temperature conditions may not be satisfied, or only one of the above-mentioned two temperature conditions may be satisfied. It goes without saying that an effect caused by the satisfaction of the temperature condition cannot be obtained in a case in which the temperature condition is not satisfied.

Further, even in the first embodiment and the respective embodiments to be described below, it is preferable that the temperature Tws of water supplied to the low-pressure economizer 112a is set to be higher than the dew-point temperature of the exhaust gas EG at the exhaust gas outlet of the low-pressure economizer 112a and lower than the saturation temperature Ts1 in the low-pressure evaporator 113a as in this embodiment.

Third Embodiment

Figure 10:
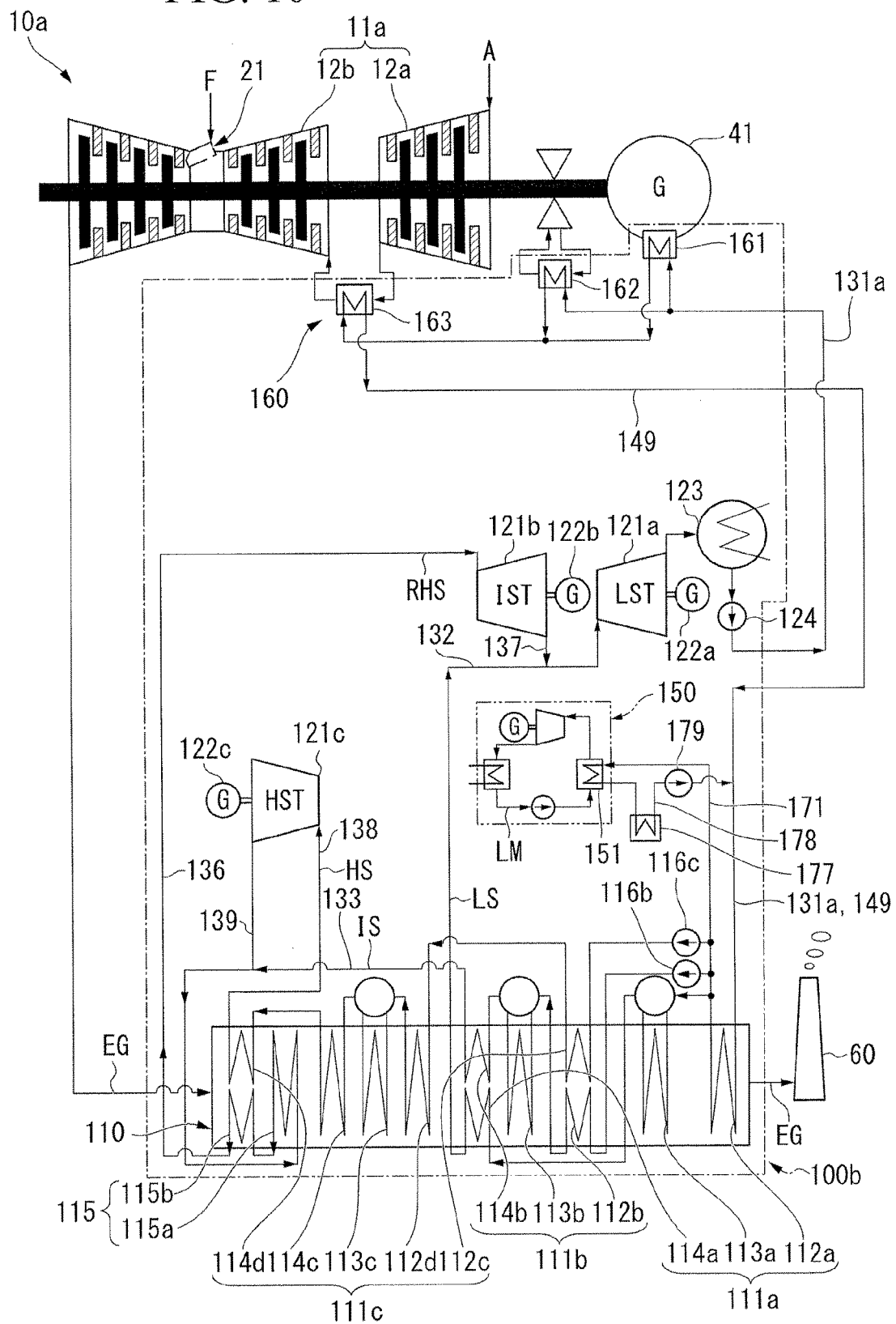
FIG. 10 is a system diagram of a gas turbine plant according to a third embodiment of the invention.

A gas turbine plant of a third embodiment will be described with reference to FIG. 10.

The gas turbine plant of this embodiment is a gas turbine plant that includes a modification of the waste heat recovery device 100a of the second embodiment, and other structures thereof are the same as those of the gas turbine plant of the second embodiment.

A waste heat recovery device 100b of this embodiment is a waste heat recovery device that is obtained by adding a water recovery system-heat exchanger 177 to the waste heat recovery device 100a of the second embodiment. The water recovery system-heat exchanger 177 is provided on the water recovery line 178 that connects the evaporator 151 of the Rankine cycle 150 to the water supply line 131a (the preheated water supply line 149). The water recovery system-heat exchanger 177 exchanges heat between water, which flows in the water recovery line 178, and another medium. Specifically, the water recovery system-heat exchanger 177 heats a medium, such as water of which the temperature is lower than the temperature of water flowing in the water recovery line 178, by exchanging heat between the ater, which flows in the water recovery line 178, and the medium.

In this embodiment, heat which could not be recovered by the evaporator 151 of the Rankine cycle 150 can be recovered by the water recovery system-heat exchanger 177. Accordingly, the heat of the exhaust gas EG can be more effectively used.

The water recovery system-heat exchanger 177 of this embodiment has exchanged heat between water, which flows in the water recovery line 178, and a medium, such as water of which the temperature is lower than the temperature of the water flowing in the water recovery line 178, but may exchange heat between water, which flows in the water recovery line 178, and a medium, such as water of which the temperature is higher than the temperature of the water flowing in the water recovery line 178. In this case, the water recovery system-heat exchanger 177 does not recover heat that could not be recovered by the evaporator 151 of the Rankine cycle 150. Accordingly, in a case in which, for example, the temperature of water supplied to the low-pressure economizer 112a is lower than the dew-point temperature of the exhaust gas EG at the exhaust gas outlet of the low-pressure economizer 112a, the water recovery system-heat exchanger 177 has a function to make the temperature of the water be higher than the dew-point temperature.

Further, this embodiment is obtained by adding the water recovery system-heat exchanger 177 to the gas turbine plant of second embodiment, but the water recovery system-heat exchanger 177 may be added to the gas turbine plants of the first embodiment and the respective embodiments to be described below.

Fourth Embodiment

Figure 11:
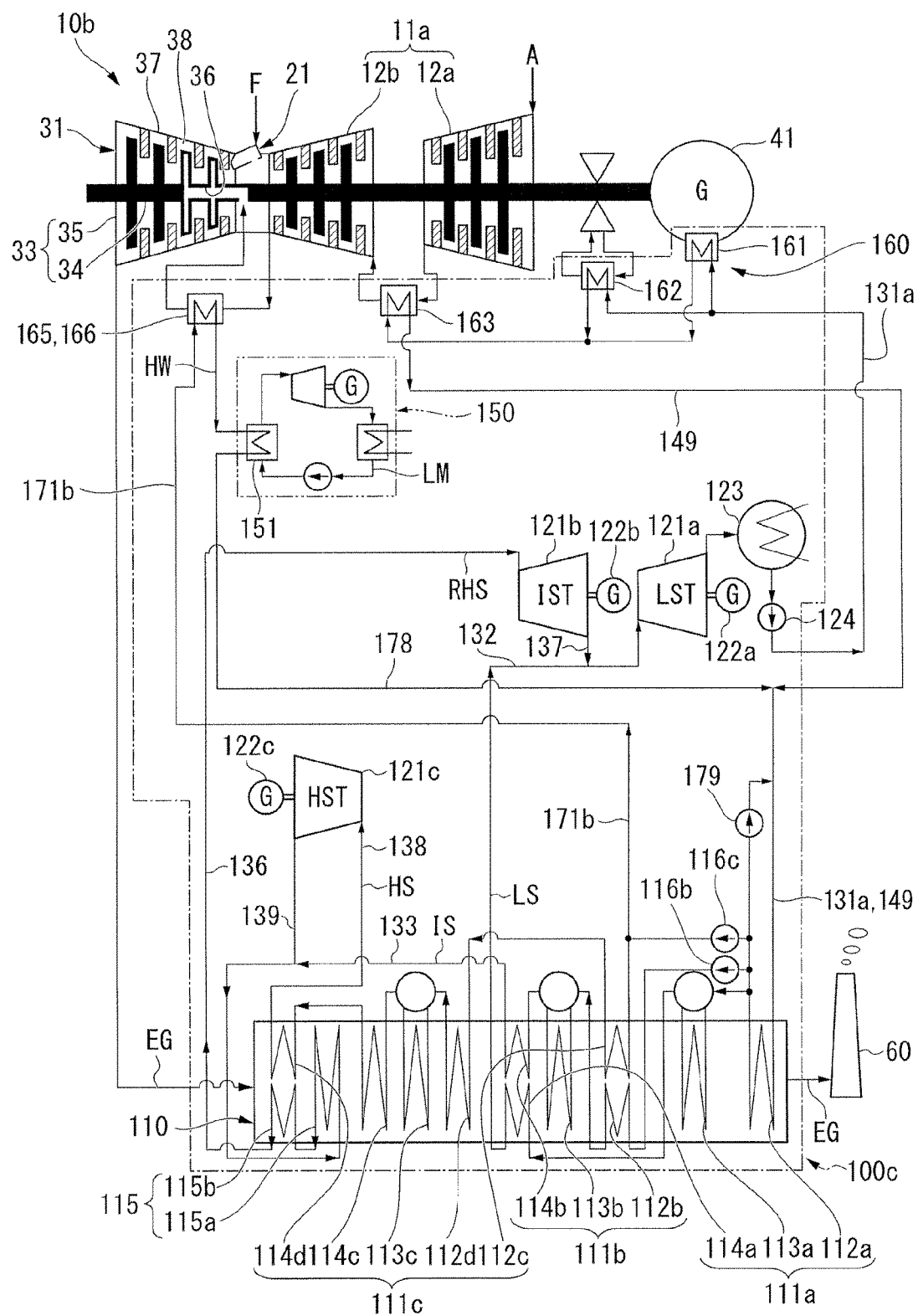
FIG. 11 is a system diagram of a gas turbine plant according to a fourth embodiment of the invention.

A gas turbine plant according to a fourth embodiment of the invention will be described with reference to FIG. 11.

As in the first embodiment, the gas turbine plant of this embodiment also includes a gas turbine 10b, a generator 41 that generates electricity by the driving of the gas turbine 10b, a waste heat recovery device 100c that recovers the heat of exhaust gas EG discharged from the gas turbine 10b, and a chimney 60 that discharges the exhaust gas EG having passed through the waste heat recovery device 100c to the atmosphere.

As in the second embodiment, the gas turbine 10b of this embodiment also includes a compressor 11a, a combustor 21, and a turbine 31. Cooling air passages 36 in which cooling air flows are formed in a rotor shaft 34 and a plurality of turbine blades 35 of the turbine 31 of this embodiment. The compressor 11a is provided with an air cooler 166 that cools a part of air A compressed by the compressor 11a by exchanging heat between a part of the air A and water and sends the cooled air A to the cooling air passages 36 of the turbine 31.

As in the case of the waste heat recovery device 100a of the second embodiment, the waste heat recovery device 100c of this embodiment includes a waste beat recovery boiler 110, steam turbines 121a, 121b, and 121c, generators 122a, 122b, and 122c, a steam condenser 123, a water supply pump 124, a Rankine cycle 150, and a water supply system-heat exchanger 160. The waste heat recovery device 100e of this embodiment further includes a heated water system-heat exchanger 165. The heated water system-heat exchanger 165 includes the above-mentioned air cooler 166.

A heated water inlet of an evaporator 151 of the Rankine cycle 150 and a discharge port of a high-pressure pump 116c of the waste heat recovery boiler 110 are connected to each other by a heated water line 171b. A heated water outlet of the evaporator 151 and a water supply line 131a (a preheated water supply line 149) are connected to each other by a water recovery line 178. The above-mentioned heated water system-heat exchanger 165 (the air cooler 166) is provided on the heated water line 171b.

Accordingly, after the pressure of a part of water heated by a low-pressure economizer 112a of the waste heat recovery boiler 110 is increased by the high-pressure pump 116c, a part thereof is sent to the first high-pressure economizer 112c and a part of the rest thereof is sent to the air cooler 166 through the heated water line 171b. In the air cooler 166, heat is exchanged between the water which is heated by the low-pressure economizer 112a and of which the pressure is increased by the high-pressure pump 116c and a part of air, which is compressed by the compressor 11a, the air is cooled, and the water is further heated. The cooled air is sent to the cooling air passages 36 of a turbine rotor 33, and cools the turbine rotor 33. The water, which is further heated by the air cooler 166, is sent to the evaporator 151 of the Rankine cycle 150 through the heated water line 171b. In the evaporator 151, heat is exchanged between liquid water HW that is heated by the low-pressure economizer 112a and the air cooler 166 and a low-boiling-point medium LM that is a liquid, and the low-boiling-point medium LM is heated and evaporated (heating step). In this process, the water HW is cooled and flows out of the heated water outlet of the evaporator 151. The water, which flows out of the heated water outlet of the evaporator 151, flows into the water supply line 131a (the preheated water supply line 149) through the water recovery line 178. This water is mixed with water, which is heated by the water supply system-heat exchanger 160 and is sent from the steam condenser 123, flows in the water supply line 131a, and returns to the low-pressure economizer 112a (water recovery step).

As described above, even in this embodiment, as in the first embodiment, liquid water, which is heated by the low-pressure economizer 112a, is sent to the Rankine cycle 150 and heat is exchanged between the water and the low-boiling-point medium LM. Accordingly, it is possible to reduce the size of the Rankine cycle 150, to improve the thermal efficiency of the Rankine cycle 150, and to effectively use the heat of the low-temperature exhaust gas EG.

Further, in this embodiment, the waste heat of the gas turbine 10b can be effectively used since the heat of an object to be cooled in the gas turbine 10b is used to heat water, which is to be sent to the Rankine cycle 150, by the air cooler 166. Since the waste heat of the gas turbine 10b is effectively used, an increase in the amount of heat to be recovered is used to heat the low-boiling-point medium LM.

The air cooler 166 forms the heated water system-heat exchanger 165 in this embodiment but the air cooler 166 may form a part of the water supply system-heat exchanger. That is, the air cooler 166 may be included in each of the water supply system-heat exchangers 160 of the second and third embodiments.

Fifth Embodiment

Figure 12:
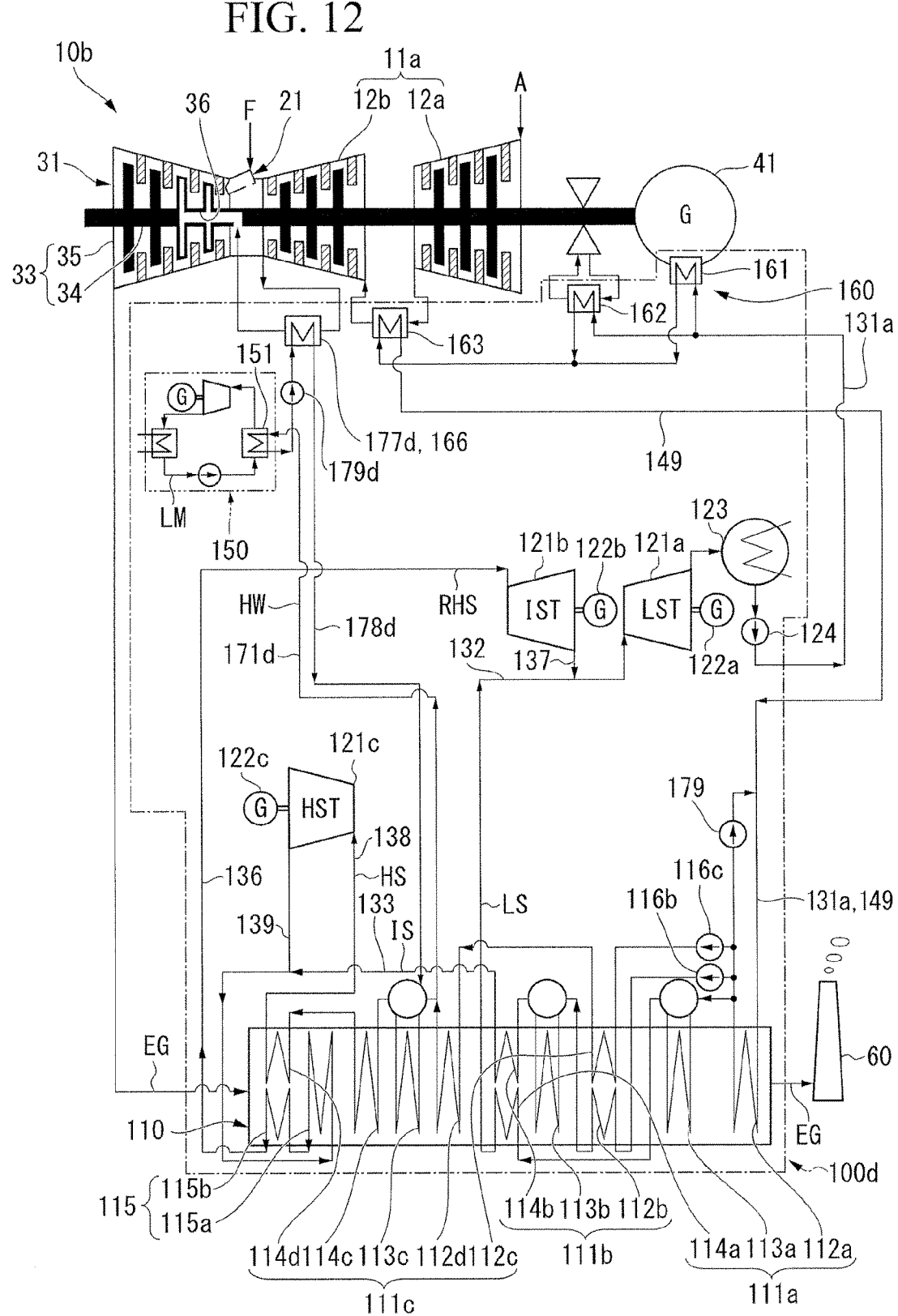
FIG. 12 is a system diagram of a gas turbine plant according to a fifth embodiment of the invention.

A gas turbine plant according to a fifth embodiment of the invention will be described with reference to FIG. 12.

The gas turbine plant of this embodiment is a gas turbine plant that is obtained by changing the disposition of the Rankine cycle 150 of the waste heat recovery device 100e of the fourth embodiment.

In a waste heat recovery device 100d of this embodiment, a heated water inlet of an evaporator 151 of a Rankine cycle 150 and an outlet of a second high-pressure economizer 112d of a waste heat recovery boiler 110 are connected to each other by a heated water line 171d. A heated water outlet of the evaporator 151 and a high-pressure evaporator 113c of the waste heat recovery boiler 110 are connected to each other by a water recovery line 178d. An air cooler 166, which cools air A compressed by a compressor 11a, is provided on the water recovery line 178d. For this reason, the air cooler 166 of this embodiment does not form a heated water system-heat exchanger and forms a water recovery system-heat exchanger 177d. A high-pressure circulation pump 179d, which increases the pressure of water sent from the evaporator 151 of the Rankine cycle 150 so that the water sent from the evaporator 151 is sent to the high-pressure evaporator 113c, is provided on the water recovery line 178d.

A part of water, which is heated by the second high-pressure economizer 112d of the waste heat recovery boiler 110, is sent to the high-pressure evaporator 113c, and a part of the rest thereof is sent to the evaporator 151 of the Rankine cycle 150 through the heated water line 171d. In the evaporator 151, heat is exchanged between liquid water 11W that is heated by a low-pressure economizer 112a, a first high-pressure economizer 112c, and the second high-pressure economizer 112d and a low-boiling-point medium LM that is a liquid, and the low-boiling-point medium LM is heated and evaporated (heating step). In this process, the water HW is cooled and flows out of the heated water outlet of the evaporator 151. The water, which flows out of the heated water outlet of the evaporator 151, is sent to the air cooler 166 (the water recovery system-heat exchanger 177d) through the water recovery line 178d after the pressure of the water is increased by the high-pressure circulation pump 179d. In the air cooler 166, heat is exchanged between the water that is sent from the evaporator 151 and a part of air that is compressed by the compressor 11a, the air is cooled, and the water is further heated. The cooled air is sent to cooling air passages 36 of a turbine rotor 33, and cools the turbine rotor 33. The water, which is further heated by the air cooler 166, is sent to the high-pressure evaporator 113c through the water recovery line 178d.

As described above, liquid water that exchanges heat with the low-boiling-point medium LM may not be liquid water that is heated by the low-pressure economizer 112a, may be liquid water that is heated by the second high-pressure economizer 112d, or may be water that is heated by the other economizer.

As described above, in this embodiment, liquid water, which is heated by the second high-pressure economizer 112d, is sent to the Rankine cycle 150 and heat is exchanged between this water and the low-boiling-point medium LM. Accordingly, it is possible to reduce the size of the Rankine cycle 150 and to improve the thermal efficiency of the Rankine cycle 150.

Further, in this embodiment, the waste heat of the gas turbine 10b can be effectively used since the heat of an object to be cooled in the gas turbine 10b is used to heat water, which is to be sent to the high-pressure evaporator 113c, by the air cooler 166. Since the waste heat of the gas turbine 10b is effectively used, an increase in the amount of heat to be recovered is used to reheat water which is sent from the second high-pressure economizer 112d and of which the temperature is lowered by the heat exchange between the low-boiling-point medium LM and itself.

Furthermore, the circulation pump 179, which returns a part of water heated by the low-pressure economizer 112a to the water supply line 131a, is provided in the fourth and fifth embodiments. For this reason, since the flow rate of water passing through the low-pressure economizer 112a is increased even in the fourth and fifth embodiments, the heat of the low-temperature exhaust gas EG can be effectively used.

Sixth Embodiment

Figure 13:
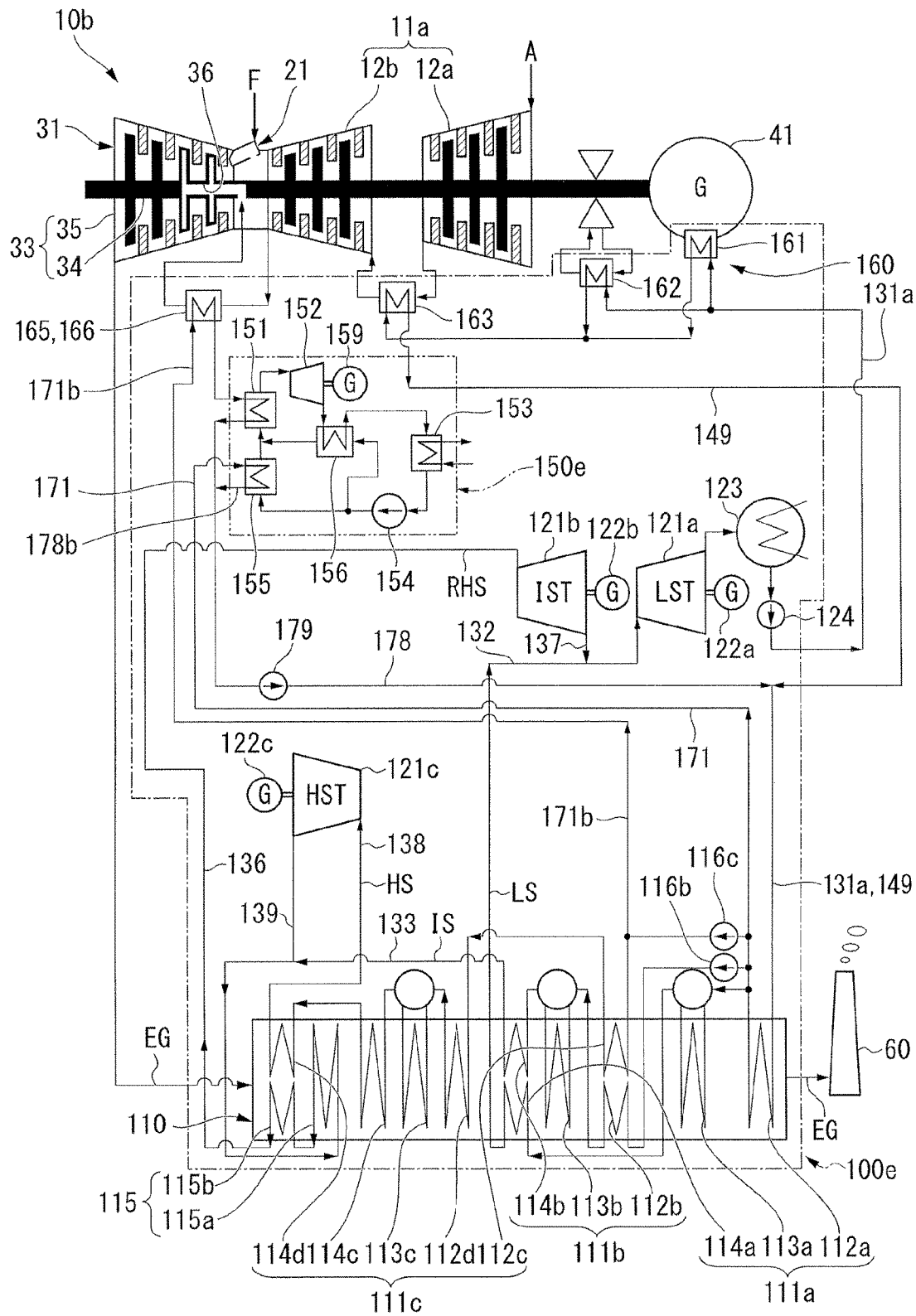
FIG. 13 is a system diagram of a gas turbine plant according to a sixth embodiment of the invention.

A gas turbine plant according to a sixth embodiment of the invention will be described with reference to FIG. 13.

The gas turbine plant of this embodiment is a gas turbine plant that is obtained by changing the structure of the Rankine cycle 150 of the fourth embodiment.

A Rankine cycle 150e of a waste heat recovery device 100e of this embodiment includes: a heater 155 that heats a low-boiling-point medium LM, which is a liquid; an evaporator (heater) 151 that evaporates the low-boiling-point medium LM, which is a liquid heated by the heater 155, by further heating the low-boiling-point medium LM; a turbine 152 that is driven by the evaporated low-boiling-point medium LM; a condenser 153 that cools and condenses the low-boiling-point medium LM having driven the turbine 152; a preheater 156 that heats the condensed low-boiling-point medium LM by exchanging heat between the condensed low-boiling-point medium LM and the low-boiling-point medium LM having driven the turbine 152; a low-boiling-point medium pump 154 that increases the pressure of the condensed low-boiling-point medium LM and sends the low-boiling-point medium LM to the preheater 156 and the heater 155; and a low-boiling-point medium line 157 that allows the low-boiling-point medium LM to flow between the above-mentioned elements. For example, a generator 159, which generates electricity by the driving of the turbine 152, is connected to the turbine 152.

A heated water inlet of the evaporator 151 of the Rankine cycle 150e and a discharge port of a high-pressure pump 116c of a waste heat recovery boiler 110 are connected to each other by a first heated water line 171b. An air cooler 166 is provided on the first heated water line 171b. Accordingly, the air cooler 166 forms a heated water system-heat exchanger 165. A heated water outlet of the evaporator 151 and a water supply line 131a (a preheated water supply line 149) are connected to each other by a first water recovery line 178. A circulation pump 179 is provided on the first water recovery line 178. A heated water inlet of the heater 155 of the Rankine cycle 150e and an outlet of a low-pressure economizer 112a of the waste heat recovery boiler 110 are connected to each other by a second heated water line 171. A heated water outlet of the heater 155 and the first water recovery line 178 are connected to each other by a second water recovery line 178b.

As in the fourth embodiment, after the pressure of a part of water heated by the low-pressure economizer 112a of the waste heat recovery boiler 110 is increased by the high-pressure pump 116c, a part thereof is sent to a first high-pressure economizer 112c and a part of the rest thereof is sent to the air cooler 166 through the first heated water line 171b. In the air cooler 166, heat is exchanged between the water which is heated by the low-pressure economizer 112a and of which the pressure is increased by the high-pressure pump 116c, and a part of air, which is compressed by a compressor 11a, the air is cooled, and the water is further heated. The cooled air is sent to cooling air passages 36 of a turbine rotor 33, and cools the turbine rotor 33. The water, which is further heated by the air cooler 166, is sent to the evaporator 151 of the Rankine cycle 150e through the first heated water line 171b. In the evaporator 151, heat is exchanged between liquid water that is heated by the low-pressure economizer 112a and the air cooler 166 and the low-boiling-point medium LM that is a liquid, and the low-boiling-point medium LM is heated and evaporated (heating step). In this process, the water is cooled and flows out of the heated water outlet of the evaporator 151. The water, which flows out of the heated water outlet of the evaporator 151, flows into the water supply line 131a (the preheated water supply line 149) through the water recovery line 178.

The low-boiling-point medium LM, which is evaporated by the evaporator 151, is sent to the turbine 152 and drives the turbine 152. The low-boiling-point medium LM, which has driven the turbine 152, is sent to the condenser 153 through the preheater 156. In the condenser 153, heat is exchanged between the low-boiling-point medium LM and a cooling medium and the low-boiling-point medium LM is cooled and condensed. The condensed low-boiling-point medium LM is sent to the heater 155 and the preheater 156 by the low-boiling-point medium pump 154. In the heater 155, heat is exchanged between the liquid water, which is heated by the low-pressure economizer 112a, and the low-boiling-point medium LM, which is a liquid sent from the condenser 153, and the low-boiling-point medium LM, which is a liquid, is heated. The water, which has exchanged heat with the low-boiling-point medium LM, flows out of the heated water outlet of the heater 155 and flows into the water supply line 131a through the second water recovery line 178b and the first water recovery line 178. In the preheater 156, heat is exchanged between the condensed low-boiling-point medium LM and the low-boiling-point medium LM having driven the turbine 152, the condensed low-boiling-point medium LM is heated, and the low-boiling-point medium LM having driven the turbine 152 is cooled. The low-boiling-point medium LM, which has driven the turbine 152 and has been cooled by the preheater 156, is cooled by the condenser 153 and is condensed as described above. The low-boiling-point medium LM heated by the preheater 156 is sent to the evaporator 151.

In this way, the low-boiling-point medium LM may be heated in stages by waters of which the temperatures are different from each other. Further, the heat of the low-boiling-point medium LM having driven the turbine 152 may be used to heat the condensed low-boiling-point medium LM.

As described above, even in this embodiment, as in the fourth embodiment, liquid water, which is heated by the low-pressure economizer 112a, is sent to the Rankine cycle 150e and heat is exchanged between the water and the low-boiling-point medium LM. Accordingly, it is possible to reduce the size of the Rankine cycle 150e, to improve the thermal efficiency of the Rankine cycle 150e, and to effectively use the heat of the low-temperature exhaust gas EG. Furthermore, even in this embodiment, the waste heat of the gas turbine 10b can be effectively used since the heat of an object to be cooled in the gas turbine 10b is used to heat water, which is to be sent to the Rankine cycle 150e, by the air cooler 166. Since the waste heat of the gas turbine 10b is effectively used, an increase in the amount of heat to be recovered is used to heat the low-boiling-point medium LM.

Further, since the low-boiling-point medium LM is heated in stages by waters of which the temperatures are different from each other in this embodiment, the output and efficiency of the Rankine cycle 150e can be improved.

Seventh Embodiment

Figure 14:
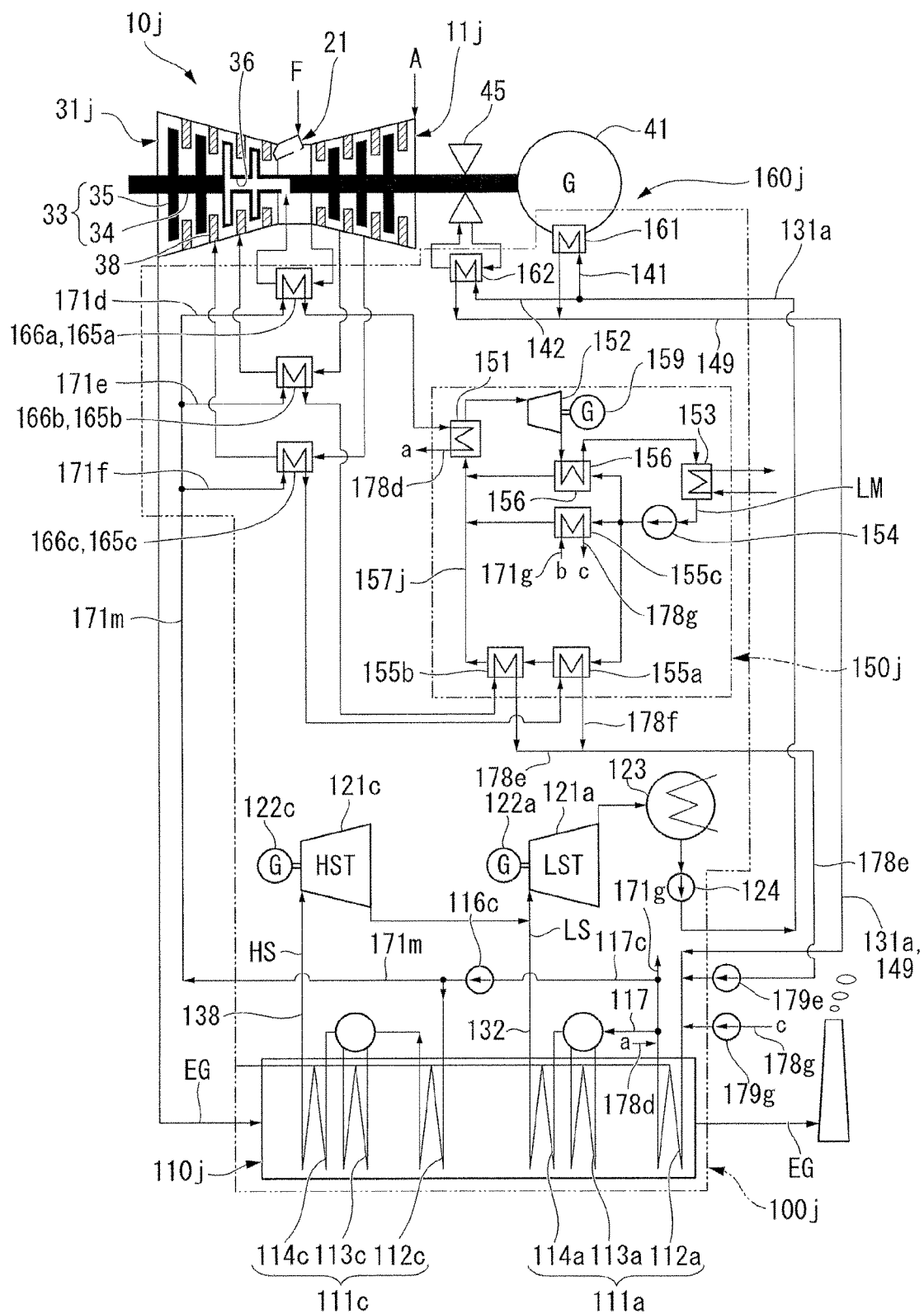
FIG. 14 is a system diagram of a gas turbine plant according to a seventh embodiment of the invention.

A gas turbine plant according to a seventh embodiment of the invention will be described with reference to FIG. 14.

The gas turbine plant of this embodiment is a gas turbine plant that is obtained by mainly changing the structure of the gas turbine 10b of the sixth embodiment and the structure of the Rankine cycle 150e.

As in the respective embodiments having been described above, the gas turbine plant of this embodiment also includes a gas turbine 10j, a generator 41 that generates electricity by the driving of the gas turbine 10j, a waste heat recovery device 100j that recovers the heat of exhaust gas EG discharged from the gas turbine 10j, and a chimney 60 that discharges the exhaust gas EG having passed through the waste heat recovery device 100j to the atmosphere.

As in the above-mentioned embodiments, the gas turbine 10j of this embodiment also includes a compressor 11j, a combustor 21, and a turbine 31j. Cooling air passages 36 in which cooling air flows are formed in a rotor shaft 34 and a plurality of turbine blades 35 of the turbine 31j of this embodiment. Further, cooling air passages (not shown) in which cooling air flows are also formed in turbine vanes 38 of the turbine 31j of this embodiment. The gas turbine 10j of this embodiment further includes a first air cooler 166a, a second air cooler 166b, and a third air cooler 166c that cool high-temperature components of the turbine 31j.

The first air cooler 166a cools a part of air A, which is compressed by the compressor 11j and is sent from the last stage, by exchanging heat between the air A and water, and sends the cooled air A to the cooling air passages 36 that are formed in the rotor shaft 34 and the plurality of turbine blades 35 of the turbine 31j. The second air cooler 166b cools a part of the air A, which is sent from the preceding stage of the last stage of the compressor 11j, by exchanging heat between the air A and water, and sends the cooled air A to the cooling air passages that are formed in the turbine vanes 38 of a specific stage of the turbine 31j. The third air cooler 166c cools a part of the air A, which is sent from the preceding stage of the above-mentioned preceding stage of the compressor 11*j*, by exchanging heat between the air A and water, and sends the cooled air A to the cooling air passages that are formed in the turbine vanes 38 of a subsequent stage of the above-mentioned specific stage of the turbine 31*j*.

The waste heat recovery device 100*j* of this embodiment includes a waste heat recovery boiler 110*j* that generates steam by the heat of exhaust gas EG discharged from the gas turbine 10*j*, steam turbines 121*a* and 1210 that are driven by the steam generated by the waste heat recovery boiler 110*j*, generators 122*a* and 122*e* that generate electricity by the driving of the steam turbines 121*a* and 121*c*, a steam condenser 123 that changes the steam having driven the steam turbine 121*a* into water, a water supply pump 124 that returns the water present in the steam condenser 123 to the waste heat recovery boiler 110*j*, and a Rankine cycle 150*j* in which a low-boiling-point medium LM circulates.

The waste heat recovery device 100*j* includes a low-pressure steam turbine 121*a* and a high-pressure steam turbine 121*c* as the steam turbines 121*a* and 121*c*. The generators 122*a* and 122*c* are connected to the low-pressure steam turbine 121*a* and the high-pressure steam turbine 121*c*, respectively. Here, the generators 122*a* and 122*c* have been connected to the steam turbines 121*a* and 121*c*, respectively, but the rotor of the low-pressure steam turbine 121*a* and the rotor of the high-pressure steam turbine 121*c* may be connected to each other and one generator may be connected to a total of the two steam turbines.

The waste heat recovery boiler 110*j* includes a low-pressure steam generating unit 111*a* that generates low-pressure steam LS and a high-pressure steam generating unit 111*c* that generates high-pressure steam HS.

The low-pressure steam generating unit 111*a* includes a low-pressure economizer 112*a* that heats water, a low-pressure evaporator 113*a* that changes the water heated by the low-pressure economizer 112*a* into steam, and a low-pressure superheater 114*a* that generates low-pressure steam LS by superheating the steam generated by the low-pressure evaporator 113*a*.

The high-pressure steam generating unit 111*c* includes a high-pressure pump 116*c* that increases the pressure of the water heated by the low-pressure economizer 112*a*, a high-pressure economizer 112*c* that heats the water of which the pressure has been increased by the high-pressure pump 116*c*, a high-pressure evaporator 113*c* that changes the water heated by the high-pressure economizer 112*c* into steam, and a high-pressure superheater 114*c* that superheats the steam generated by the high-pressure evaporator 113*c*. A low-pressure water line 117, which guides the water heated here to the low-pressure evaporator 113*a*, is connected to the low-pressure economizer 112*a*. A line is branched from the low-pressure water line 117, and is connected to a suction port of the high-pressure pump 116*c* as a low-pressure water branch line 117*c*.

Elements of the high-pressure steam generating unit 111*c* and the low-pressure steam generating unit 111*a*, that is, the high-pressure superheater 114*e*, the high-pressure evaporator 113*c*, the high-pressure economizer 112*c*, the low-pressure superheater 114*a*, the low-pressure evaporator 113*a*, and the low-pressure economizer 112*a* are arranged in this order toward the downstream side of the exhaust gas EG directed to the chimney 60 from the turbine 31*j*.

The steam condenser 123 and the low-pressure economizer 112*a* are connected to each other by a water supply line 131*a*. The water supply pump 124 is provided on the water supply line 131*a*. The low-pressure superheater 114*a* and a steam inlet of the low-pressure steam turbine 121*a* are connected to each other by a low-pressure steam line 132 that sends the low-pressure steam LS generated from the low-pressure superheater 114*a* to the low-pressure steam turbine 121*a*. A steam outlet of the low-pressure steam turbine 121*a* and the steam condenser 123 are connected to each other so that the low-pressure steam LS having driven the low-pressure steam turbine 121*a* is supplied to the steam condenser 123. The high-pressure superheater 114*c* and a steam inlet of the high-pressure steam turbine 121*c* are connected to each other by a high-pressure steam line 138 that sends the high-pressure steam HS generated from the high-pressure superheater 114*e* to the high-pressure steam turbine 121*c*. A high-pressure steam recovery line 139 is connected to a steam outlet of the high-pressure steam turbine 121*c*. The high-pressure steam recovery line 139 joins the low-pressure steam line 132.

The waste heat recovery device 100*j* of this embodiment further includes a water supply system-heat exchanger 160*j*. The water supply system-heat exchanger 160*j* includes the generator cooler 161 and the lubricating oil cooler 162 of each of the second to sixth embodiments.

As in the second to sixth embodiments, the water supply line 131*a* of this embodiment is also branched into two lines on the downstream side of the water supply pump 124. One line forms a first cooling water line 141 and the other line forms a second cooling water line 142. The first cooling water line 141 is connected to a water inlet of the generator cooler 161. The second cooling water line 142 is connected to a water inlet of the lubricating oil cooler 162. A preheated water supply line 149 is connected to each of a water outlet of the generator cooler 161 and a water outlet of the lubricating oil cooler 162. The preheated water supply line 149 is connected to the low-pressure economizer 112*a*.

The Rankine cycle 150*j* of the waste heat recovery device 100*j* of this embodiment includes: a first heater 155*a*, a second heater 155*b*, and a third heater 155*c* that heat a low-boiling-point medium LM, which is a liquid; an evaporator (heater) 151 that evaporates the low-boiling-point medium LM, which is a liquid heated by these heaters 155*a* to 155*c*, by further heating the low-boiling-point medium LM; a turbine 152 that is driven by the evaporated low-boiling-point medium LM; a condenser 153 that cools and condenses the low-boiling-point medium LM having driven the turbine 152; a preheater 156 that heats the condensed low-boiling-point medium LM by exchanging heat between the condensed low-boiling-point medium LM and the low-boiling-point medium LM having driven the turbine 152; a low-boiling-point medium pump 154 that increases the pressure of the condensed low-boiling-point medium LM and sends the low-boiling-point medium LM to the preheater 156 and the heaters 155*a* to 155*c*; and a low-boiling-point medium line 157*j* that allows the low-boiling-point medium LM to flow between the above-mentioned elements. For example, a generator 159, which generates electricity by the driving of the turbine 152, is connected to the turbine 152.

A low-boiling-point medium inlet of the first heater 155*a*, a low-boiling-point medium inlet of the third heater 155*c*, and a low-boiling-point medium inlet of the preheater 156 are connected to a discharge port of the low-boiling-point medium pump 154 by the low-boiling-point medium line 157*j*. That is, the first heater 155*a*, the third heater 155*c*, and the preheater 156 are connected in parallel to the low-boiling-point medium pump 154 by the low-boiling-point medium line 157*j*. A low-boiling-point medium outlet of the first heater 155*a* and a low-boiling-point medium inlet of the second heater 155*b* are connected to each other by the low-boiling-point medium line 157*j*. A low-boiling-point medium outlet of the second heater 155*b*, a low-boiling-point medium outlet of the third heater 155*c*, and a low-boiling-point medium outlet of the preheater 156 join the low-boiling-point medium line 157*j*, and are connected to a low-boiling-point medium inlet of an evaporator 151.

A heated water main line 171*m* is connected to a discharge port of the high-pressure pump 116*c* of the waste heat recovery boiler 110*j*. The heated water main line 171*m* is branched into three lines, and the three lines form a first heated water line 171*d*, a second heated water line 171*e*, and a third heated water line 171*f*, respectively. A heated water inlet of the evaporator 151 of the Rankine cycle 150*j* is connected to the first heated water line 171*d*. The first air cooler 166*a* is provided on the first heated water line 171*d*. Accordingly, the first air cooler 166*a* forms a first heated water system-heat exchanger 165*a*. A heated water inlet of the second heater 155*b* of the Rankine cycle 150*j* is connected to the second heated water line 171*e*. The second air cooler 166*b* is provided on the second heated water line 171*e*. Accordingly, the second air cooler 166*b* forms a second heated water system-heat exchanger 165*b*. A heated water inlet of the first heater 155*a* of the Rankine cycle 150*j* is connected to the third heated water line 171*f*. The third air cooler 166*c* is provided on the third heated water line 171*f*. Accordingly, the third air cooler 166*c* forms a third heated water system-heat exchanger 165*c*.

A first water recovery line 178*d* is connected to a heated water outlet of the evaporator 151 of the Rankine cycle 150*j*. The first water recovery line 178*d* is connected to the low-pressure water line 117 of the waste heat recovery boiler 110*j*. A second water recovery line 178*e* is connected to a heated water outlet of the second heater 155*b* of the Rankine cycle 150*j*. The second water recovery line 178*e* is connected to the water supply line 131*a* (the preheated water supply line 149). A second circulation pump 179*e*, which increases the pressure of water flowing in the second water recovery line 178*e*, is provided on the second water recovery line 178*e*. A third water recovery line 178*f* is connected to the first heater 155*a*. The third water recovery line 178*f* is connected to the second water recovery line 178*e*.

A line is branched from the low-pressure water branch line 117*c* of the waste heat recovery boiler 110*j*, and is connected to a heated water inlet of the third heater 155*c* of the Rankine cycle 150*j* as a fourth heated water line 171*g*. A fourth water recovery line 178*g* is connected to a heated water outlet of the third heater 155*c*. As in the case of the second water recovery line 178*e*, the fourth water recovery line 178*g* is connected to the water supply line 131*a* the preheated water supply line 149). A fourth circulation pump 179*g*, which increases the pressure of water flowing in the fourth water recovery line 178*g*, is provided on the fourth water recovery line 178*g*.

After the pressure of a part of water, which is heated by the low-pressure economizer 112*a* of the waste heat recovery boiler 110*j*, is increased by the high-pressure pump 116*c*, a part thereof is sent to the high-pressure economizer 112*c* and a part of the rest thereof is sent to the heated water main line 171*m*. A part of the water, which is sent to the heated water main line 171*m*, is sent to the first air cooler 166*a* through the first heated water line 171*d*. The other part of the water, which is sent to the heated water main line 171*m*, is sent to the second air cooler 166*b* through the second heated water line 171*e*. A part of the rest of the water, which is sent to the heated water main line 171*m*, is sent to the third air cooler 166*c* through the third heated water line 171*f*.

In the first air cooler 166*a*, heat is exchanged between the water which is heated by the low-pressure economizer 112*a* and of which the pressure is increased by the high-pressure pump 116*c* and a part of air, which is compressed by the compressor 11*j* and is sent from the last stage, the air is cooled, and the water is further heated. The cooled air is sent to cooling air passages 36 of a turbine rotor 33, and cools the turbine rotor 33. The water, which is further heated by the first air cooler 166*a*, is sent to the evaporator 151 of the Rankine cycle 150*j* through the first heated water line 171*d*.

In the second air cooler 166*b*, heat is exchanged between the water which is heated by the low-pressure economizer 112*a* and of which the pressure is increased by the high-pressure pump 116*c* and a part of air, which is compressed by the compressor 11*j* and is sent from the preceding stage of the last stage of the compressor 11*j*, the air is cooled, and the water is further heated. The cooled air is sent to cooling air passages formed in turbine vanes 38 of a specific stage of the turbine 31*j*, and cools the turbine vanes 38 of the specific stage. The water, which is further heated by the second air cooler 166*b*, is sent to the second heater 155*b* of the Rankine cycle 150*j* through the second heated water line 171*e*.

In the third air cooler 166*c*, heat is exchanged between the water which is heated by the low-pressure economizer 112*a* and of which the pressure is increased by the high-pressure pump 116*c* and a part of air, which is sent from the preceding stage of the above-mentioned preceding stage of the compressor 11*j*, the air is cooled, and the water is further heated. The cooled air is sent to cooling air passages formed in turbine vanes 38 of a subsequent stage of the above-mentioned specific stage of the turbine 31*j*, and cools the turbine vanes 38 of the subsequent stage. The water, which is further heated by the third air cooler 166*c*, is sent to the first heater 155*a* of the Rankine cycle 150*j* through the third heated water line 171*f*.

In the evaporator 151 of the Rankine cycle 150*j*, heat is exchanged between the liquid water that is heated by the low-pressure economizer 112*a* and the first air cooler 166*a* and the low-boiling-point medium LM that is a liquid, and the low-boiling-point medium LM is heated and evaporated (heating step). In this process, the water is cooled and flows out of the heated water outlet of the evaporator 151. The water, which flows out of the heated water outlet of the evaporator 151, flows into the low-pressure evaporator 113*a* through the first water recovery line 178*d* and the low-pressure water line 117 of the waste heat recovery boiler 110*j*.

The low-boiling-point medium LM, which is evaporated by the evaporator 151, is sent to the turbine 152 and drives the turbine 152. The low-boiling-point medium LM having driven the turbine 152 is sent to the condenser 153 through the preheater 156. In the condenser 153, heat is exchanged between the low-boiling-point medium LM and a cooling medium, and the low-boiling-point medium LM is cooled and condensed. The condensed low-boiling-point medium LM is sent to the first heater 155*a*, the third heater 155*c*, and the preheater 156 by the low-boiling-point medium pump 154.

In the first heater 155*a*, heat is exchanged between liquid water that is heated by the low-pressure economizer 112*a* and the third air cooler 166*e* and the low-boiling-point medium LM that is a liquid, and the low-boiling-point medium LM is heated. In this process, the water is cooled and flows out of the heated water outlet of the first heater 155*a* to the third water recovery line 178*f*.

In the second heater 155b, heat is exchanged between liquid water that is heated by the low-pressure economizer 112a and the second air cooler 166b and the low-boiling-point medium LM that is a liquid heated by the first heater 155a, and the low-boiling-point medium LM is further heated. In this process, the water is cooled and flows out of the heated water outlet of the second heater 155b to the second water recovery line 178e. This water joins the water that is sent from the first heater 155a through the third water recovery line 178f while flowing in the second water recovery line 178e. Then, after the pressure of this water is increased together with the pressure of the water sent from the first heater 155a by the second circulation pump 179e, this water flows into the low-pressure economizer 112a through the water supply line 131a (the preheated water supply line 149).

In the third heater 155e, heat is exchanged between liquid water that is heated by the low-pressure economizer 112a and the low-boiling-point medium LM that is a liquid, and the low-boiling-point medium LM is heated. In this process, the water is cooled and flows out of the heated water outlet of the third heater 155c to the fourth water recovery line 178g. Then, after the pressure of this water is increased by the fourth circulation pump 179g, this water flows into the low-pressure economizer 112a through the water supply line 131a (the preheated water supply line 149).

In the preheater 156, heat is exchanged between the condensed low-boiling-point medium LM and the low-boiling-point medium LM having driven the turbine 152, the condensed low-boiling-point medium LM is heated, and the low-boiling-point medium LM having driven the turbine 152 is cooled. The low-boiling-point medium LM, which has driven the turbine 152 and has been cooled by the preheater 156, is cooled by the condenser 153 and is condensed as described above.

The low-boiling-point medium LM that is heated by the first and second heaters 155a and 155b, the low-boiling-point medium LM that is heated by the third heater 155c, and the low-boiling-point medium LM that is heated by the preheater 156 join and are then sent to the evaporator 151.

As in this embodiment, in a manner different from the manner of the sixth embodiment, the low-boiling-point medium LM may be heated in stages by waters of which the temperatures are different from each other. Further, as in the sixth embodiment, the heat of the low-boiling-point medium LM having driven the turbine 152 may be used to heat the condensed low-boiling-point medium LM.

As described above, even in this embodiment, as in the fourth and sixth embodiments, liquid water, which is heated by the low-pressure economizer 112a, is sent to the Rankine cycle 150j and heat is exchanged between the water and the low-boiling-point medium LM. Accordingly, it is possible to reduce the size of the Rankine cycle 150j, to improve the thermal efficiency of the Rankine cycle 150j, and to effectively use the heat of the low-temperature exhaust gas EG.

Furthermore, even in this embodiment, the waste heat of the gas turbine 10j can be effectively used since the heat of an object to be cooled in the gas turbine 10j is used to heat water, which is to be sent to the Rankine cycle 150j, by the air coolers 166a, 166b, and 166c. Since the waste heat of the gas turbine 10j is effectively used, an increase in the amount of heat to be recovered is used to heat the low-boiling-point medium LM.

Further, since the low-boiling-point medium LM is heated in stages by waters of which the temperatures are different from each other as in the sixth embodiment even in this embodiment, the output and efficiency of the Rankine cycle 150j can be improved. Furthermore, since the heaters 155a and 155b are disposed in series and the heaters 155a and 155b are disposed parallel with the heater 155c in this embodiment, heat can be received at an appropriate position according to the flow rate and the temperature level of water serving as a heat source. As a result, an output and efficiency can be increased.

Eighth Embodiment

Figure 15:
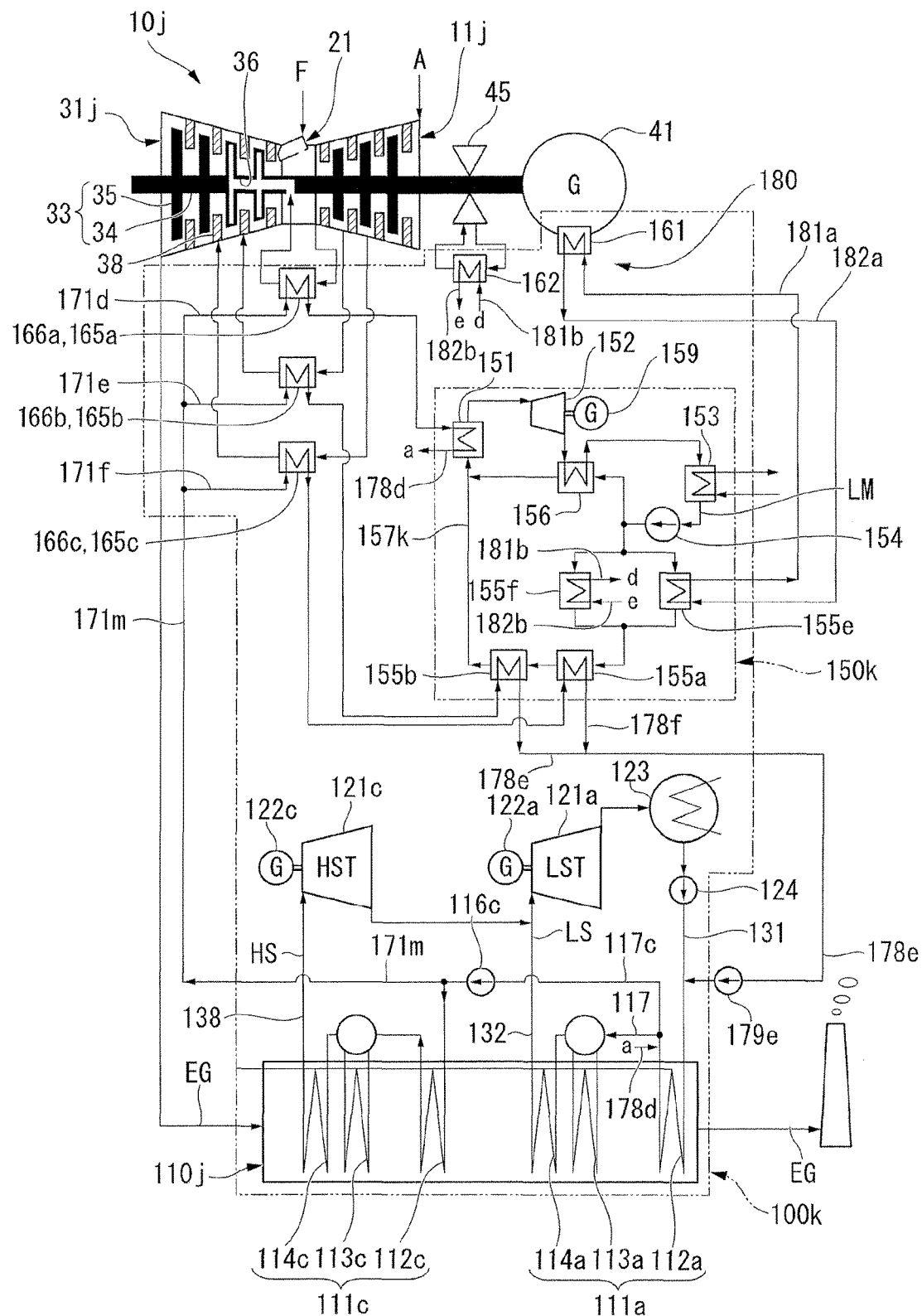
FIG. 15 is a system diagram of a gas turbine plant according to an eighth embodiment of the invention.

A gas turbine plant according to an eighth embodiment of the invention will be described with reference to FIG. 15.

The gas turbine plant of this embodiment is a gas turbine plant that is obtained by mainly changing the structure of the Rankine cycle 150j of the seventh embodiment.

A gas turbine 10j of this embodiment is the same as that of the seventh embodiment. Accordingly, the gas turbine 10j of this embodiment also includes a first air cooler 166a, a second air cooler 166b, and a third air cooler 166c. Further, a waste heat recovery device 100k of this embodiment includes a Rankine cycle 150k and the same waste heat recovery boiler 110j as that of the seventh embodiment. The waste heat recovery device 100k of this embodiment further includes a connected object cooler 180. The connected object cooler 180 includes the generator cooler 161 and the lubricating oil cooler 162 of each of the second to sixth embodiments. The generator cooler 161 allows heat to be exchanged between a cooling medium of a generator 41 and a connected object-cooling medium. A first cooled medium line 181a is connected to a connected object-cooling medium inlet of the generator cooler 161. A first heated medium line 182a is connected to a connected object-cooling medium outlet of the generator cooler 161. The lubricating oil cooler 162 allows heat to be exchanged between a lubricating oil and a connected object-cooling medium. A second cooled medium line 181b is connected to a connected object-cooling medium inlet of the lubricating oil cooler 162. A second heated medium line 182b is connected to a connected object-cooling medium outlet of the lubricating oil cooler 162.

A water supply line 131 of this embodiment is connected to a low-pressure economizer 112a as in the first embodiment. That is, the water supply line 131 of this embodiment does not pass through the generator cooler 161 and the lubricating oil cooler 162 unlike in the second to seventh embodiments.

The Rankine cycle 150k of the waste heat recovery device 100k of this embodiment includes: a first heater 155a, a second heater 155b, a third heater 155e, and a fourth heater 155f that heat a low-boiling-point medium LM, which is a liquid; an evaporator (heater) 151 that evaporates the low-boiling-point medium LM, which is a liquid heated by these heater 155a, 155b, 155e, and 155f, by further heating the low-boiling-point medium LM; a turbine 152 that is driven by the evaporated low-boiling-point medium LM; a condenser 153 that cools and condenses the low-boiling-point medium LM having driven the turbine 152; a preheater 156 that heats the condensed low-boiling-point medium LM by exchanging heat between the condensed low-boiling-point medium LM and the low-boiling-point medium LM having driven the turbine 152; a low-boiling-point medium pump 154 that increases the pressure of the condensed low-boiling-point medium LM and sends the low-boiling-point medium LM to the preheater 156 and the heater 155a, 155b, 155e, and 155f; and a low-boiling-point medium line 157k that allows the low-boiling-point medium LM to flow between the above-mentioned elements. For example, a generator 159, which generates electricity by the driving of the turbine 152, is connected to the turbine 152.

A low-boiling-point medium inlet of the third heater 155e, a low-boiling-point medium inlet of the fourth heater 155f, and a low-boiling-point medium inlet of the preheater 156 are connected to a discharge port of the low-boiling-point medium pump 154 by the low-boiling-point medium line 157k. The third heater 155e allows heat to be exchanged between a low-boiling-point medium LM that is sent from the low-boiling-point medium pump 154 and a connected object-cooling medium that is sent from the generator cooler 161. For this reason, the first heated medium line 182a is connected to a connected object-cooling medium inlet of the third heater 155c and the first cooled medium line 181a is connected to a connected object-cooling medium outlet of the third heater 155e. The fourth heater 155f allows heat to be exchanged between the low-boiling-point medium LM that is sent from the low-boiling-point medium pump 154 and a connected object-cooling medium that is sent from the lubricating oil cooler 162. For this reason, the second heated medium line 182b is connected to a connected object-cooling medium inlet of the fourth heater 155f and the second cooled medium line 181b is connected to a connected object-cooling medium outlet of the fourth heater 155f. Accordingly, the third heater 155e and the fourth heater 155f form a B-heater that allows heat to be exchanged between the low-boiling-point medium and the connected object-cooling medium.

A low-boiling-point medium outlet of the third heater 155e and a low-boiling-point medium outlet of the fourth heater 155f join the low-boiling-point medium line 157k, and are connected to a low-boiling-point medium inlet of the first heater 155a. A low-boiling-point medium outlet of the first heater 155a and a low-boiling-point medium inlet of the second heater 155b are connected to each other by the low-boiling-point medium line 157k. A low-boiling-point medium outlet of the second heater 155b and a low-boiling-point medium outlet of the preheater 156 join the low-boiling-point medium line 157k, and are connected to a low-boiling-point medium inlet of an evaporator 151.

As in the seventh embodiment, a heated water inlet of the evaporator 151 is connected to a first heated water line 171d on which the first air cooler 166a is provided. As in the seventh embodiment, a heated water inlet of the second heater 155b is connected to a second heated water line 171e on which the second air cooler 166b is provided. As in the seventh embodiment, a heated water inlet of the first heater 155a is connected to a third heated water line 171f on which the third air cooler 166c is provided. Accordingly, the first and second heater 155a and 155b form an A-heater that allows heat to be exchanged between the low-boiling-point medium LM, which is a liquid, and liquid water, which has passed through the heated water line.

As in the seventh embodiment, a first water recovery line 178d is connected to a heated water outlet of the evaporator 151 of the Rankine cycle 150k. The first water recovery line 178d is connected to a low-pressure water line 117 of the waste heat recovery boiler 110j. A second water recovery line 178e is connected to a heated water outlet of the second heater 155b of the Rankine cycle 150k. The second water recovery line 178e is connected to the water supply line 131. A second circulation pump 179e, which increases the pressure of water flowing in the second water recovery line 178e, is provided on the second water recovery line 178e. As in the seventh embodiment, a third water recovery line 178f is connected to the first heater 155a. The third water recovery line 178f is connected to the second water recovery line 178e.

As in the seventh embodiment, in the evaporator 151 of the Rankine cycle 150k, heat is exchanged between liquid water that is heated by the low-pressure economizer 112a and the first air cooler 166a and the low-boiling-point medium LM that is a liquid, the low-boiling-point medium LM is heated and evaporated (A-heating step). In this process, the water is cooled and flows out of the heated water outlet of the evaporator 151. The water, which flows out of the heated water outlet of the evaporator 151, flows into a low-pressure evaporator 113a through the first water recovery line 178d and the low-pressure water line 117 of the waste heat recovery boiler 110j.

As in the seventh embodiment, the low-boiling-point medium LM, which is evaporated by the evaporator 151, is sent to the turbine 152 and drives the turbine 152. The low-boiling-point medium LM, which has driven the turbine 152, is sent to the condenser 153 through the preheater 156. In the condenser 153, heat is exchanged between the low-boiling-point medium LM and a cooling medium, and the low-boiling-point medium LM is cooled and condensed. The condensed low-boiling-point medium LM is sent to the third heater 155e, the fourth heater 155f, and the preheater 156 by the low-boiling-point medium pump 154.

In the third heater 155e, heat is exchanged between a connected object-cooling medium that is heated by the generator cooler 161 and a low-boiling-point medium LM that is a liquid. As a result, the low-boiling-point medium LM is heated (B-heating step) and the connected object-cooling medium is cooled. The cooled connected object-cooling medium returns to the generator cooler 161 through the first cooled medium line 181a. In the generator cooler 161, heat is exchanged between the cooled connected object-cooling medium and the cooling medium of the generator 41 (connected object-cooling step). In the fourth heater 155f, heal is exchanged between a connected object-cooling medium that is heated by the lubricating oil cooler 162 and a low-boiling-point medium LM that is a liquid. As a result, the low-boiling-point medium LM is heated (B-heating step) and the connected object-cooling medium is cooled. The cooled connected object-cooling medium returns to the lubricating oil cooler 162 through the second cooled medium 181b. In the lubricating oil cooler 162, heat is exchanged between the cooled connected object-cooling medium and the lubricating oil (connected object-cooling step).

In the first heater 155a, heat is exchanged between liquid water that is heated by the low-pressure economizer 112a and the third air cooler 166c and the low-boiling-point medium LM that is a liquid heated by the third heater 155e and the fourth heater 155f, and the low-boiling-point medium LM is further heated (A-heating step). In this process, the water is cooled and flows out of the heated water outlet of the first heater 155a to the third water recovery line 178f.

In the second heater 155b, as in the seventh embodiment, heat is exchanged between liquid water that is heated by the low-pressure economizer 112a and the second air cooler 166b and the low-boiling-point medium LM that is a liquid heated by the first heater 155a, and the low-boiling-point medium LM is further heated (A-heating step). In this process, the water is cooled and flows out of the heated water outlet of the second heater 155b to the second water recovery line 178e. As in the seventh embodiment, this water joins the water that is sent from the first heater 155a through the third water recovery line 178f while flowing in the second water recovery line 178e. Then, after the pressure of this water is increased together with the pressure of the water sent from the first heater 155a by the second circulation pump 179e, this water flows into the low-pressure economizer 112a through the water supply line 131.

In the preheater 156, as in the seventh embodiment, heat is exchanged between the condensed low-boiling-point medium LM and the low-boiling-point medium LM having driven the turbine 152, the condensed low-boiling-point medium LM is heated, and the low-boiling-point medium LM having driven the turbine 152 is cooled. The low-boiling-point medium LM, which has driven the turbine 152 and has been cooled by the preheater 156, is cooled by the condenser 153 and is condensed as described above.

The low-boiling-point medium LM that is heated by the third heater 155e, the fourth heater 155f, the first heater 155a, and the second heater 155b and the low-boiling-point medium LM that is heated by the preheater 156 join and are then sent to the evaporator 151.

As in this embodiment, in a manner different from the manners of the sixth or seventh embodiment, the low-boiling-point medium LM may be heated in stages by waters or connected object-cooling media of which the temperatures are different from each other. Further, as in the sixth embodiment, the heat of the low-boiling-point medium LM having driven the turbine 152 may be used to heat the condensed low-boiling-point medium LM.

As described above, even in this embodiment, as in the fourth embodiment, the sixth embodiment, and the like, liquid water, which is heated by the low-pressure economizer 112a, is sent to the Rankine cycle 150k and heat is exchanged between the water and the low-boiling-point medium LM. Accordingly, it is possible to reduce the size of the Rankine cycle 150k, to improve the thermal efficiency of the Rankine cycle 150k, and to effectively use the heat of the low-temperature exhaust gas EG.

Furthermore, even in this embodiment, the waste heat of the gas turbine 10j, which is recovered by the air coolers 166a, 166b, and 166c, can be effectively used by the Rankine cycle 150k. Moreover, in this embodiment, the waste heat of a connected object of the gas turbine, which is recovered by the generator cooler 161 and the lubricating oil cooler 162, can be effectively used by the Rankine cycle 150k.

Further, since the low-boiling-point medium LM is heated in stages even in this embodiment as in the sixth or seventh embodiment, the output of the Rankine cycle 150k can be improved. Furthermore, since the waste heat of a relatively low-temperature connected object and the heat of water, which is relatively high-temperature liquid heated by the low-pressure economizer 112a and the first air cooler 166a, are used together in this embodiment, the output and efficiency of the Rankine cycle 150k can be increased while waste heat having relatively low temperature is also effectively used. As a result, the output and efficiency of the plant can be increased.

In the fourth to eighth embodiments, air cooled by the air cooler 166 (or the first air cooler 166a) is sent to the cooling air passages 36 of the turbine rotor 33 and cools the turbine rotor 33. However, this air may be sent to high-temperature components, which are in contact with combustion gas, other than the turbine rotor 33 among components of the gas turbine. Further, air, which is cooled by the second air cooler 166b or the third air cooler 166c, cools the turbine vanes 38 of the turbine 31j in the seventh and eighth embodiments. However, this air may also be sent to high-temperature components, which are in contact with combustion gas, other than the turbine vanes 38 among components of the gas turbine.

Figure 16:
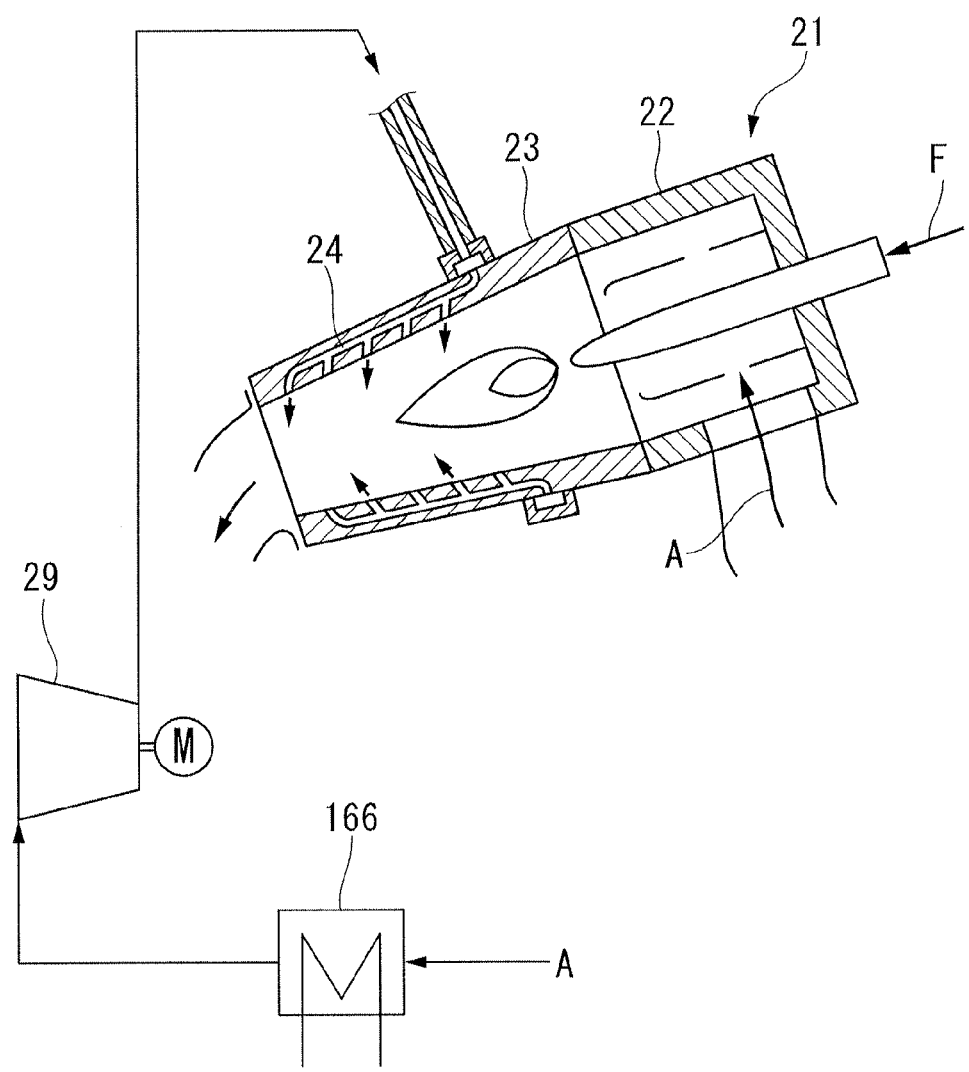
FIG. 16 is a view showing a modification example of an air cooler of an embodiment of the invention.

For example, air, which is cooled by an air cooler 166 or the like and is sent from a compressor 11a, may be sent to a combustor 21 as shown in FIG. 16. The combustor 21 includes a combustor liner (or a transition piece) 23 includes a combustor liner (or a transition piece) 23 where fuel F is combusted in air A sent from the compressor 11a and combustion gas is generated, and an injector 22 that injects fuel F and air A sent from the compressor 11a into the combustor liner 23. Cooling air passages 24 through which cooling air passes are formed in a member forming the combustor liner 23 in order to cool this member. Air, which is sent from the compressor 11a and is cooled by the air cooler 166 or the like, is sent to the cooling air passages 24 of the combustor liner 23, and cools the combustor liner 23. In this case, after the pressure of the air A sent from the air cooler 166 is increased by a cooling air compressor 29, the air A is sent to the combustor 21.

Modification Example of Low-Boiling-Point Medium Rankine Cycle

A low-boiling-point medium Rankine cycle, which is applied to a gas turbine plant, may be any Rankine cycle without being limited to the Rankine cycle 150 of the first embodiment or the like, the Rankine cycle 150e of the sixth embodiment, the Rankine cycle 150j of the seventh embodiment, and the Rankine cycle 150k of the eighth embodiment. Other examples of the Rankine cycle will be described below.

Figure 17:
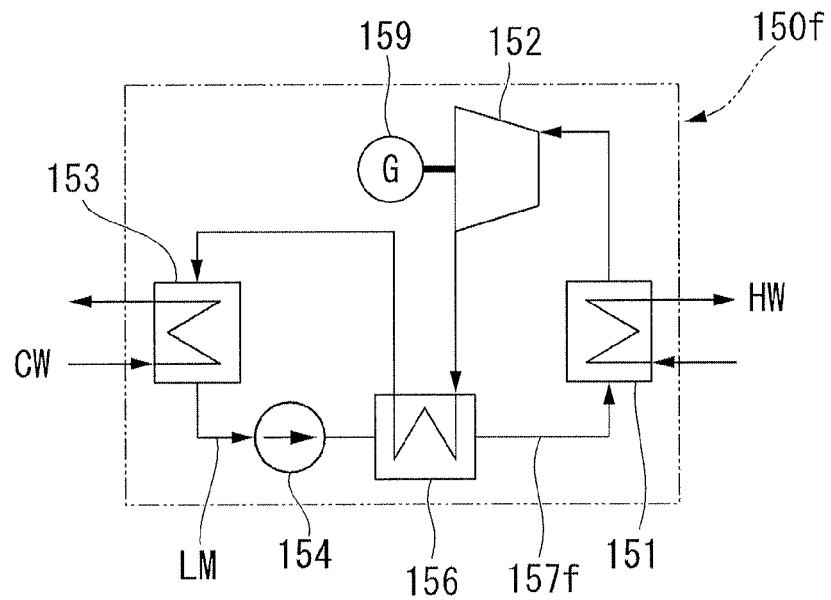
FIG. 17 is a system diagram of a low-boiling-point medium Rankine cycle of a first modification example of the invention.

As shown in FIG. 17, a Rankine cycle 150f of a first modification example includes: an evaporator (heater) 151 that heats and evaporates a low-boiling-point medium LM, which is a liquid, by exchanging heat between the low-boiling-point medium LM and water; a turbine 152 that is driven by the evaporated low-boiling-point medium LM; a condenser 153 that cools and condenses the low-boiling-point medium LM having driven the turbine 152; a preheater 156 that heats the condensed low-boiling-point medium LM by exchanging heat between the condensed low-boiling-point medium LM and the low-boiling-point medium LM having driven the turbine 152; a low-boiling-point medium pump 154 that increases the pressure of the condensed low-boiling-point medium LM and sends the low-boiling-point medium LM to the preheater 156 and the evaporator 151; and a low-boiling-point medium line 157f that allows the low-boiling-point medium LM to flow between the above-mentioned elements.

That is, the Rankine cycle 150f of the first modification example is a Rankine cycle that is obtained by omitting the heater 155 from the Rankine cycle 150e of the sixth embodiment.

Figure 18:
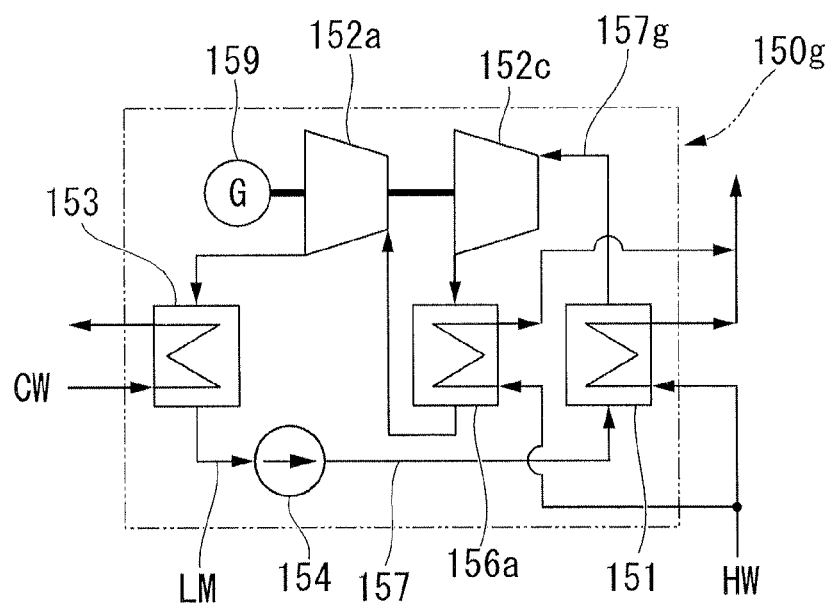
FIG. 18 is a system diagram of a low-boiling-point medium Rankine cycle of a second modification example of the invention.

As shown in FIG. 18, a Rankine cycle 150g of a second modification example includes: an evaporator (heater) t) 151 that heats and evaporates a low-boiling-point medium LM, which is a liquid, by exchanging heat between the low-boiling-point medium LM and water; a high-pressure turbine 152c that is driven by the evaporated low-boiling-point medium LM; a reheater 156a that heats the low-boiling-point medium. LM by exchanging heat between the low-boiling-point medium LM, which has driven the high-pressure turbine 152c, and water; a low-pressure turbine 152a that is driven by the low-boiling-point medium LM heated by the reheater 156a; a condenser 153 that cools and condenses the low-boiling-point medium LM having driven the low-pressure turbine 152a; a low-boiling-point medium pump 154 that increases the pressure of the condensed low-boiling-point medium LM and sends the low-boiling-point medium LM to the evaporator 151; and a low-boiling-point medium line 157g that allows the low-boiling-point medium LM to flow between the above-mentioned elements.

In the preheater 156 of the Rankine cycle 150f of the first modification example, heat is exchanged between the condensed low-boiling-point medium LM and the low-boiling-point medium LM having driven the turbine 152 and the condensed low-boiling-point medium LM is heated. In the reheater 156a of the Rankine cycle 150g of the second modification example, heat is exchanged between the low-boiling-point medium LM that has driven the high-pressure turbine 152e and water that is supplied from the outside, and the low-boiling-point medium LM having driven the high-pressure turbine 152c is heated and is sent to the low-pressure turbine 152a. In this modification example, water supplied to the evaporator 151 and water supplied to the reheater 156a may be supplied from the same source of supply, and may be supplied from different sources of supply.

Figure 19:
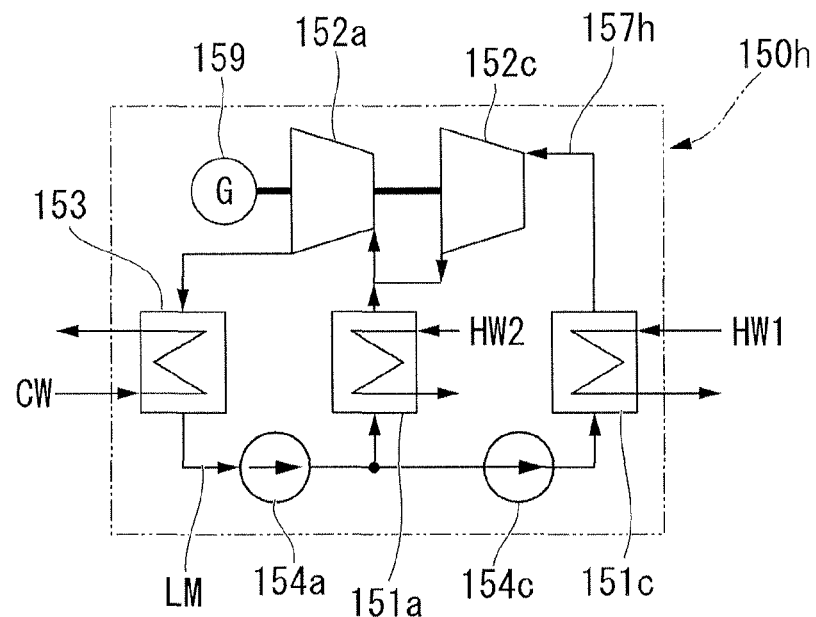
FIG. 19 is a system diagram of a low-boiling-point edium Rankine cycle of a third modification example of the invention.

As shown in FIG. 19, a Rankine cycle 150h of a third modification example includes: a low-boiling-point medium low-pressure pump 154a that increases the pressure of a condensed low-boiling-point medium LM; a low-boiling-point medium high-pressure pump 154c that further increases the pressure of the low-boiling-point medium LM of which the pressure has been increased by the low-boiling-point medium low-pressure pump 154a; a high-pressure evaporator 151c that evaporates the low-boiling-point medium LM, which is sent from the low-boiling-point medium high-pressure pump 154c, by exchanging heat between the low-boiling-point medium LM and water HW1; a high-pressure turbine 152c that is driven by the low-boiling-point medium LM sent from the high-pressure evaporator 151c; a low-pressure evaporator 151a that evaporates the low-boiling-point medium LM, which is sent from the low-boiling-point medium low-pressure pump 154a, by exchanging heat between the low-boiling-point medium LM and water HW2; a low-pressure turbine 152a that is driven by the low-boiling-point medium LM sent from the low-pressure evaporator 151a; a condenser 153 that cools and condenses the low-boiling-point medium LM having driven the low-pressure turbine 152a; and a low-boiling-point medium line 157h that allows the low-boiling-point medium LM to flow between the above-mentioned elements. The temperature of the liquid water HW1, which is supplied to the high-pressure evaporator 151c, is higher than the temperature of the liquid water HW2 that is supplied to the low-pressure evaporator 151a.

The low-boiling-point medium LM, which is evaporated by the high-pressure evaporator 151c, is sent to the high-pressure turbine 152c and drives the high-pressure turbine 152c. After the low-boiling-point medium LM, which has driven the high-pressure turbine 152c, is mixed with the low-boiling-point medium LM that is generated by the low-pressure evaporator 151a, the low-boiling-point medium LM is sent to the low-pressure turbine 152a and drives the low-pressure turbine 152a. The low-boiling-point medium LM, which has driven the low-pressure turbine 152a, is condensed by the condenser 153. The pressure of the low-boiling-point medium LM, which has been condensed by the condenser 153, is increased by the low-boiling-point medium low-pressure pump 154a. A part of the low-boiling-point medium LM of which the pressure has been increased by the low-boiling-point medium low-pressure pump 154a is sent to the low-pressure evaporator 151a, and the rest of the low-boiling-point medium LM is sent to the low-boiling-point medium high-pressure pump 154e.

For example, lubricating oil cooling water, generator cooling water, gas turbine compressor-intermediate cooling water, water that is heated by the low-pressure economizer 112a of the waste heat recovery boiler 110, water that is heated by the intermediate-pressure economizer 112b, and the like are considered as the liquid water HW2 that is to be supplied to the low-pressure evaporator 151a. Further, in a case in which the liquid water HW2, which is to be supplied to the low-pressure evaporator 151a, is water to be heated by the low-pressure economizer 112a of the waste heat recovery boiler 110, water that is heated by the intermediate-pressure economizer 112b, water that is heated by the second high-pressure economizer 112d, and the like are considered as the liquid water HW1 that is to be supplied to the high-pressure evaporator 151c.

Figure 20:
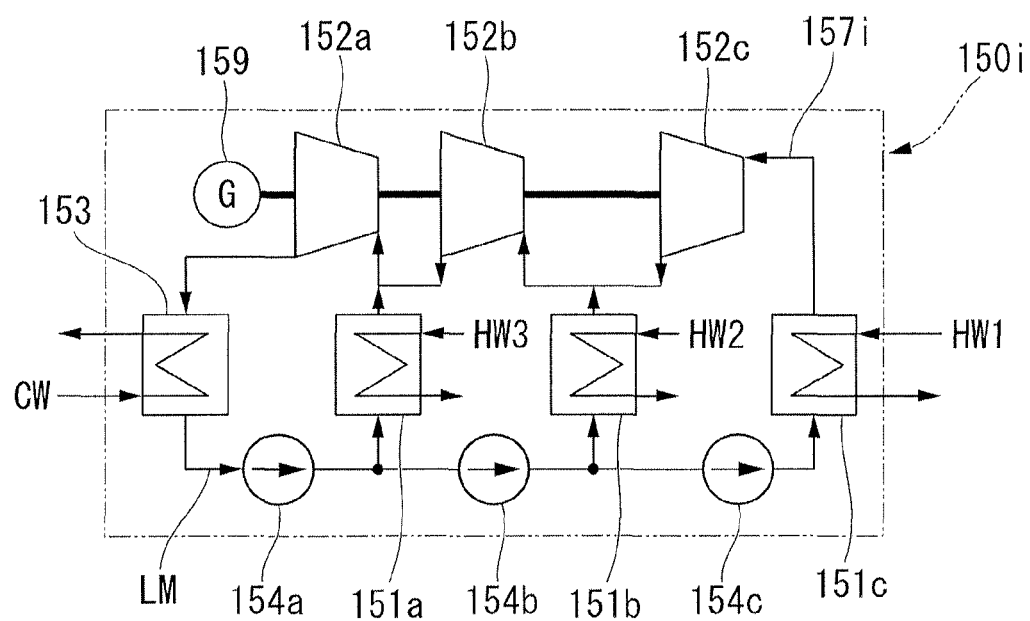
FIG. 20 is a system diagram of a low-boiling-point medium Rankine cycle of a fourth modification example of the invention.

As shown in FIG. 20, a Rankine cycle 150i of a fourth modification example includes: a low-boiling-point medium low-pressure pump 154a that increases the pressure of a condensed low-boiling-point medium LM; a low-boiling-point medium intermediate-pressure pump 154b that further increases the pressure of the low-boiling-point medium LM of which the pressure has been increased by the low-boiling-point medium low-pressure pump 154a; a low-boiling-point medium high-pressure pump 154c that further increases the pressure of the low-boiling-point medium LM of which the pressure has been increased by the low-boiling-point medium intermediate-pressure pump 154b; a high-pressure evaporator 151c that evaporates the low-boiling-point medium LM, which is sent from the low-boiling-point medium high-pressure pump 154e, by exchanging heat between the low-boiling-point medium LM and water HW1; a high-pressure turbine 152e that is driven by the low-boiling-point medium LM sent from the high-pressure evaporator 151c; an intermediate-pressure evaporator 151b that evaporates the low-boiling-point medium LM, which is sent from the low-boiling-point medium intermediate-pressure pump 154b, by exchanging heat between the low-boiling-point medium LM and water HW2; an intermediate-pressure turbine 152b that is driven by the low-boiling-point medium LM sent from the intermediate-pressure evaporator 151b; a low-pressure evaporator 151a that evaporates the low-boiling-point medium LM, which is sent from the low-boiling-point medium low-pressure pump 154a, by exchanging heat between the low-boiling-point medium LM and water HW3; a low-pressure turbine 152a that is driven by the low-boiling-point medium LM sent from the low-pressure evaporator 151a; a condenser 153 that cools and condenses the low-boiling-point medium LM having driven the low-pressure turbine 152a; and a low-boiling-point medium line 157i that allows the low-boiling-point medium LM to flow between the above-mentioned elements. The temperature of the liquid water HW1, which is supplied to the high-pressure evaporator 151c, is higher than the temperature of the liquid water HW2 that is supplied to the intermediate-pressure evaporator 151b. Further, the temperature of the liquid water HW2, which is supplied to the intermediate-pressure evaporator 151b, is higher than the temperature of the liquid water HW3 that is supplied to the low-pressure evaporator 151a.

The low-boiling-point medium LM, which is evaporated by the high-pressure evaporator 151c, is sent to the high-pressure turbine 152c and drives the high-pressure turbine 152c. After the low-boiling-point medium LM, which has driven the high-pressure turbine 152c, is mixed with the low-boiling-point medium LM that is generated by the intermediate-pressure evaporator 151b, the low-boiling-point medium LM is sent to the intermediate-pressure turbine 152b and drives the intermediate-pressure turbine 152b. After the low-boiling-point medium LM, which has driven the intermediate-pressure turbine 152b, is mixed with the low-boiling-point medium LM that is generated by the low-pressure evaporator 151a, the low-boiling-point medium LM is sent to the low-pressure turbine 152a and drives the low-pressure turbine 152a. The low-boiling-point medium LM, which has driven the low-pressure turbine 152a, is condensed by the condenser 153. The pressure of the low-boiling-point medium LM, which has been condensed by the condenser 153, is increased by the low-boiling-point medium low-pressure pump 154a. A part of the low-boiling-point medium LM of which the pressure has been increased by the low-boiling-point medium low-pressure pump 154a is sent to the low-pressure evaporator 151a, and the rest of the low-boiling-point medium LM is sent to the low-boiling-point medium intermediate-pressure pump 154b. A part of the low-boiling-point medium LM of which the pressure has been increased by the low-boiling-point medium intermediate-pressure pump 154b is sent to the intermediate-pressure evaporator 151b, and the rest of the low-boiling-point medium LM is sent to the low-boiling-point medium high-pressure pump 154c.

For example, lubricating oil cooling water, generator cooling water, gas turbine compressor-intermediate cooling water, water that is heated by the low-pressure economizer 112a of the waste heat recovery boiler 110, and the like are considered as the liquid water 11W3 that is to be supplied to the low-pressure evaporator 151a. Further, water that is heated by the intermediate-pressure economizer 112b of the waste heat recovery boiler 110, and the like are considered as the liquid water HW2 that is to be supplied to the intermediate-pressure evaporator 151b. Water that is heated by the second high-pressure economizer 112d of the waste heat recovery boiler 110, and the like are considered as the liquid water HW1 that is to be supplied to the high-pressure evaporator 151c.

Modification Example of Compressor

Figure 21:
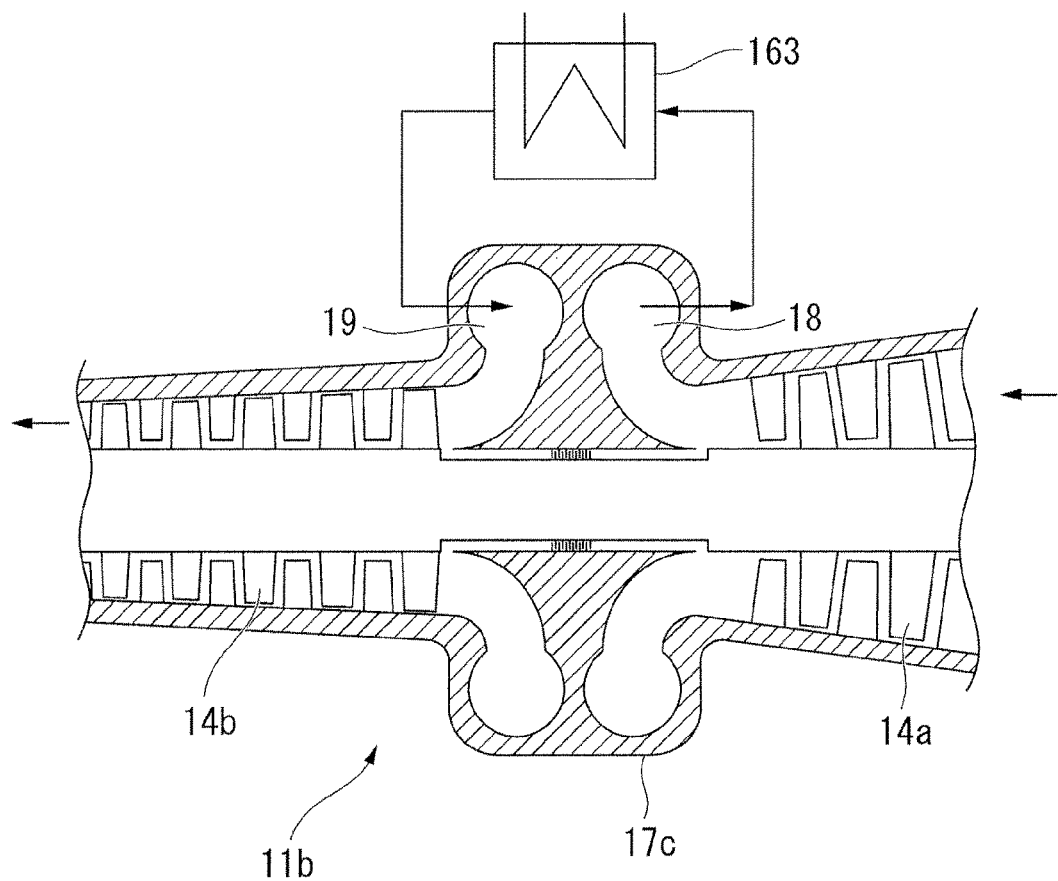
FIG. 21 is a sectional view of main portions of a modification example of the compressor of the second to sixth embodiments of the invention.

The compressor 11a of each of the second to sixth embodiments includes the low-pressure compressor 12a and the high-pressure compressor 12b that include compressor casings independent of each other. However, the compressor of each of the second to sixth embodiments may include only one compressor casing 17c as shown in FIG. 21.

In this case, a bleed port 18 is formed in an intermediate stage of one compressor casing 17c, and an intake port 19 is formed on the side that is adjacent to the bleed port 18 and is closer to the high-pressure side than the bleed port 18. An air inlet of the intercooler 163 is connected to the bleed port 18, and an air outlet of the intercooler 163 is connected to the intake port 19. A portion of the compressor 11b, which is closer to the low-pressure side than the bleed port 18, forms a low-pressure compression portion 14a, and a portion of the compressor 11b, which is closer to the high-pressure side than the intake port 19, forms a high-pressure compression portion 14b.

Modification Example of Waste Heat Recovery Device

Each of the waste heat recovery devices of the above-mentioned embodiments includes the steam turbine. However, as long as a waste heat recovery device 100f includes a waste heat recovery boiler 110f that includes an economizer and an evaporator for changing the water, which is heated by the economizer, into steam by further heating the water as shown in FIG. 22, a steam turbine may not be provided.

Figure 22:
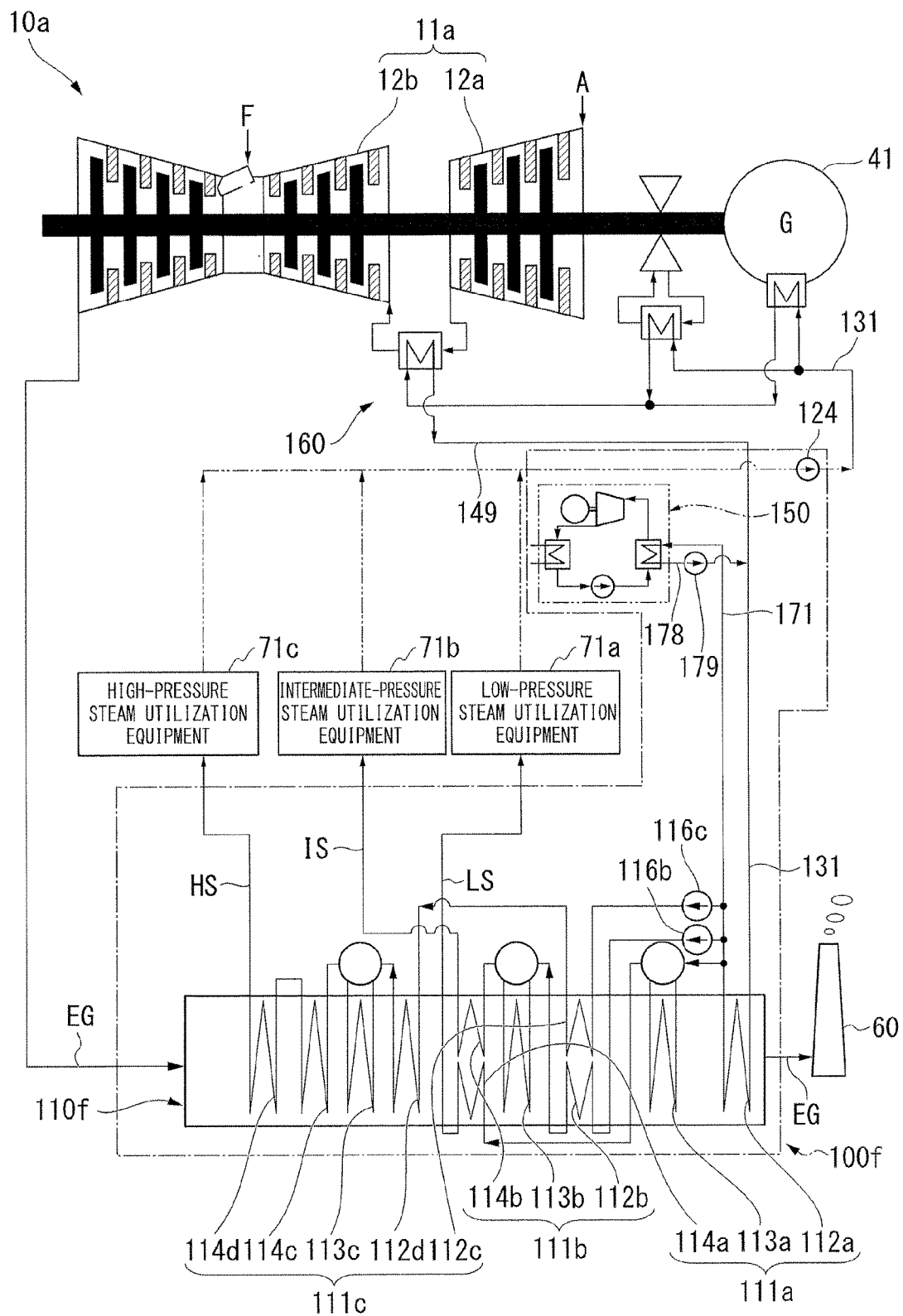
FIG. 22 is a system diagram of a modification example of a waste heat recovery facility of each embodiment of the invention.

In the waste heat recovery boiler 110f shown in FIG. 22, low-pressure steam LS generated from a low-pressure steam generating unit 111a is sent to a low-pressure steam utilization equipment 71a, intermediate-pressure steam IS generated from an intermediate-pressure steam generating unit 111b is sent to an intermediate-pressure steam utilization equipment 71b, and high-pressure steam HS generated from a high-pressure steam generating unit 111c is sent to a high-pressure steam utilization equipment 71c. The steam sent to each of the steam utilization equipments 71a, 71b, and 71c is changed into liquid water and is then sent to a water supply pump 124.

Further, the waste heat recovery boiler 110f including a low-pressure steam generating wilt 111a, an intermediate-pressure steam generating unit 111b, and a high-pressure steam generating unit 111c has been exemplified here. However, as long as a waste heat recovery boiler includes an economizer and an evaporator for changing water, which is heated by the economizer, into steam by further heating the water, any waste heat recovery boiler may be used as the waste heat recovery boiler.

INDUSTRIAL APPLICABILITY

In an aspect of the invention, while waste heat generated from a gas turbine is effectively used by a low-boiling-point medium Rankine cycle, the size of the low-boiling-point medium Rankine cycle can be reduced.

REFERENCE SIGNS LIST 10, 10a, 10j: gas turbine
11, 11a, 11b, 11j: compressor
12a: low-pressure compressor
12b: high-pressure compressor
21: combustor
31, 31j: turbine
33: turbine rotor
36: cooling air passage
40, 40a: gas turbine rotor
41: generator
45: bearing
71a: low-pressure steam utilization equipment
71b: intermediate-pressure steam utilization equipment
71e: high-pressure steam utilization equipment
100, 100a, 100b, 100c, 100d, 100e, 100f, 100j, 100k: waste heat recovery device
110, 110f, 110j: waste heat recovery boiler
111a: low-pressure steam generating unit
111b: intermediate-pressure steam generating unit
111c: high-pressure steam generating unit
112a: low-pressure economizer
113a: low-pressure evaporator
123: steam condenser
124: water supply pump
131: water supply line
141: first cooling water line
142: second cooling water line
143: third cooling water line
149: preheated water supply line 150, 150e, 150f, 150g, 150h, 150i, 150j, 150k: low-boiling-point medium Rankine cycle
151: evaporator (heater)
152: turbine
153: condenser
154: low-boiling-point medium pump
155: heater
155a: first heater
155b: second heater
155c, 155e: third heater
155f: fourth heater
160, 160j: water supply system-heat exchanger
161: generator cooler
162: lubricating oil cooler
163: intercooler
165: heated water system-heat exchanger
165a: first heated water system-heat exchanger
165b: second heated water system-heat exchanger
165c: third heated water system-heat exchanger
166: air cooler
166a: first air cooler
166b: second air cooler
166c: third air cooler
171, 171b, 171d: heated water line
171a: first heated water line
171b: second heated water line
171c: third heated water line
171m: heated water main line
177, 177d: water recovery system-heat exchanger
178, 178b, 178d: water recovery line
179: circulation pump
179d: high-pressure circulation pump
180: connected object cooler

The invention claimed is:

1. A waste heat recovery device comprising:
a low-boiling-point medium Rankine cycle in which a low-boiling-point medium circulates while the low-boiling-point medium is repeatedly condensed and evaporated;
a heated water line that guides heated water in liquid form to the low-boiling-point medium Rankine cycle from a boiler configured to heat the water by high-temperature gas; and
a water recovery line that returns the water, which has been led from the heated water line to the low-boiling-point medium Rankine cycle, and passed through the low-boiling-point medium Rankine cycle, to the boiler; and
a water supply line that supplies the water to the boiler,
wherein the low-boiling-point medium Rankine cycle includes a heater that heats the low-boiling-point medium by exchanging heat between the low-boiling-point medium, which is a liquid, and the water, which is the liquid having passed through the heated water line,
wherein the boiler includes at least one or more evaporators that generate steam by heating the water using the high-temperature gas, and economizers that are provided for respective the at least one or more evaporators to heat the water, which is sent to the at least one or more evaporators, by the high-temperature gas,
wherein the heated water line guides the water in liquid, which is heated by either of the economizers provided respectively for the at least one or more evaporators, to the low-boiling-point medium Rankine cycle, and wherein the water recovery line returns the water, which has passed through the low-boiling-point medium Rankine cycle, to the boiler through the water supply line.

2. The waste heat recovery device according to claim 1, wherein the heated water line guides the water in liquid form, which is heated by the economizer corresponding to a low-pressure evaporator having the lowest internal pressure among the one or more evaporators, to the low-boiling-point medium Rankine cycle.

3. The waste heat recovery device according to claim 1, wherein
the water recovery line returns the water, which has passed through the low-boiling-point medium Rankine cycle, to the economizer, which corresponds to a low-pressure evaporator having the lowest internal pressure among the one or more evaporators, through a water supply line that supplies the water to the boiler, and
a temperature of the water, which is sent to the economizer corresponding to the low-pressure evaporator, is a temperature that is higher than a dew-point temperature of the exhaust gas at an exhaust gas outlet of the economizer.

4. A waste heat recovery device comprising:
a low-boiling-point medium Rankine cycle in which a low-boiling-point medium circulates while the low-boiling-point medium is repeatedly condensed and evaporated;
a heated water line that guides heated water in liquid form to the low-boiling-point medium Rankine cycle from a boiler configured to heat the water by using high-temperature gas;
a water recovery line that returns the water, which has been led from the heated water line to the low-boiling-point medium Rankine cycle, and passed through the low-boiling-point medium Rankine cycle, to the boiler;
a water supply line that supplies the water to the boiler; and
a heat exchanger that exchanges heat between a medium apart from the high-temperature gas and at least one of the water flowing in the water recovery line, the water flowing in the heated water line, and the water flowing in the water supply line,
wherein the low-boiling-point medium Rankine cycle includes a heater that heats the low-boiling-point medium by exchanging heat between the low-boiling-point medium in liquid form, and the water, which is the liquid having passed through the heated water line.

5. The waste heat recovery device according to claim 4, further comprising a gas turbine,
wherein the boiler is a waste heat recovery boiler configured to heat the water by exhaust gas generated from the gas turbine, and
wherein the medium besides the high-temperature gas is an object to be cooled in the gas turbine.

6. The waste heat recovery device according to claim 5, wherein the heat exchanger has a cooler configured to heat the water flowing in the water recovery line by exchanging heat between the water and the object to be cooled in the gas turbine so as to heat the water while cooling the object to be cooled in the gas turbine, and
wherein the cooler includes an air cooler that cools compressed air, which is taken from a compressor of the gas turbine, by exchanging heat between a part of the compressed air as the object to be cooled and the water and sends the cooled compressed air to a high-temperature component that is in contact with combustion gas in the gas turbine.

7. The waste heat recovery device according to claim 1, further comprising
a generator,
wherein the heat exchanger includes a generator cooler configured to cool a cooling medium by exchanging heat between the cooling medium as the medium besides the high-temperature gas and the water, the cooling medium being used for cooling a component of the generator.

8. The waste heat recovery device according to claim 5,
wherein the heat exchanger includes a cooler configured to heat the water flowing in the heated water line by exchanging heat between the water and the object to be cooled in the gas turbine so as to heat the water while cooling the object to be cooled in the gas turbine, and
wherein the cooler includes an air cooler that cools compressed air, which is taken from a compressor of the gas turbine, by exchanging heat between a part of the compressed air as the object to be cooled and the water and sends the cooled compressed air to a high-temperature component that is in contact with combustion gas in the gas turbine.

9. The waste heat recovery device according to claim 5,
wherein the heat exchanger includes a water supply system-heat exchanger configured to exchange heat between the water flowing the water supply line and the object to be cooled in the gas turbine so as to heat the water while cooling the object to be cooled in the gas turbine, and
wherein the water supply system-heat exchanger includes at least one cooler of
an intercooler that cools compressed air, which is taken from an intermediate stage of a compressor of the gas turbine, by exchanging heat between the compressed air as the object to be cooled and the water, and returns the cooled compressed air to the intermediate stage of the compressor or a rear portion of the intermediate stage,
a lubricating oil cooler that cools a lubricating oil, which flows out of a bearing rotatably supporting a rotor of the gas turbine, by exchanging heat between the lubricating oil as the object to be cooled and the water, and returns the cooled lubricating oil to the bearing, and
an air cooler that cools compressed air, which is taken from a compressor of the gas turbine, by exchanging heat between a part of the compressed air as the object to be cooled and the water and sends the cooled compressed air to a high-temperature component that is in contact with combustion gas in the gas turbine.

10. A gas turbine plant comprising:
a gas turbine that generates exhaust gas and the waste heat recovery device according to claim 1,
wherein the water from the water supply line is heated by the exhaust gas from the gas turbine, wherein the exhaust gas is the high-temperature gas.

11. A waste heat recovery method comprising:
a Rankine cycle-performing step of circulating a low-boiling-point medium in a low-boiling-point medium Rankine cycle such that the low-boiling-point medium is repeatedly condensed and evaporated;
a heated water-introducing step of guiding heated water in liquid form to the low-boiling-point medium Rankine cycle from a boiler that heats the water by high-temperature gas; and
a water recovery step of returning the water, which has been guided to the low-boiling-point medium Rankine cycle and has passed through the low-boiling-point medium Rankine cycle, to the boiler,
a water supply step of supplying the water to the boiler; and
a heat-exchange step of exchanging heat between a medium apart from the high-temperature gas and at least one of the water flowing in the heated water-introducing step, the water flowing in the water recovery step, and the water flowing in the water supply step,
wherein the Rankine cycle-performing step includes a heating step of heating the low-boiling-point medium by exchanging heat between the water, which is the liquid introduced to the low-boiling-point medium Rankine cycle, and the low-boiling-point medium that is a liquid.

12. The waste heat recovery method according to claim 11,
further including a generator cooling step of cooling a cooling medium by exchanging heat between the cooling medium as the medium besides the high-temperature gas and the water, the cooling medium being used for cooling a component of a generator.

13. The waste heat recovery method according to claim 11,
wherein in the heated water-introducing step, exhaust gas generated from a gas turbine is used as the high-temperature gas to heat the water, and
wherein the medium besides the high-temperature gas is an object to be cooled in the gas turbine.

14. The waste heat recovery method according to claim 13,
wherein the heat exchange step includes a cooling step of exchanging heat between the water flowing in the water recovery step and the object to be cooled in the gas turbine so as to heat the water while cooling the object to be cooled in the gas turbine, and
wherein the cooling step further includes an air cooling step of cooling compressed air, which is taken from a compressor of the gas turbine, by exchanging heat between a part of the compressed air as the object to be cooled and the water and sends the cooled compressed air to a high-temperature component that is in contact with combustion gas in the gas turbine.

15. The waste heat recovery method according to claim 13,
wherein the heat exchange step includes a cooling step of exchanging heat between the water flowing in the heated water-introducing step and the object to be cooled in the gas turbine so as to heat the water while cooling the object to be cooled in the gas turbine, and
wherein the cooling step further includes an air cooling step of cooling compressed air, which is taken from a compressor of the gas turbine, by exchanging heat between a part of the compressed air as the object to be cooled and the water and sends the cooled compressed air to a high-temperature component that is in contact with combustion gas in the gas turbine.

16. The waste heat recovery method according to claim 13,
wherein the heat-exchange step includes a cooling step of exchanging heat between the water flowing in the water supply step and the object to be cooled in the gas turbine so as to heat the water while cooling the object to be cooled in the gas turbine, and wherein the cooling step includes at least one of steps having:

an intercooling step of cooling compressed air, which is taken from an intermediate stage of a compressor of the gas turbine, by exchanging heat between the compressed air as the object to be cooled and the water, and returning the cooled compressed air to the intermediate stage of the compressor or a rear portion of the intermediate stage, a lubricating-oil cooling step of cooling a lubricating oil, which flows out of a bearing rotatably supporting a rotor of the gas turbine, by exchanging heat between the lubricating oil as the object to be cooled and the water, and returning the cooled lubricating oil to the bearing, and an air cooling step of cooling compressed air, which is taken from a compressor of the gas turbine, by exchanging heat between a part of the compressed air as the object to be cooled and the water, and sending the cooled compressed air to a high-temperature component that is in contact with combustion gas in the gas turbine.

* * * * *